United States Patent
Patton

(10) Patent No.: US 11,859,870 B2
(45) Date of Patent: Jan. 2, 2024

(54) METHODS AND SYSTEMS FOR RIGIDLY ATTACHING COMPONENTS TO ROOF STRUCTURES

(71) Applicant: Patton Engineering, Inc., Roseville, CA (US)

(72) Inventor: John C. Patton, Roseville, CA (US)

(73) Assignee: Patton Engineering, Inc., Roseville, CA (US)

( * ) Notice: Subject to any disclaimer, the term of this patent is extended or adjusted under 35 U.S.C. 154(b) by 407 days.

(21) Appl. No.: 16/906,809

(22) Filed: Jun. 19, 2020

(65) Prior Publication Data

US 2020/0400272 A1 Dec. 24, 2020

Related U.S. Application Data

(60) Provisional application No. 62/921,480, filed on Jun. 19, 2019.

(51) Int. Cl.
| | |
|---|---|
| *E04D 13/00* | (2006.01) |
| *F24S 25/65* | (2018.01) |
| *F24S 25/61* | (2018.01) |
| *H02S 20/23* | (2014.01) |
| *F24S 25/00* | (2018.01) |

(52) U.S. Cl.
CPC .............. *F24S 25/65* (2018.05); *E04D 13/00* (2013.01); *F24S 25/61* (2018.05); *F16M 2200/08* (2013.01); *F24S 2025/021* (2018.05); *H02S 20/23* (2014.12)

(58) Field of Classification Search
CPC ............ F24S 25/65; F24S 25/61; E04D 13/00
See application file for complete search history.

(56) References Cited

U.S. PATENT DOCUMENTS

| | | | | |
|---|---|---|---|---|
| 5,886,673 | A * | 3/1999 | Thomas | H01Q 19/132 343/882 |
| 6,360,491 | B1 * | 3/2002 | Ullman | F24S 25/33 52/90.2 |
| 6,526,701 | B2 | 3/2003 | Stearns | |
| 7,935,202 | B2 | 5/2011 | Stanley | |
| 8,122,648 | B1 * | 2/2012 | Liu | F24S 25/61 52/173.3 |
| 8,448,405 | B2 * | 5/2013 | Schaefer | E04D 13/00 52/60 |
| 8,499,524 | B2 | 8/2013 | Stanley | |
| 8,524,029 | B2 | 9/2013 | Stanley | |
| 8,557,070 | B2 | 10/2013 | Stanley | |
| 8,608,884 | B2 | 12/2013 | Stanley | |
| 8,623,158 | B2 | 1/2014 | Stanley | |
| 8,683,751 | B2 | 4/2014 | Stearns | |
| 8,733,718 | B2 * | 5/2014 | Corsi | E04B 1/40 52/27 |

(Continued)

OTHER PUBLICATIONS

U.S. Appl. No. 62/921,480, filed Jun. 19, 2019. First Named Inventor: Patton.

*Primary Examiner* — Babajide A Demuren
(74) *Attorney, Agent, or Firm* — Santangelo Law Offices, P.C.

(57) ABSTRACT

Embodiments of the present invention provide rigid attachment of materials using a roof mount, a cover, and a resilience constituent. A roof mount may have a top roof mount and bottom roof mount. A resilience constituent may be a ring, a disk with a middle ridge or even an arched disk or the like.

54 Claims, 66 Drawing Sheets

(56) References Cited

U.S. PATENT DOCUMENTS

| | | |
|---|---|---|
| 8,826,618 B2 | 9/2014 | Stearns |
| 9,103,112 B2 | 8/2015 | Corsi |
| 9,121,180 B2 | 9/2015 | Stanley |
| 9,121,545 B2 | 9/2015 | Stanley |
| 9,175,479 B2 | 11/2015 | Stanley |
| 9,175,706 B2 | 11/2015 | Stanley |
| 9,194,130 B1 | 11/2015 | Stanley |
| 9,212,833 B2 | 12/2015 | Stearns et al. |
| 9,479,110 B2 | 10/2016 | Patton |
| 9,496,820 B2 * | 11/2016 | Seery .................. F24S 25/61 |
| 9,643,035 B2 * | 5/2017 | Mastenbroek ..... A62B 35/0056 |
| 9,647,607 B2 | 5/2017 | Patton |
| 9,853,594 B2 * | 12/2017 | Almy .................. H02S 20/23 |
| 10,135,387 B2 * | 11/2018 | Seery .................. F24S 25/60 |
| 2007/0295391 A1 * | 12/2007 | Lenox .................. H02S 20/23 |
| | | 136/251 |
| 2015/0218824 A1 * | 8/2015 | Schaefer ................ F24S 25/20 |
| | | 52/704 |

\* cited by examiner

PRIOR ART

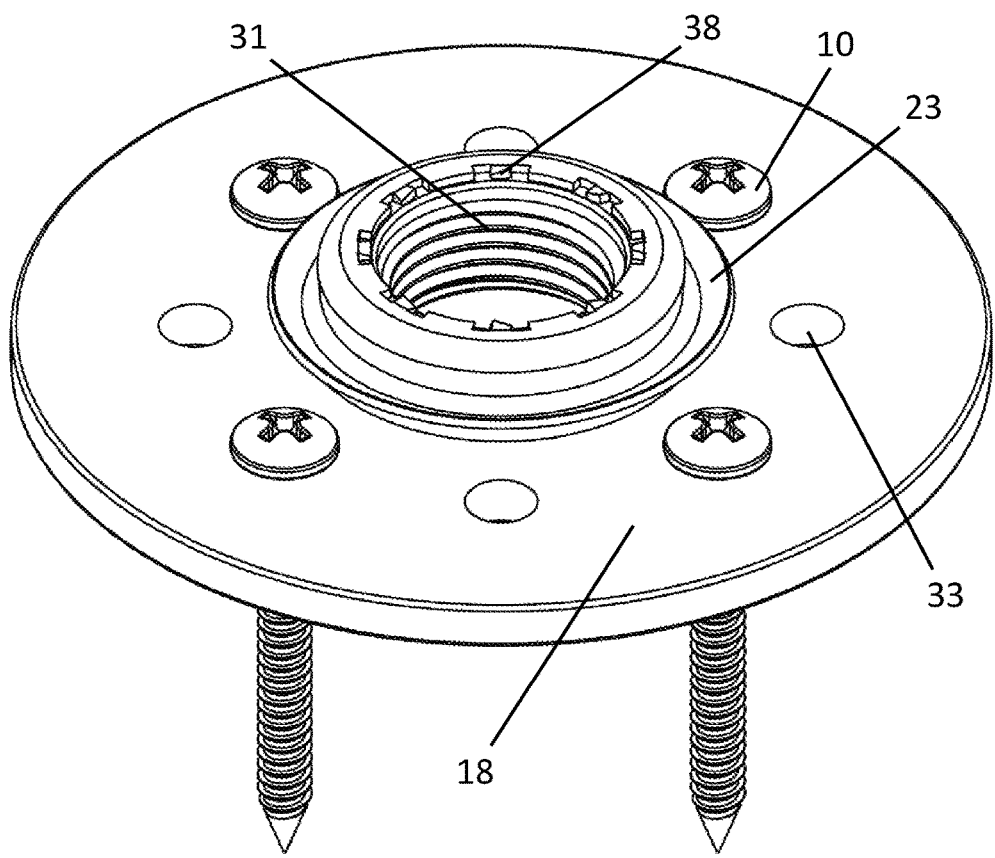
FIG. 63
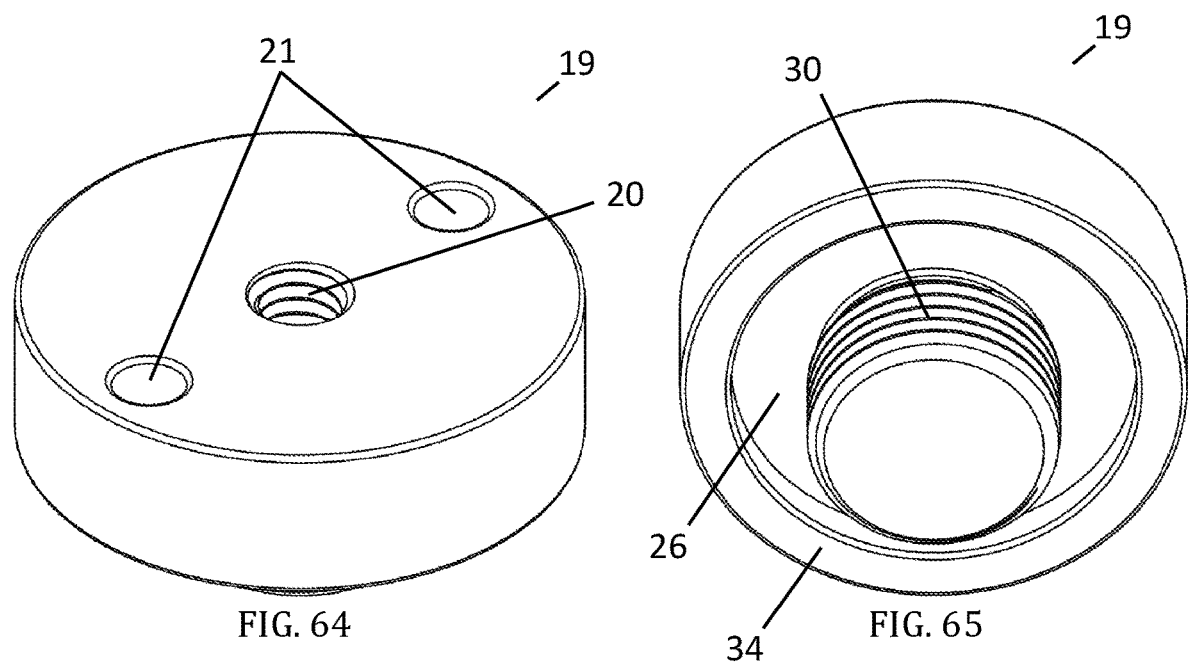
FIG. 64
FIG. 65

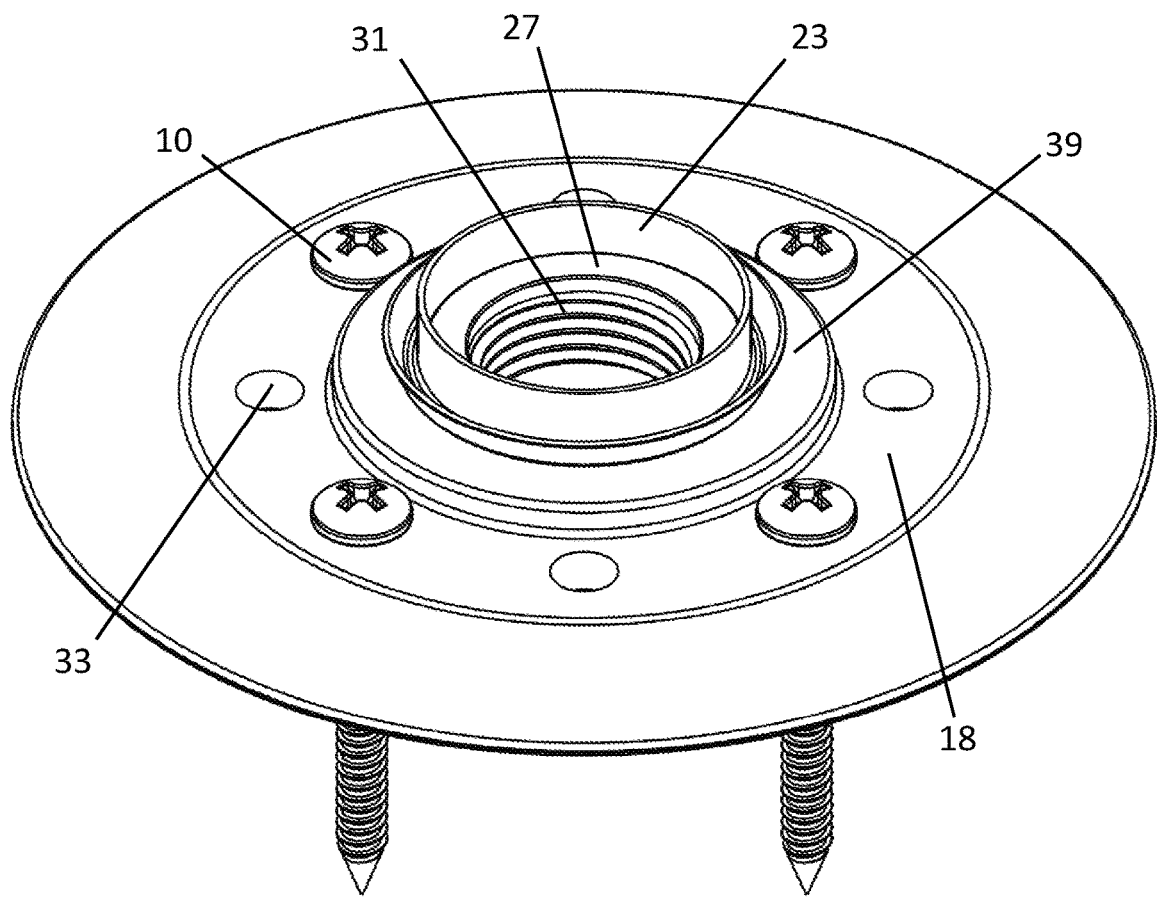
FIG. 76
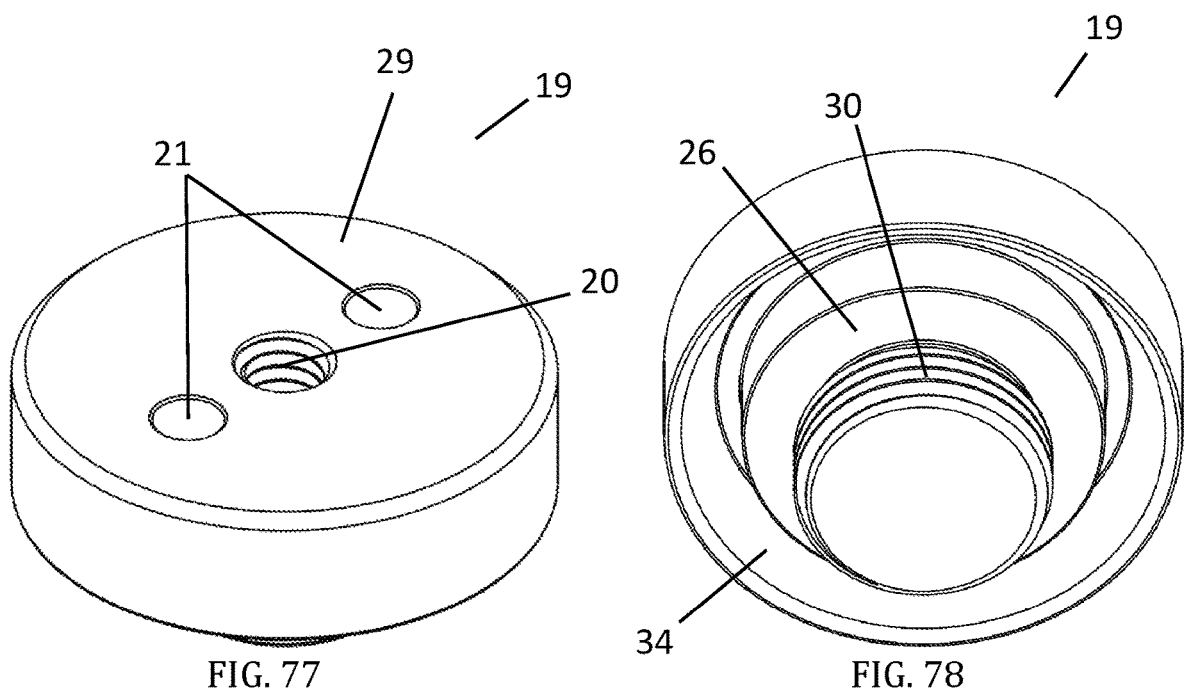
FIG. 77
FIG. 78

METHODS AND SYSTEMS FOR RIGIDLY ATTACHING COMPONENTS TO ROOF STRUCTURES

PRIORITY CLAIM

This application is a U.S. Non-Provisional Patent Application claiming priority to and the benefit of U.S. Provisional Patent Application No. 62/921,480, filed Jun. 19, 2019, hereby incorporated herein by reference in its entirety.

BACKGROUND OF THE INVENTION

Roof mounts may attach equipment, piping, screen partitions, attachment structures or any other support apparatus to a surface such as a roof or the like. These mounts may prevent water leakage into the roof by sealing the mount fasteners from any water on or around the roof mount.

In the past, roof mounts have been used with non-rigid materials. FIGS. 1-14 show examples of prior art attached roof mounts with attachment structures attached to a mount. FIGS. 1-5 shows a prior art mount (1) attached to a roof (3) with an attachment structure (11) attached to the prior art mount (1). A roof layer may also be on top of the roof (3). As shown, there may be a prior art cover (4) between an attachment structure (11) and a prior art mount base (9). There may be prior art additional layers (5) between an attachment structure (11) and a prior art mount base (9). The prior art cover (4) and the prior art additional layers (5) may be non-rigid materials. After tightening a nut (7) on a stud (6), the non-rigid layer of a prior art cover may compress. If there is one or more non-rigid prior additional layers (5), these may compress also. With these non-rigid layer or layers, an attachment structure (11) may not be rigidly secured to a prior art mount base (9) which may reduce a strength and reliability as discussed previously.

FIGS. 6-10 show a prior art mount (1) with an attachment structure (11) attached to it. For simplicity, a roof (3) and a prior art top roof layer (2) is not shown but does apply as it may be in the previous mount (1). Referencing FIGS. 6-10, these FIGS. may have a prior art cover (4) and a prior art additional layer (5) that may be non-rigid. When a nut (7) may be tightened, the non-rigid additional layer (5) may compress. In addition, when a stud (6) may be attached to a prior art middle mount plate (12) and not directly to a prior art mount base (9), the rigidity between an attachment structure (11) and a prior mount base (9) may be even lower. With these non-rigid layer or layers and a stud (6) not attached to a prior art mount base (9), an attachment structure (11) may not be rigidly secured to a prior art mount base (9) which may reduce the strength and reliability as discussed previously.

FIGS. 11-14 show another prior art mount (1). For simplicity of discussion, a roof and a prior art top roof layer (2) is not shown but applies as in the first prior art mount (1). Referencing FIGS. 11-14, there may be a non-rigid layer, prior art cover (4) between an attachment structure (11) and a prior art mount base (9). When a bolt (8) may be tightened, a non-rigid prior art cover (4) may be compressed. With a non-rigid layer, an attachment structure (11) may not be rigidly secured to the prior art mount base (9) which may reduce the strength and reliability as discussed previously.

SUMMARY OF THE INVENTION

The present invention includes a variety of aspects, which may be selected in different combinations based upon the particular application or needs to be addressed. In various embodiments, the invention may include rigid and even long-term reliable connections between an attachment structure and a bottom of a roof mount and may increase a long-term reliability for water intrusion through mount fastener penetrations into the roof.

It is an object of some embodiments of the present invention to provide a rigid attachment of a component to an attachment structure.

It is another object of some embodiments of the present invention to provide a roof mount with a resilience constituent.

It is yet another object of some embodiments of the present invention to provide a roof mount with a top roof mount and a bottom roof mount.

Naturally, further objects, goals and embodiments of the inventions are disclosed throughout other areas of the specification, claims, and drawings.

BRIEF DESCRIPTION OF THE DRAWINGS

FIG. 63 shows a non-limiting example of a mount base in accordance with some embodiments of the present invention.

FIG. 64 shows a non-limiting example of a mount top in accordance with some embodiments of the present invention.

FIG. 65 shows a non-limiting example of a mount top in accordance with some embodiments of the present invention.

FIG. 76 shows a non-limiting example of a mount base with a resilience constituent in accordance with some embodiments of the present invention.

FIG. 77 shows a non-limiting example of a mount top in accordance with some embodiments of the present invention.

FIG. 78 shows a non-limiting example of a mount top in accordance with some embodiments of the present invention.

FIG. 120 shows a non-limiting example of a cross-sectional view of FIG. 119 in accordance with some embodiments of the present invention.

FIG. 121 shows a non-limiting example of a mount top in accordance with some embodiments of the present invention.

FIG. 122 shows a non-limiting example of a mount in accordance with some embodiments of the present invention.

FIG. 123 shows a non-limiting example of a mount with an attachment structure in accordance with some embodiments of the present invention.

FIG. 124 shows non-limiting example of a top view of FIG. 123 in accordance with some embodiments of the present invention.

FIG. 125 shows a non-limiting example of a cross-section view of FIG. 124 in accordance with some embodiments of the present invention.

FIG. 126 shows a non-limiting example of an enlarged view of FIG. 125 in accordance with some embodiments of the present invention.

FIG. 127 shows a non-limiting example of an enlarged view of FIG. 126 in accordance with some embodiments of the present invention.

FIG. 128 shows a non-limiting example of a mount in accordance with some embodiments of the present invention.

FIG. 129 shows a non-limiting example of an attachment structure in accordance with some embodiments of the present invention.

FIG. 130 shows a non-limiting example of an attachment structure in accordance with some embodiments of the present invention.

FIG. 131 shows a non-limiting example of a resilience constituent in accordance with some embodiments of the present invention.

Figure 132:
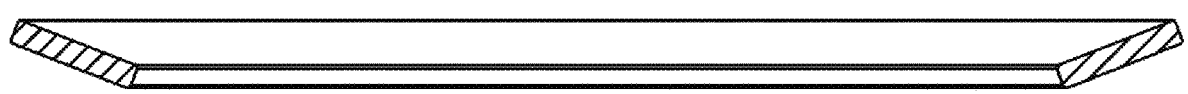

FIG. 132 shows a non-limiting example of a compressed resilience constituent in accordance with some embodiments of the present invention.

Figure 133:
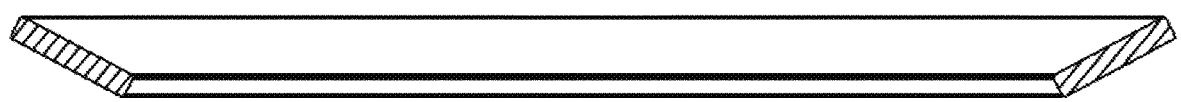

FIG. 133 shows a non-limiting example of a non-compressed resilience constituent in accordance with some embodiments of the present invention.

Figure 134:
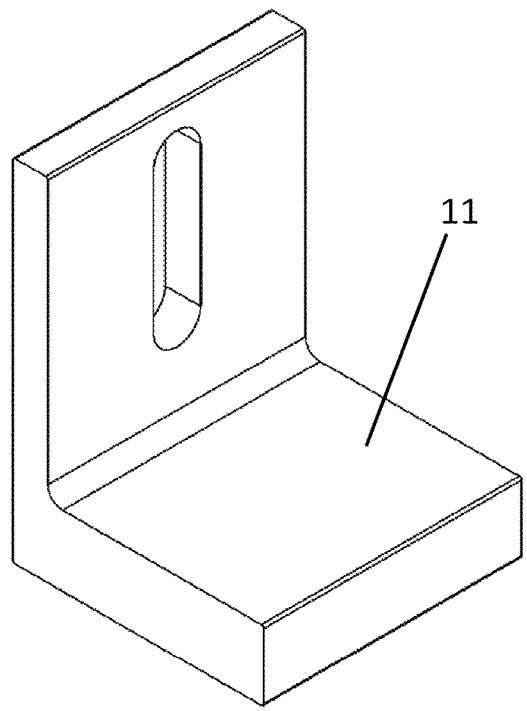

FIG. 134 shows a non-limiting example of an attachment structure in accordance with some embodiments of the present invention.

Figure 135:
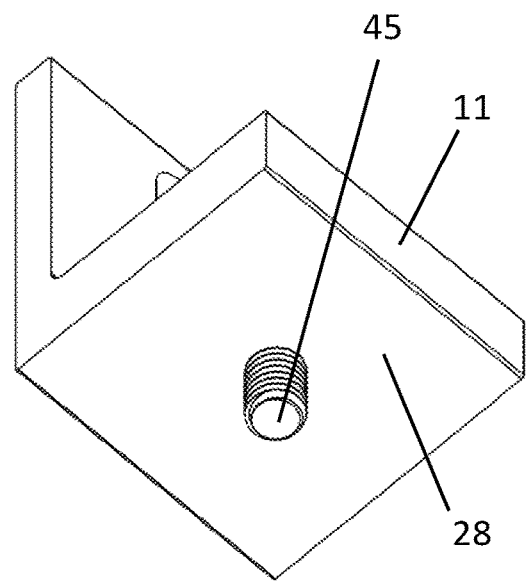

FIG. 135 shows a non-limiting example of threaded rod in an attachment structure in accordance with some embodiments of the present invention.

Figure 136:
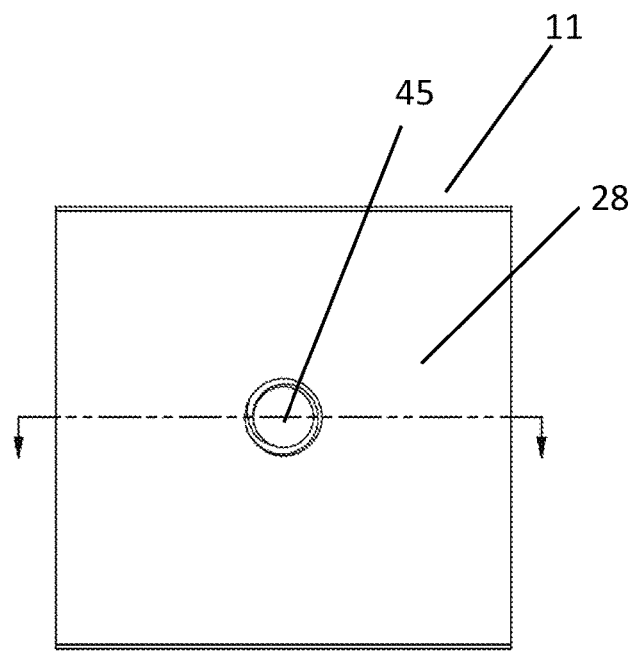

FIG. 136 shows a non-limiting example of a threaded rod in an attachment structure in accordance with some embodiments of the present invention.

Figure 137:
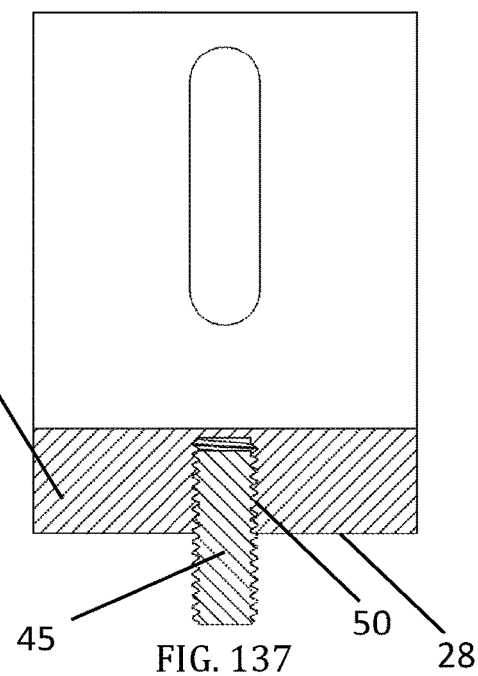

FIG. 137 shows a non-limiting example of a threaded rod screwed into a threaded hole in accordance with some embodiments of the present invention.

Figure 138:
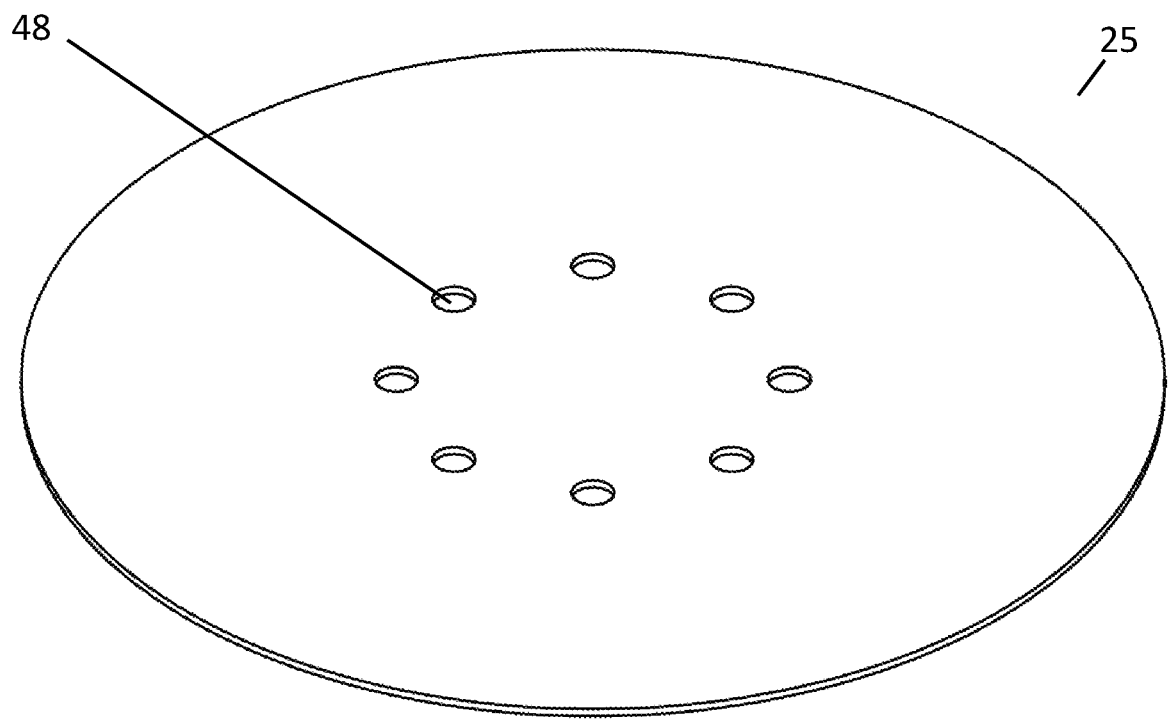

FIG. 138 shows a non-limiting example of a resilience constituent with extension holes in accordance with some embodiments of the present invention.

Figure 139:
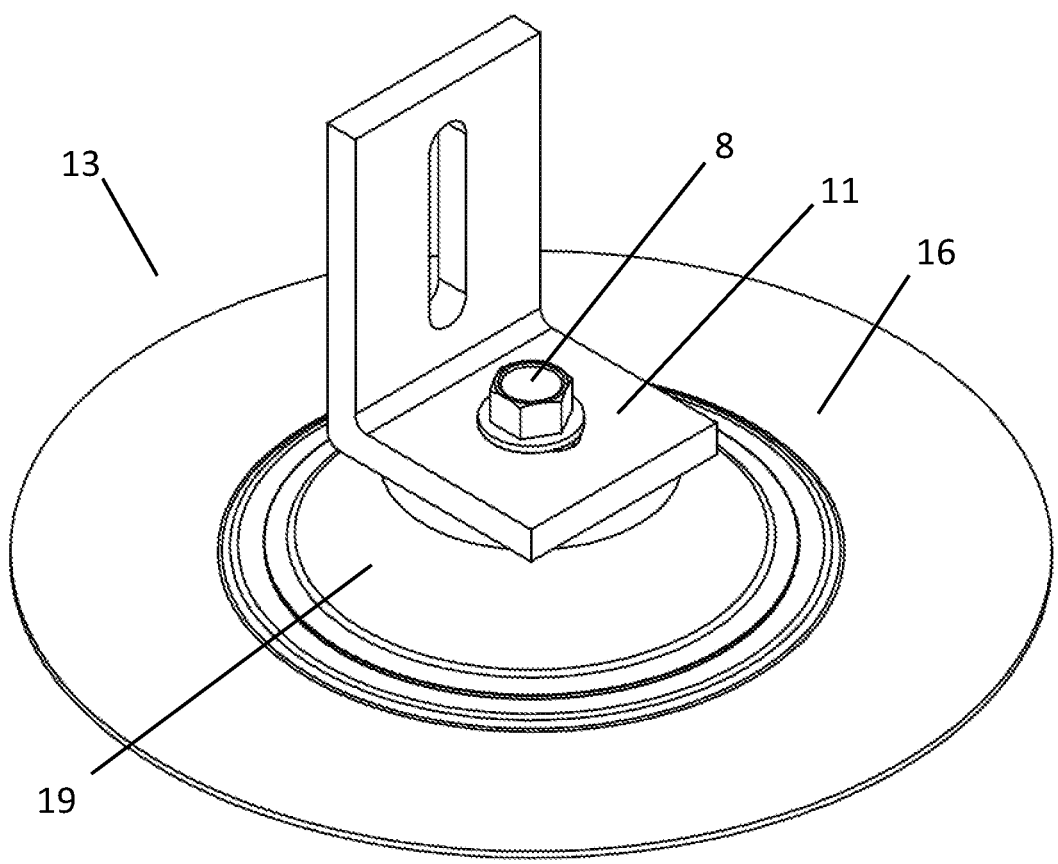

FIG. 139 shows a non-limiting example of a mount in accordance with some embodiments of the present invention.

Figure 140:
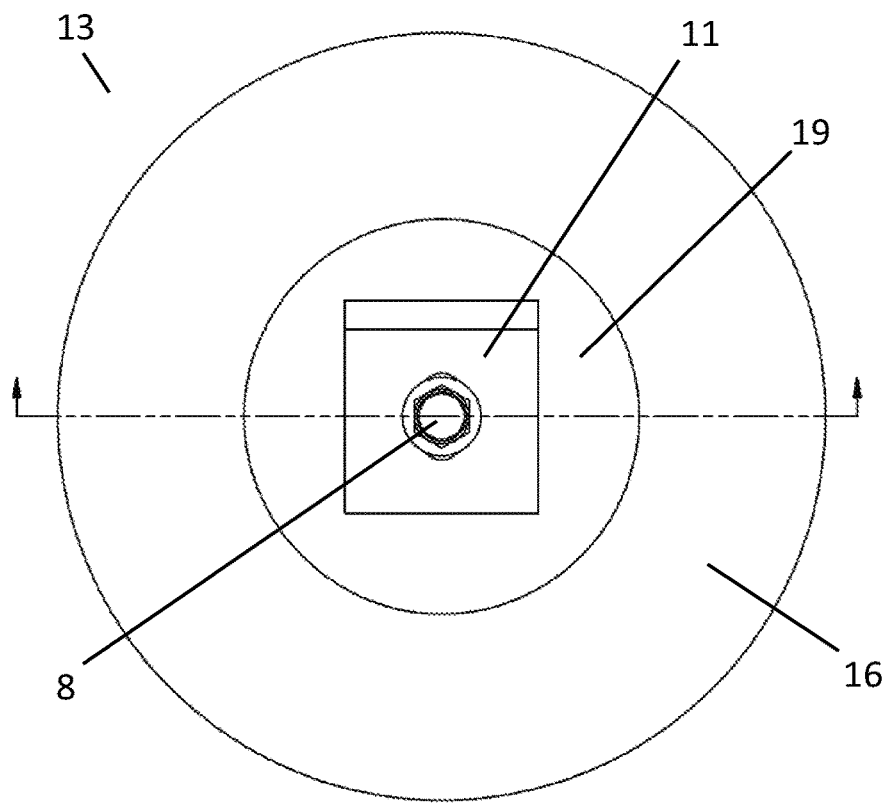

FIG. 140 shows a non-limiting example of a top view of FIG. 139 in accordance with some embodiments of the present invention.

Figure 141:
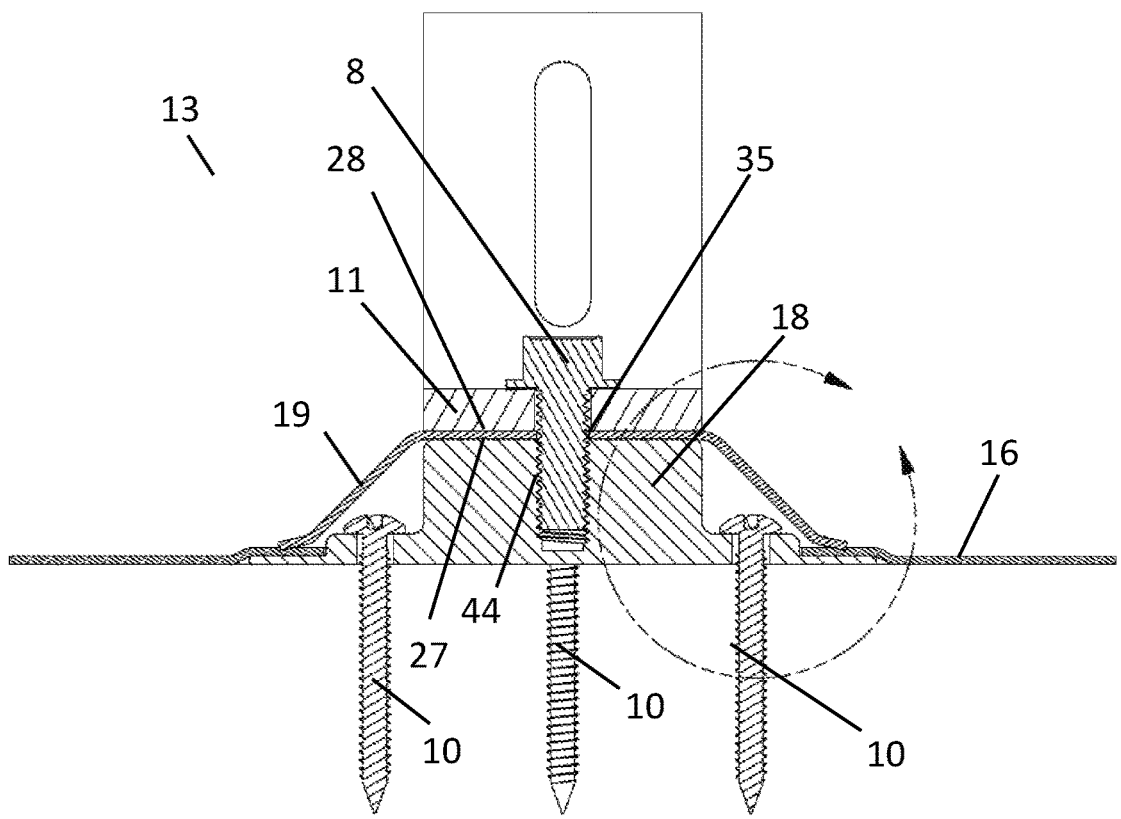

FIG. 141 shows a non-limiting example of a cross section view of FIG. 140 in accordance with some embodiments of the present invention.

Figure 142:
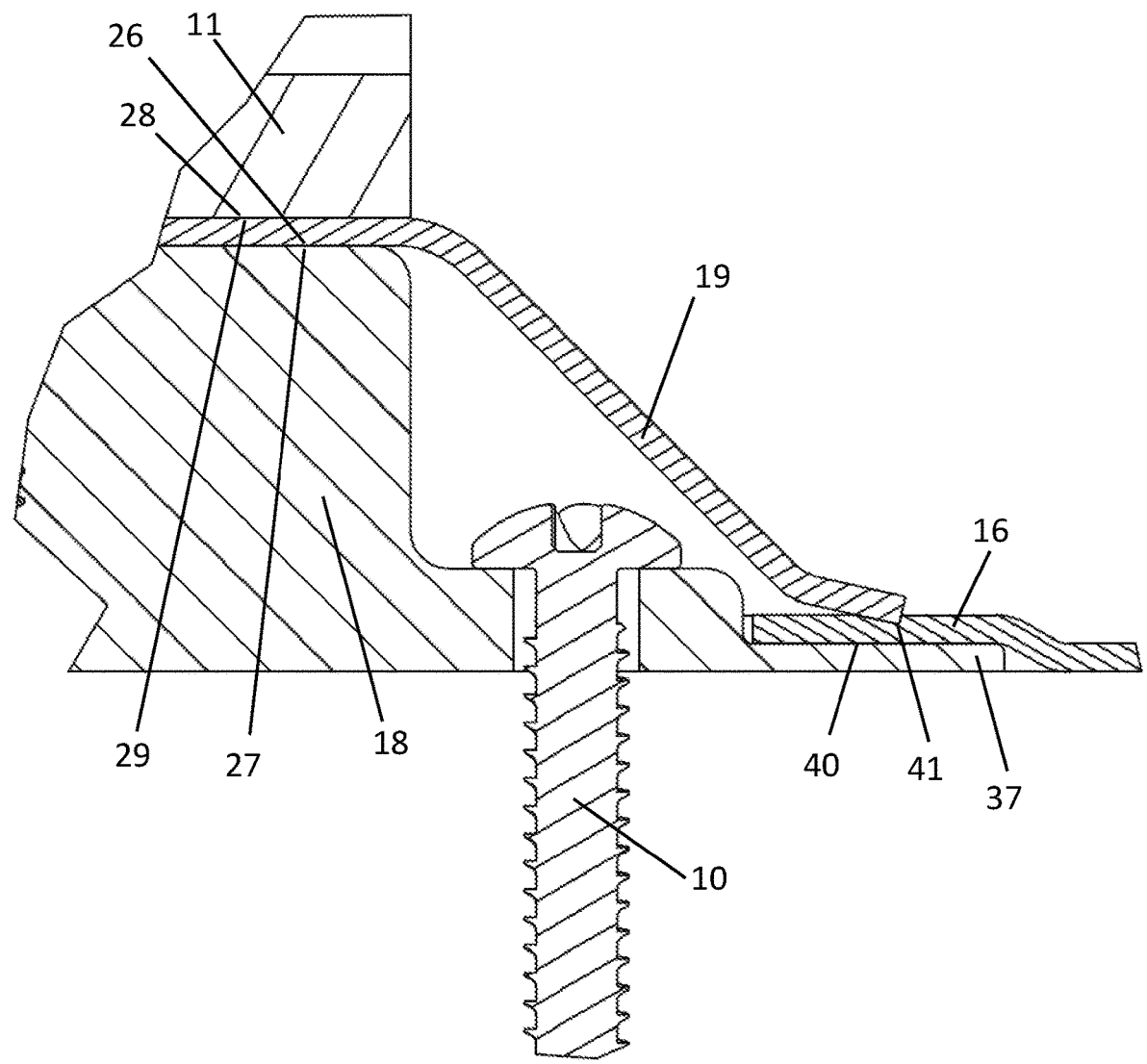

FIG. 142 shows an enlarged view of FIG. 141 in accordance with some embodiments of the present invention.

Figure 143:
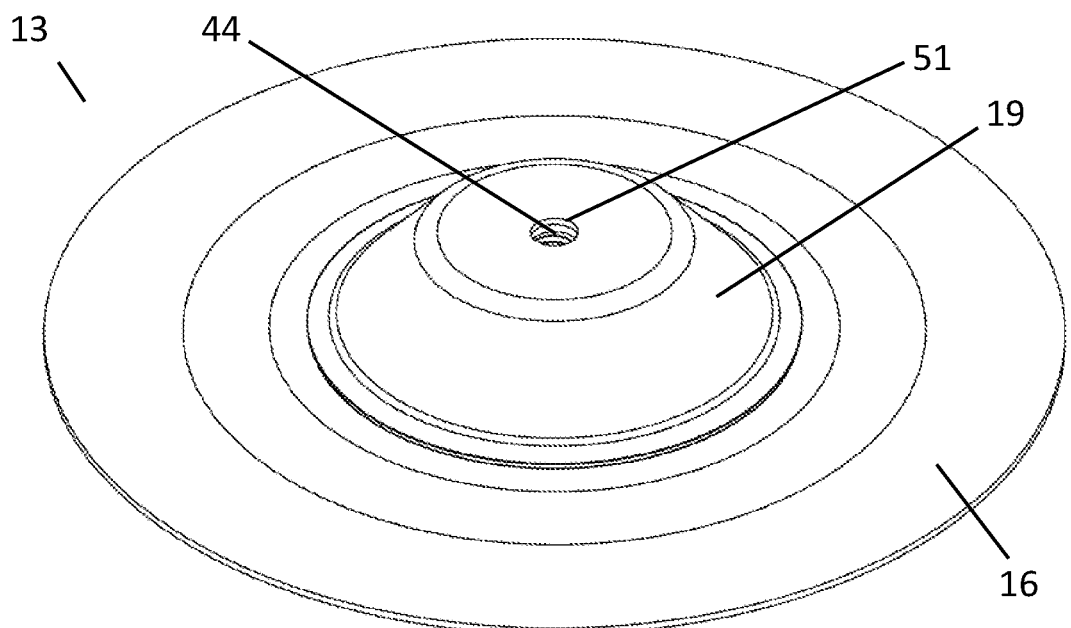

FIG. 143 shows a non-limiting example of a cover in accordance with some embodiments of the present invention.

Figure 144:
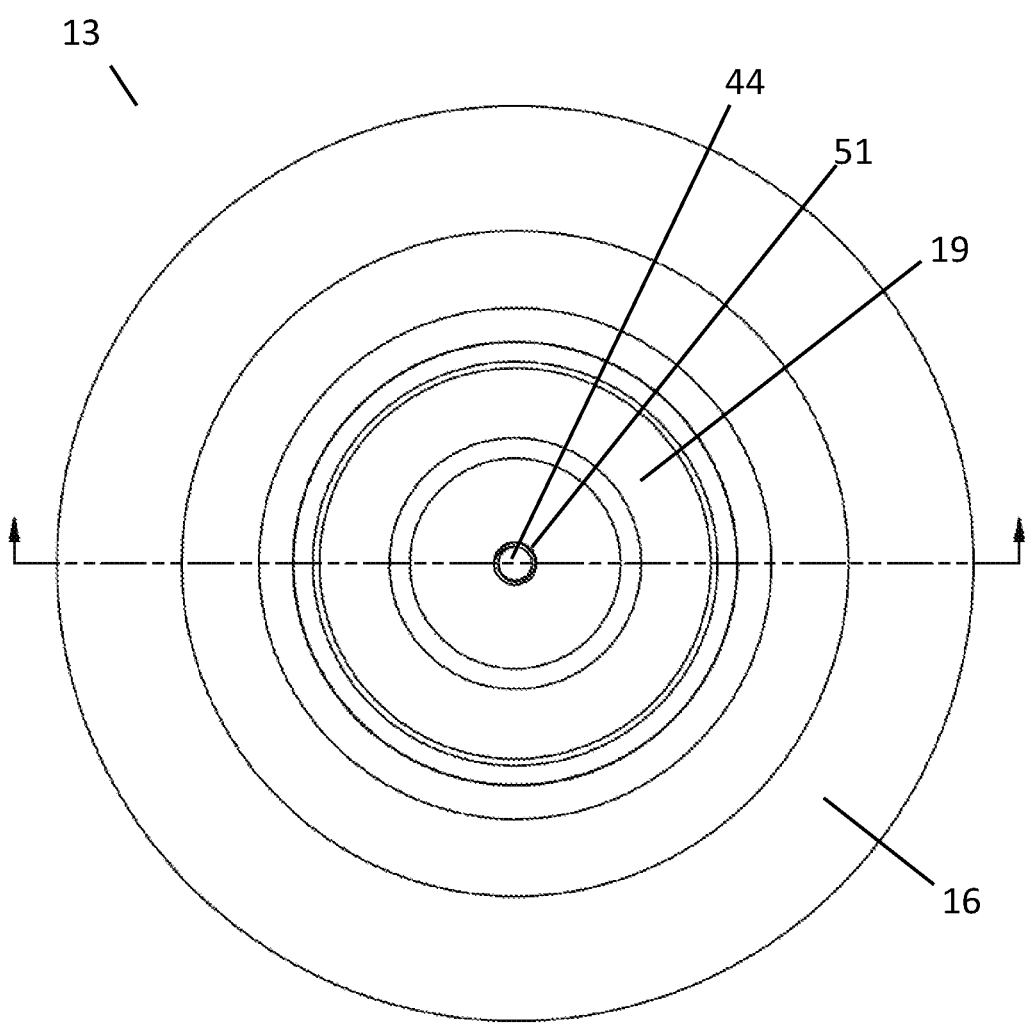

FIG. 144 shows a non-limiting example of a top view of a cover in accordance with some embodiments of the present invention.

Figure 145:
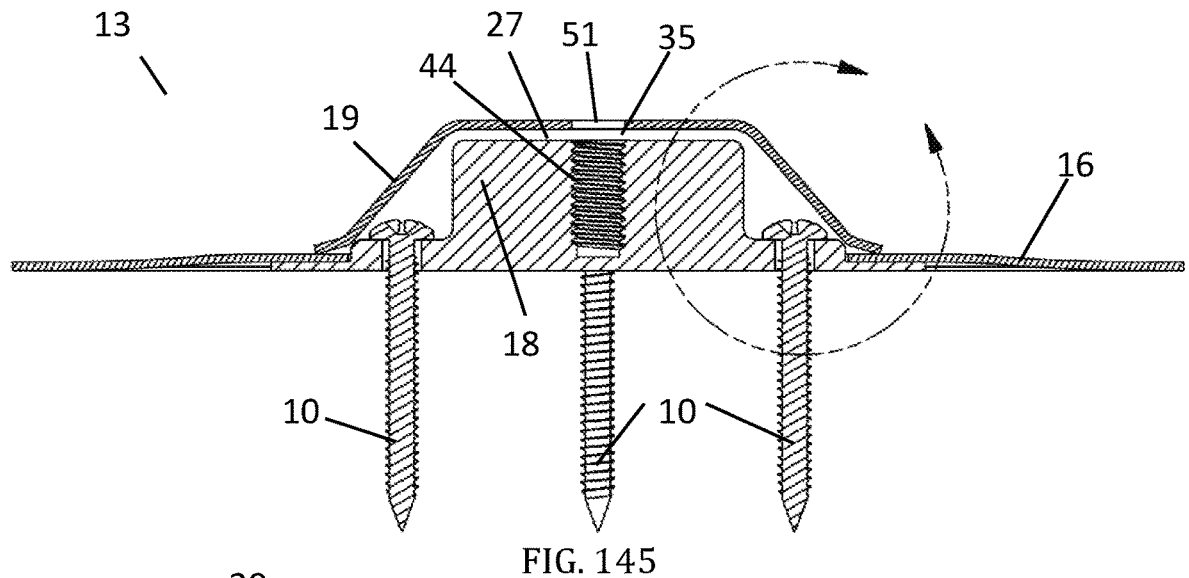

FIG. 145 shows a non-limiting example of a cross section view of FIG. 145 in accordance with some embodiments of the present invention.

Figure 146:
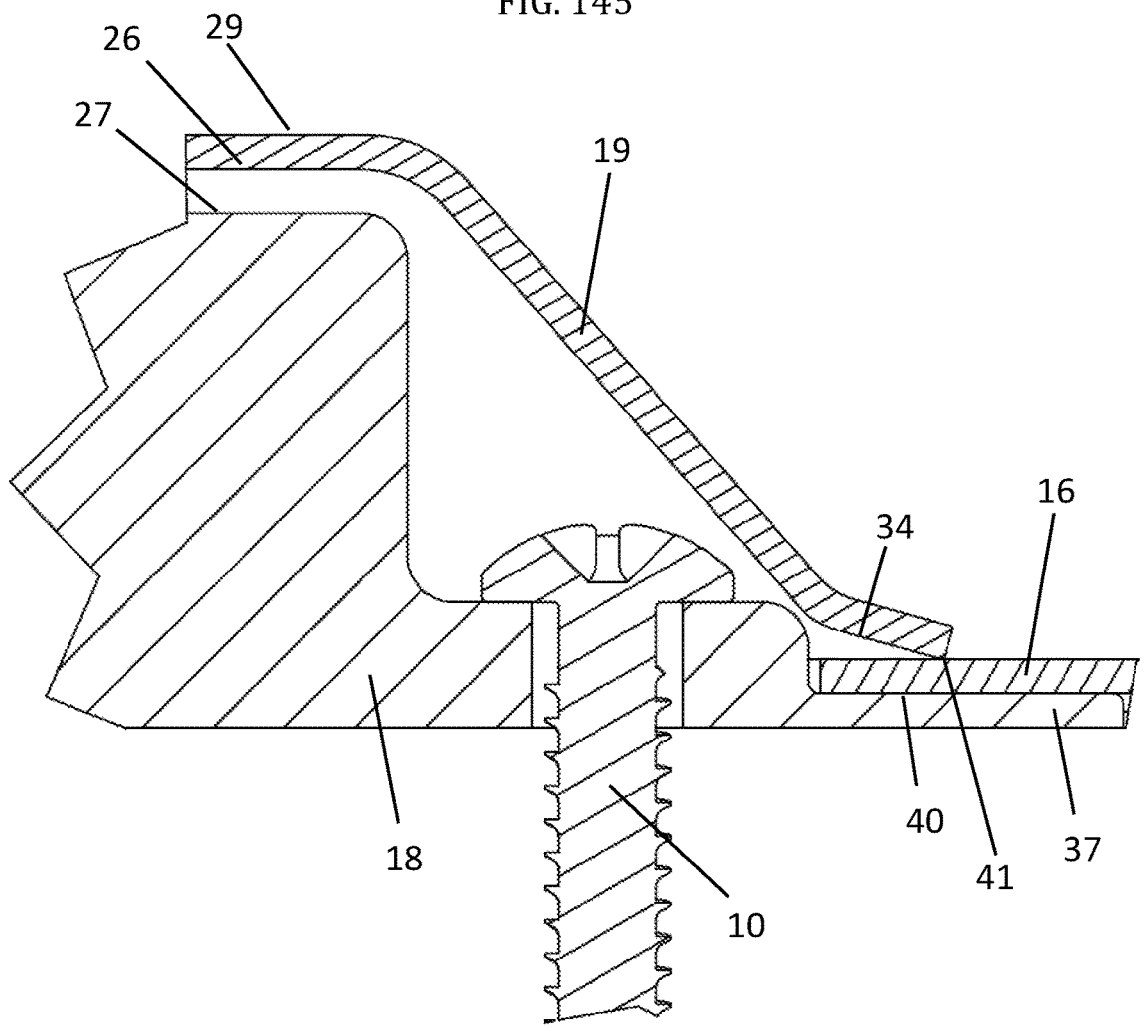

FIG. 146 shows a non-limiting example of a cross section view of a mount top over a cover and mount base in accordance with some embodiments of the present invention.

Figure 147:
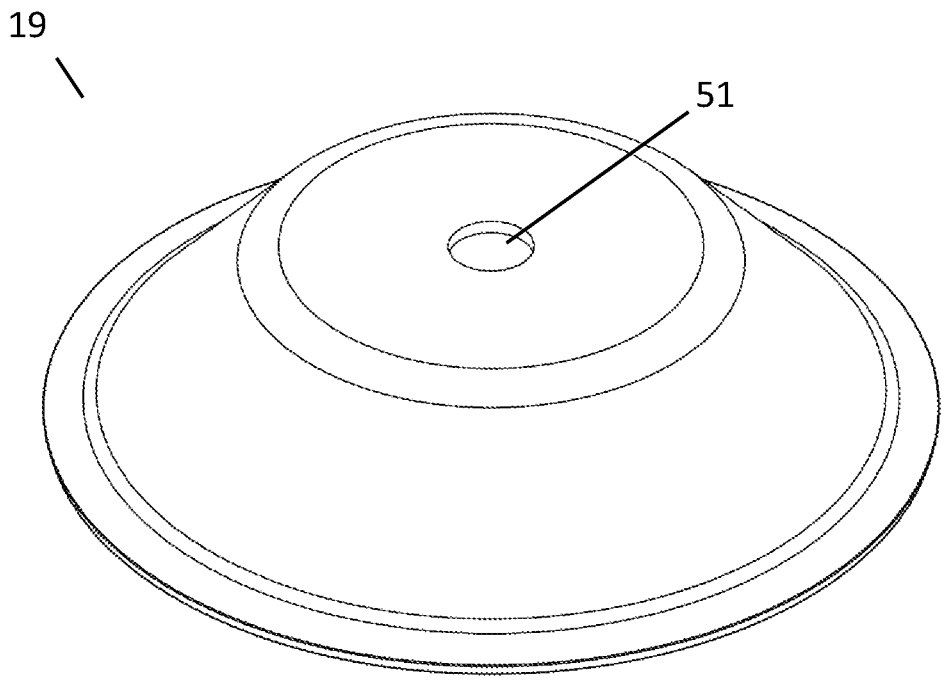

FIG. 147 shows a non-limiting example of a mount top in accordance with some embodiments of the present invention.

Figure 148:
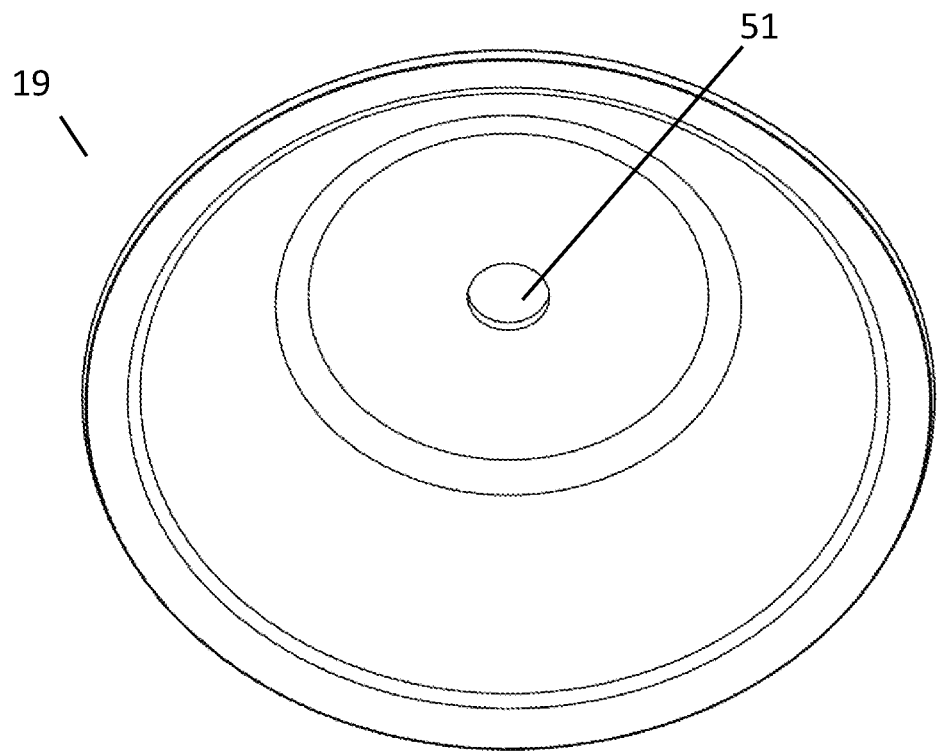

FIG. 148 shows a non-limiting example of a mount top in accordance with some embodiments of the present invention.

Figure 149:
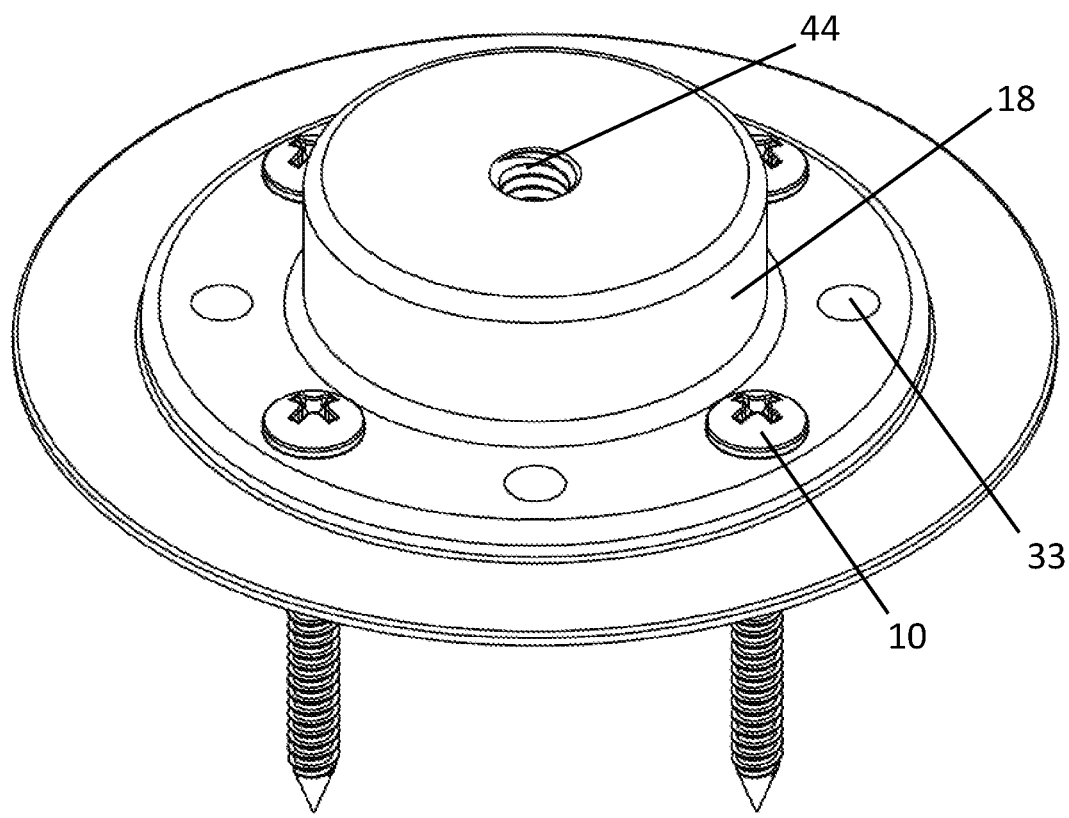

FIG. 149 shows a non-limiting example of a mount base in accordance with some embodiments of the present invention.

Figure 150:
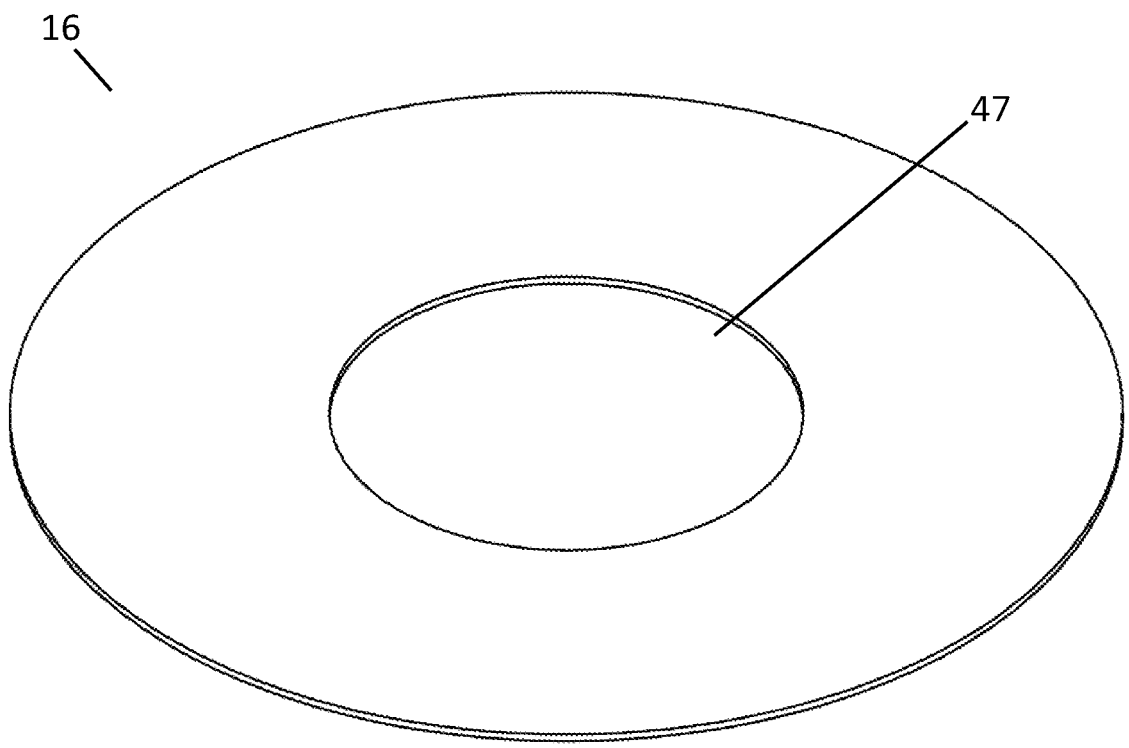

FIG. 150 shows a non-limiting example of a cover in accordance with some embodiments of the present invention.

Figure 151:
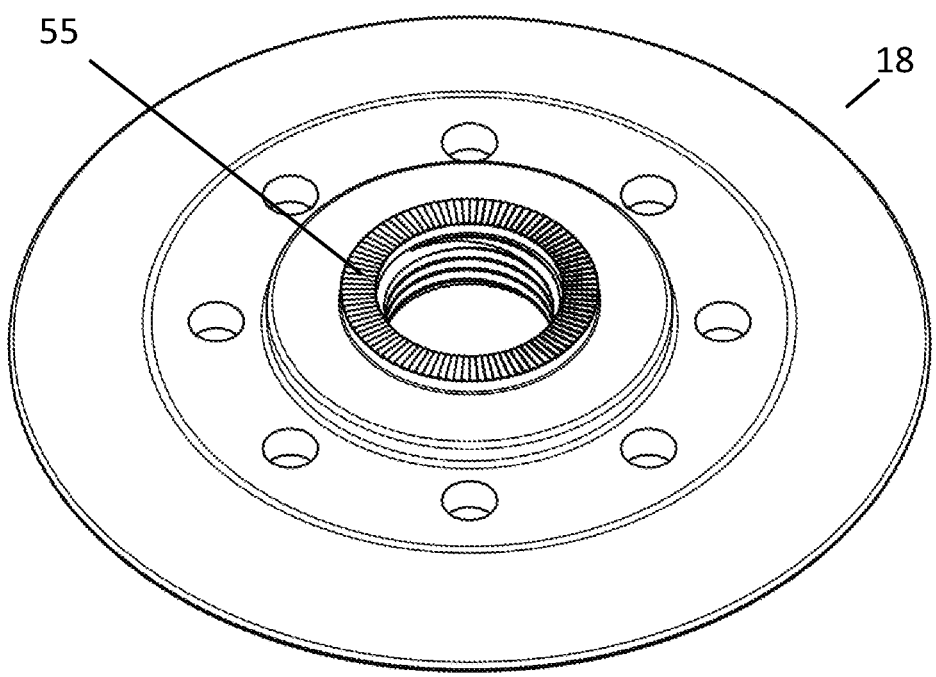

FIG. 151 shows a non-limiting example of a mount bottom with a locking feature in accordance with some embodiments of the present invention.

Figure 152:
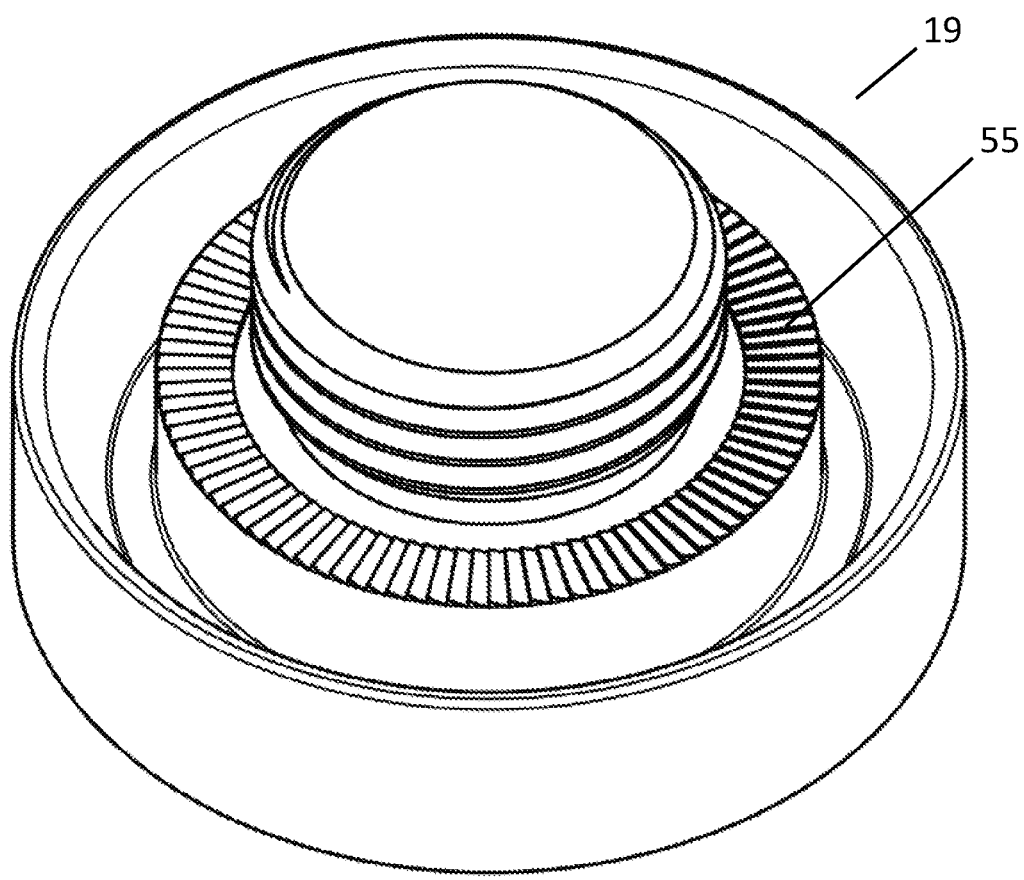

FIG. 152 shows a non-limiting example of mount top with a locking feature in accordance with some embodiments of the present invention.

Figure 153:
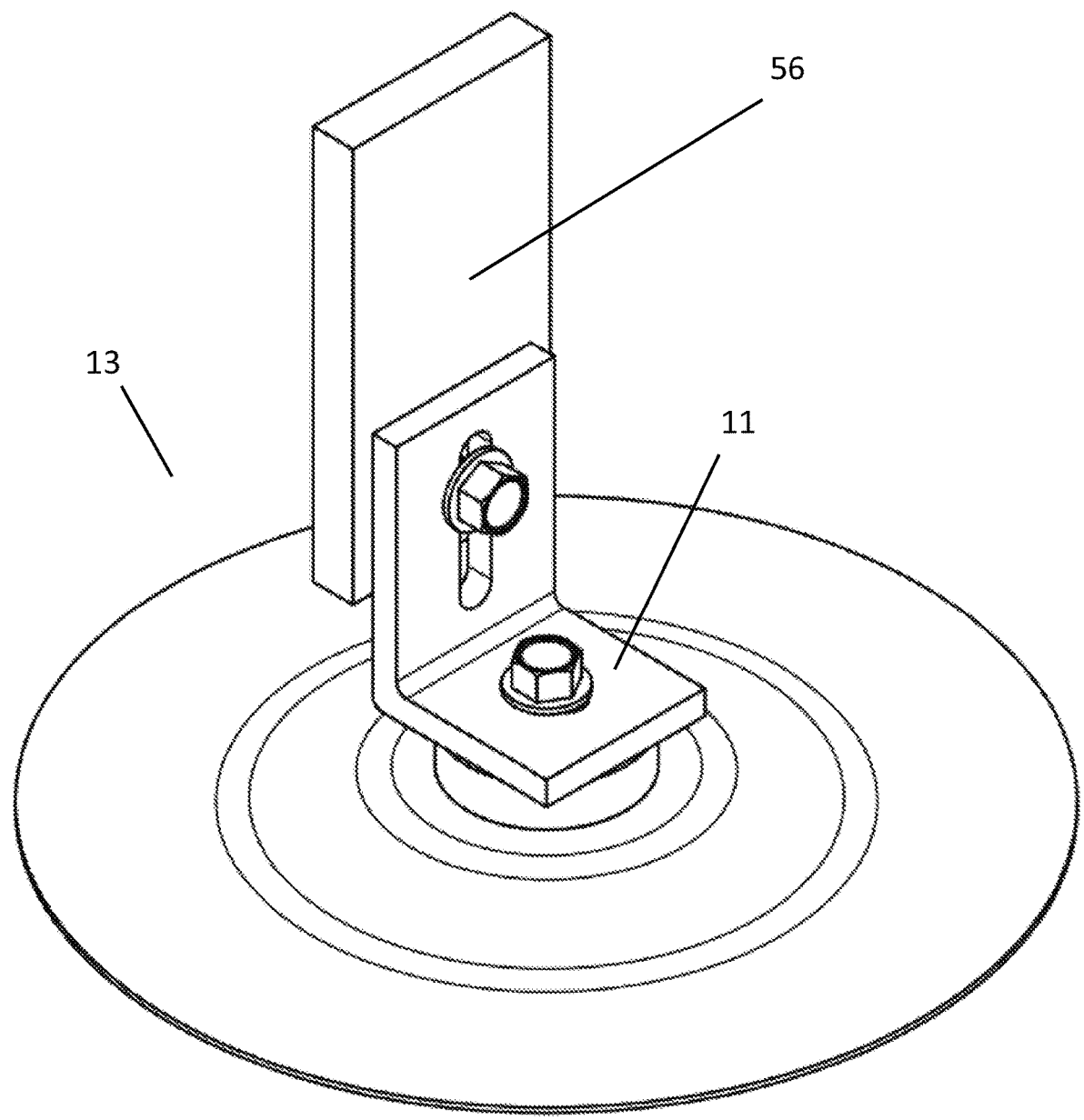

FIG. 153 shows a non-limiting example of mount attached to a component in accordance with some embodiments of the present invention.

DETAILED DESCRIPTION OF THE INVENTIONS

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may provide methods for attachment of materials comprising the steps of providing a roof mount; covering part of said roof mount with a cover; and perhaps even compressing a resilience constituent against said cover and said roof mount. Other embodiments may provide providing a roof mount having a top roof mount and a bottom roof mount; placing a cover over part of said bottom roof mount; attaching said top roof mount to said bottom roof mount; and perhaps even compressing an elastic substance against said cover during said step of attaching said top roof mount to said bottom roof mount. In addition, embodiments of the present invention may provide a rigid emplacement configuration comprising a roof mount having a top roof mount and a bottom roof mount; a cover configured to cover part of said bottom roof mount; and perhaps even a resilience constituent configured to compress when said top roof mount is attached to said bottom roof mount. Embodiments of the present invention may provide a rigid emplacement configuration comprising a roof mount; a cover configured to cover part of roof mount; and perhaps even a resilience constituent configured to compress against said cover and said roof mount.

A mount may be an emplacement configuration which may attach a component to a material such as but not limited to a flat surface, a surface, a roof, a deck, or the like. In one non-limiting example, a roof mount (13) may be placed and even attached to a roof (3). A cover (16) may be placed on part of a roof mount and a resilience constituent (23) may be compressed against a cover and a roof mount. A mount, such as a roof mount, may be any design that can be attached to a surface.

Embodiments of the present invention may provide a rigid mount perhaps with a resilience constituent attachment of a cover. A resilience constituent (23) may have an ability to be compressed, may have an ability to return to its original shape after compression, and may even be a rigid material. In some embodiments, a resilience constituent may not be non-rigid. A resilience constituent (23) may be a spring seal, a cover spring, or the like. In some embodiments, a resilience constituent may be a ring, a flexible ring, or the like as discussed herein. A resilience constituent with a cover may allow for reliable water intrusion barrier. Cover dimensional changes may be compensated perhaps by compression of a resilience constituent perhaps so that a reliable long-term water intrusion barrier may result. In some embodiments, the present invention may provide sealing of a cover against part of a roof mount perhaps with a resilience constituent. Compression of a resilience constituent may allow for varying cover thicknesses. Pressure may be applied to a resilience constituent perhaps to form a rigid mount.

A rigid connection between an attachment structure and a mount base may allow for reduced additional attachment structures. It also may allow for less mounts. A rigid connection may not have non-rigid materials between an attachment structure and a mount base. In embodiments, the present invention may allow more independence between a cover water intrusion and even an attachment of an attachment structure.

Embodiments of the present invention may provide that a resilience constituent may be made of a material including, but not limited to, metal, stainless steel, hard plastic, hard reinforced plastic, hard polymer, hard reinforced polymer, any combination thereof, or the like. In some embodiments, a resilience constituent may not be an elastomer such as rubber or the like. A resilience constituent may have a flexural modulus greater than about 0.5 GPa (gigapascals) for polymers and perhaps even a modulus of elasticity greater than about 20 GPa (gigapascals) for metals. Of course, any amount may be used. A resilience constituent may be coated with a coating such as but not limited to an elastomer or the like.

In the past, low-profile mounts may have one or more non-rigid covers or other non-rigid materials between an attachment structure and a mount base which may reduce mount reliability and rigidity.

Embodiments of the present invention may provide that a mount base can be attached to a substrate which may be, but is not limited to a roof, wall, slab, or any other attachment structure that needs a mount.

A substrate may be, but is not limited to, a roof membrane, built up roof, a liquid applied coating, acrylic, or any other roof water proofing material. A water proofing layer may include all methods of water proofing a substrate. If the substrate may already be water proof or if water proofing may not be required, a mount base can be directly attached to a substrate. Waterproof may include water resistant.

If liquid penetration may need to be restricted under a cover, the cover may be attached using an adhesive. An adhesive may be, but is not limited to, an epoxy, adhesive tape, sealant, butyl, petroleum or coal product, polymer or any other type of adhesive. Adhesive may refer to heat welding a cover perhaps to a water proof layer. An adhesive may be any method of attaching a cover to a substrate or even a water proofing layer.

A cover may be, but is not limited to a membrane, a liquid applied coating, asphalt, modified asphalt, or any other water proof material, or the like. A cover may be a ring, flexible ring, or the like. A membrane may be, but is not limited to TPO, PVC, EPDM, or any other type of roof membrane, or the like. A membrane may be reinforced or may even be non-reinforced. A liquid applied coating may be but is not limited to silicone, acrylic, urethane, or any other liquid coating, or the like. Asphalt may be but is not limited to BUR, Bitumen, Modified Bitumen, Tar, felt, or any other asphalt type material, or the like. Reinforced fabric or even fiber may be used on liquid applied coatings. For asphalt type roofs and even applied coatings, fabric or even fiber reinforcement may be used.

A sealant may be added perhaps to help liquid penetration. A sealant may be, but is not limited to silicone, urethane, latex, acrylic, polymer, butyl, solid or foam elastomer or any other type of sealant, or the like. The term sealant or seal may cover all sealants. An elastomer may be, but is not limited to a washer, O-ring, or any other shape, or the like. An elastomer may have PSA or even an adhesive layer perhaps on at least one surface.

Various fasteners may be used to attach materials to a mount. Fasteners may include, but is not limited to bolts, studs, threaded rods, nuts, or the like. Any fastener or combination of fasteners may be used in the various embodiments of the present invention. A threaded hole could be a threaded stud or any other type of attachment, or the like. An attachment structure may be a bracket, L-bracket, stanchion, an attachment part of a component, any structure which may be attached to a mount, any combination thereof, or the like.

Figure 1:
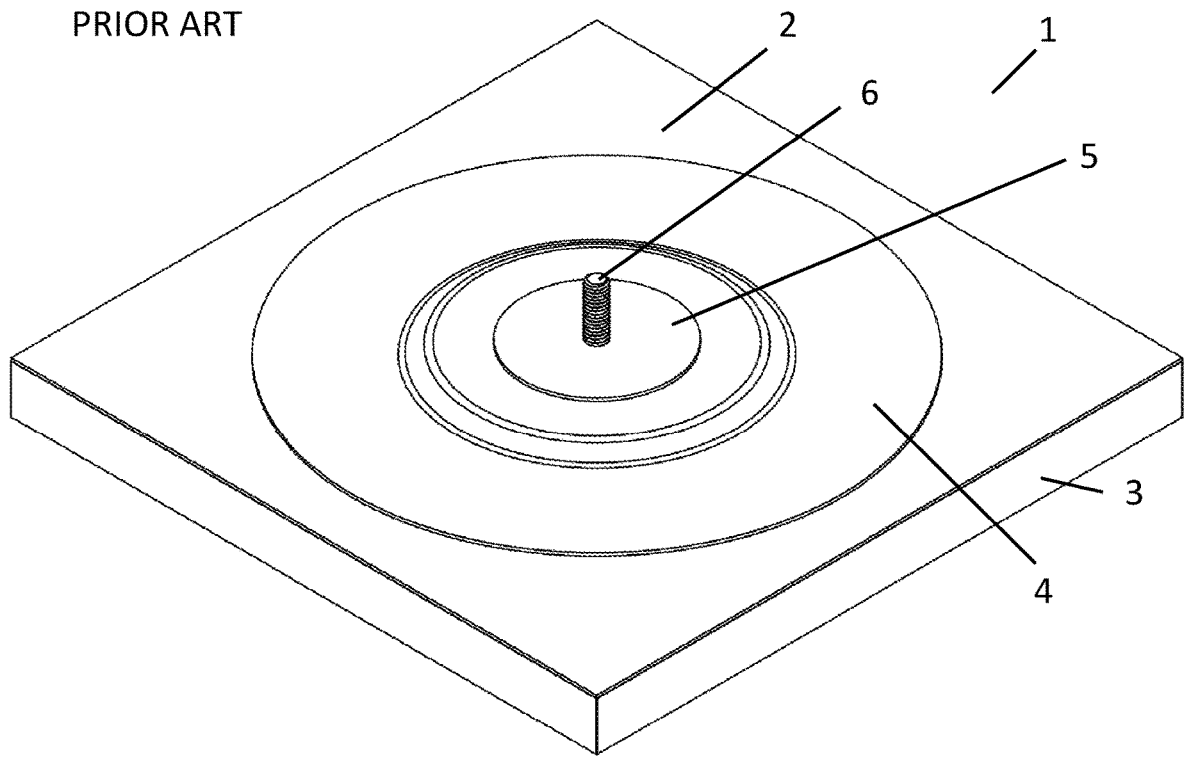
FIG. 1 shows a non-limiting example of a prior art mount.
Figure 2:
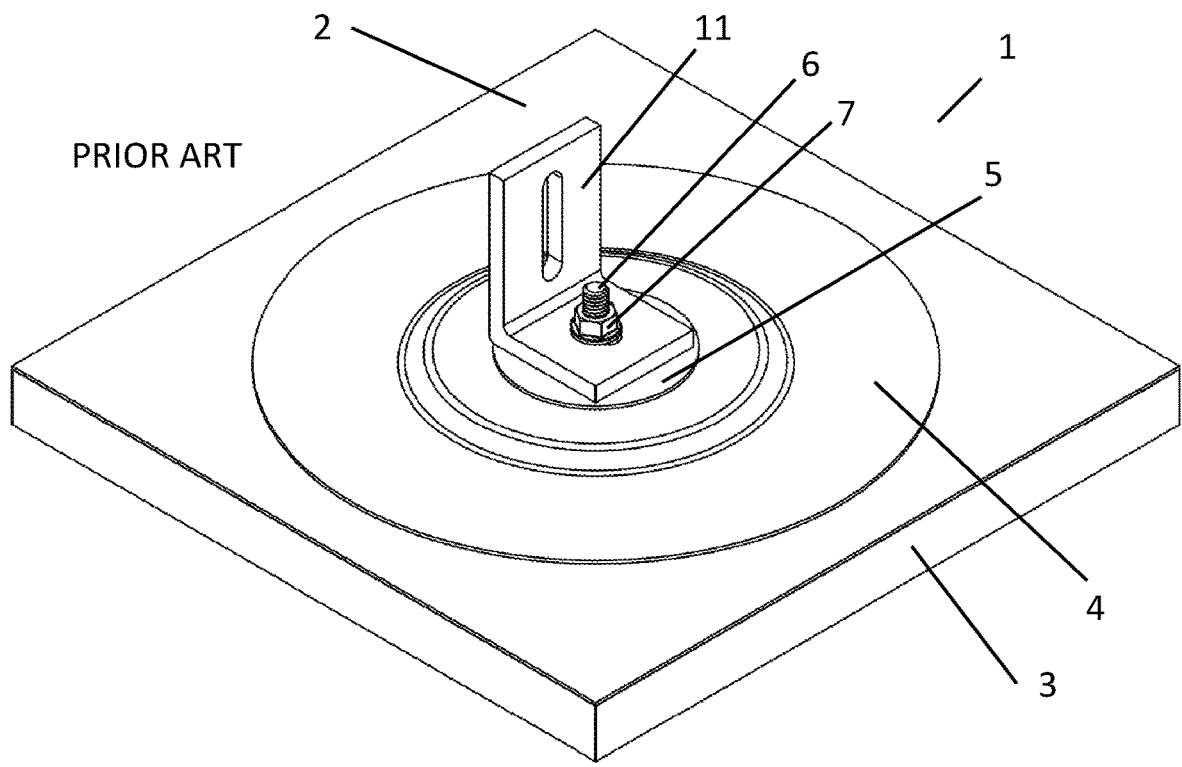
FIG. 2 shows a non-limiting example of a prior art mount attached to a roof with an attachment structure.
Figure 3:
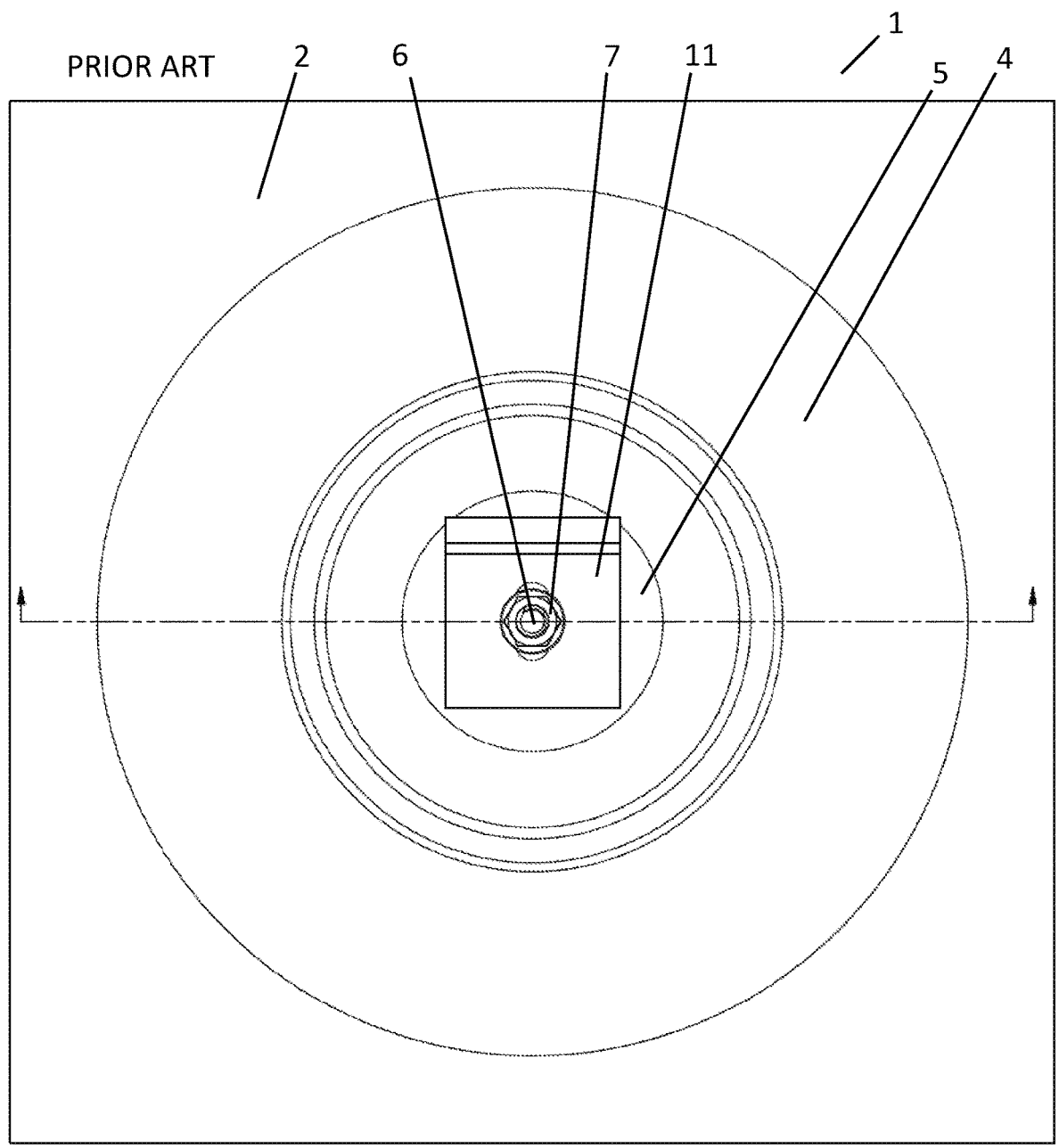
FIG. 3 shows a non-limiting example of a prior art mount using non-rigid materials.
Figure 4:
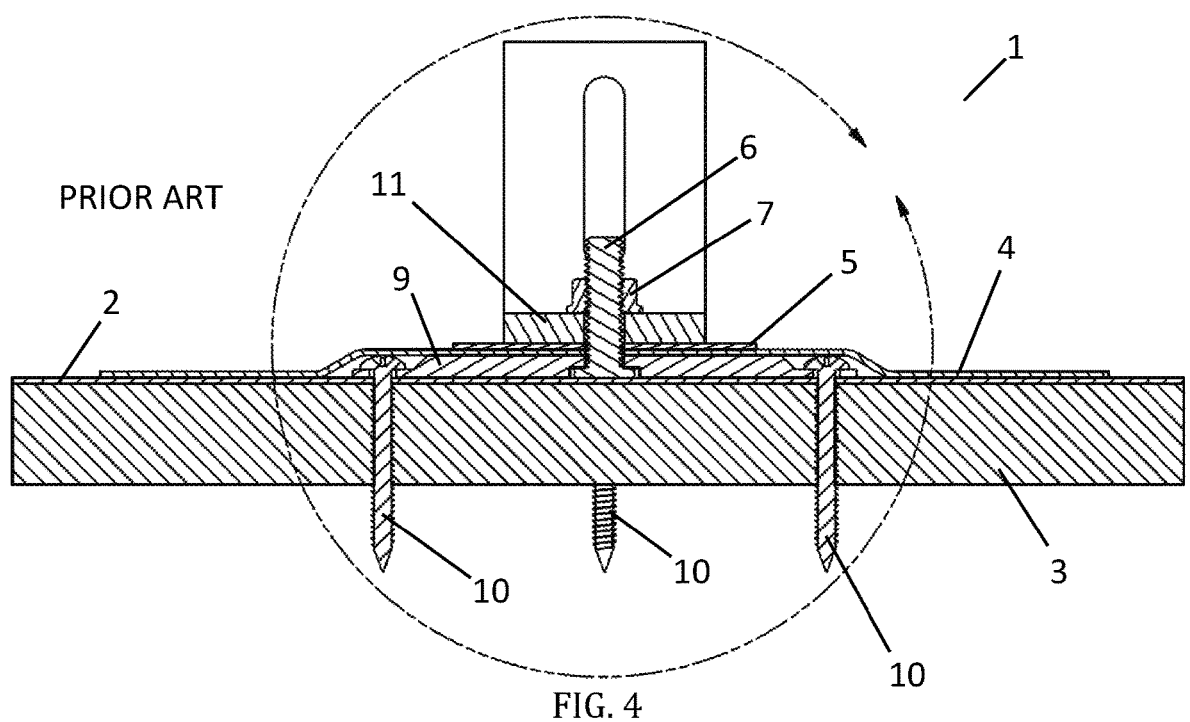
FIG. 4 shows a non-limiting example of a prior art mount.
Figure 5:
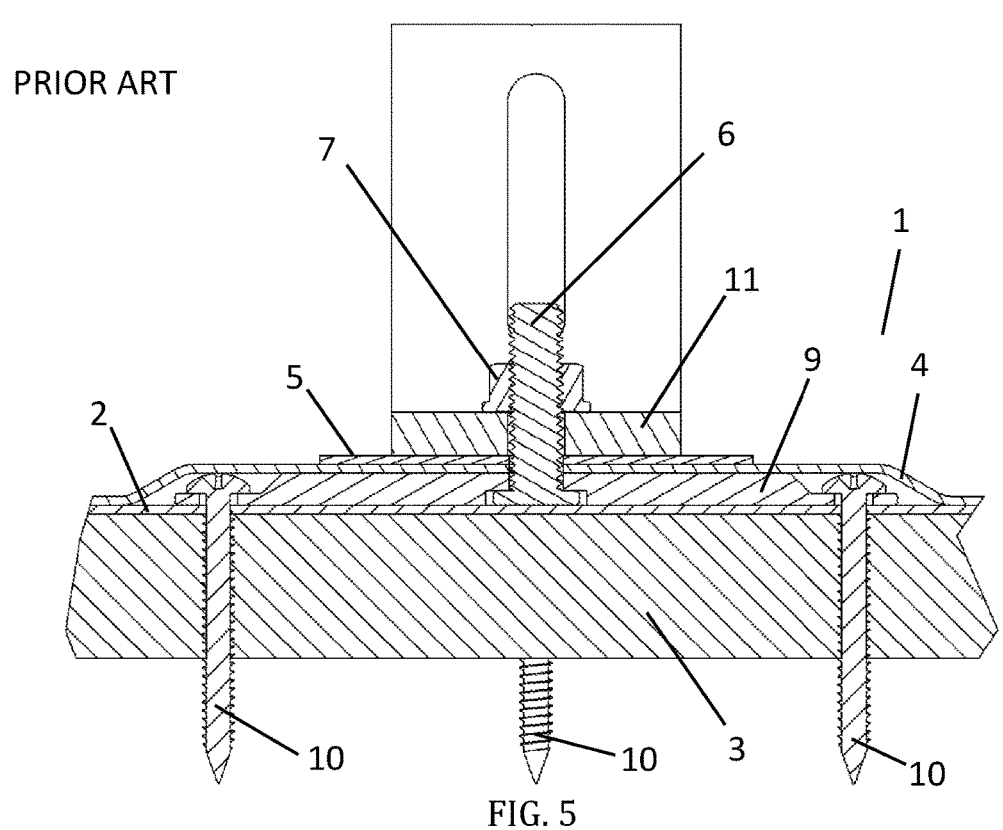
FIG. 5 shows a non-limiting example of a prior art mount with an additional layer and an attachment structure.
Figure 6:
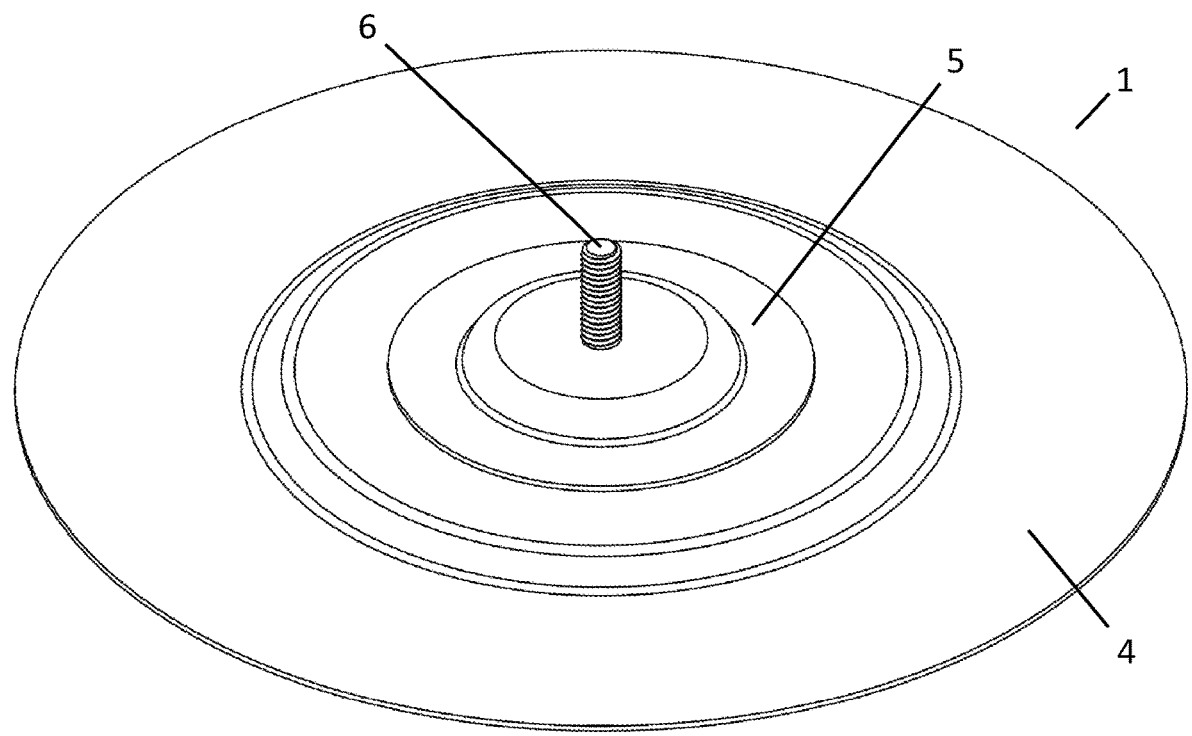
FIG. 6 shows a non-limiting example of a prior art cover.
Figure 7:
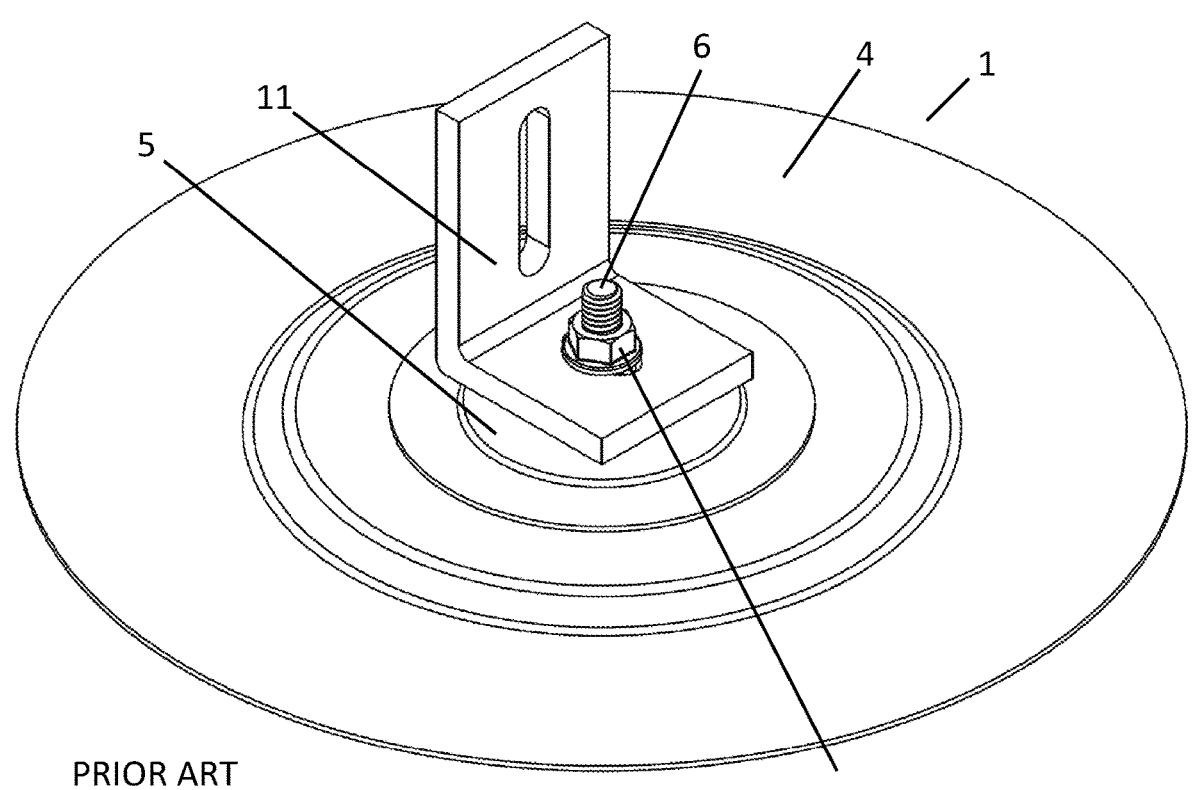
FIG. 7 shows a non-limiting example of a prior art mount with a cover and attachment structure.
Figure 8:
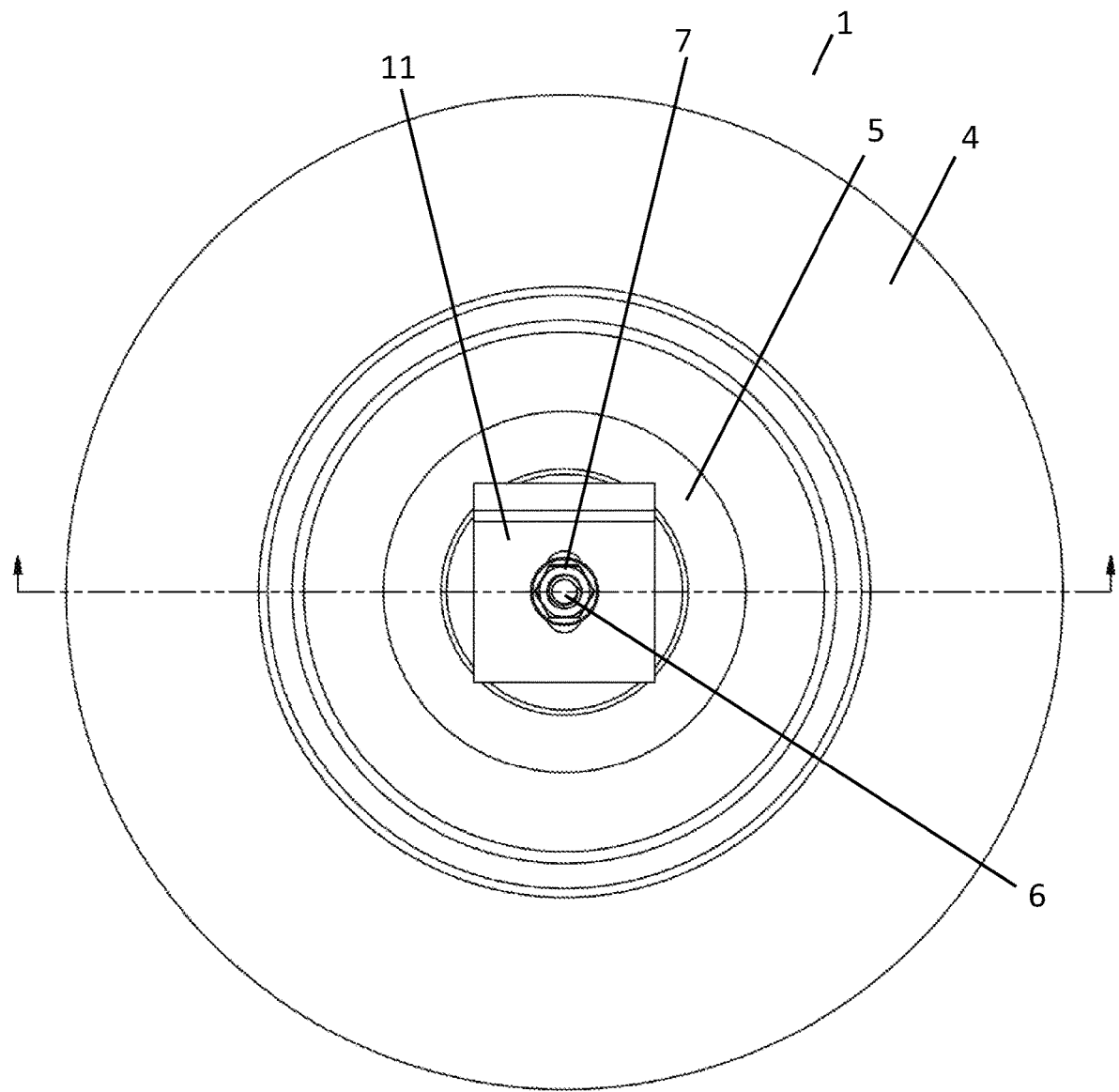
FIG. 8 shows non-limiting example of a prior art mount.
Figure 9:
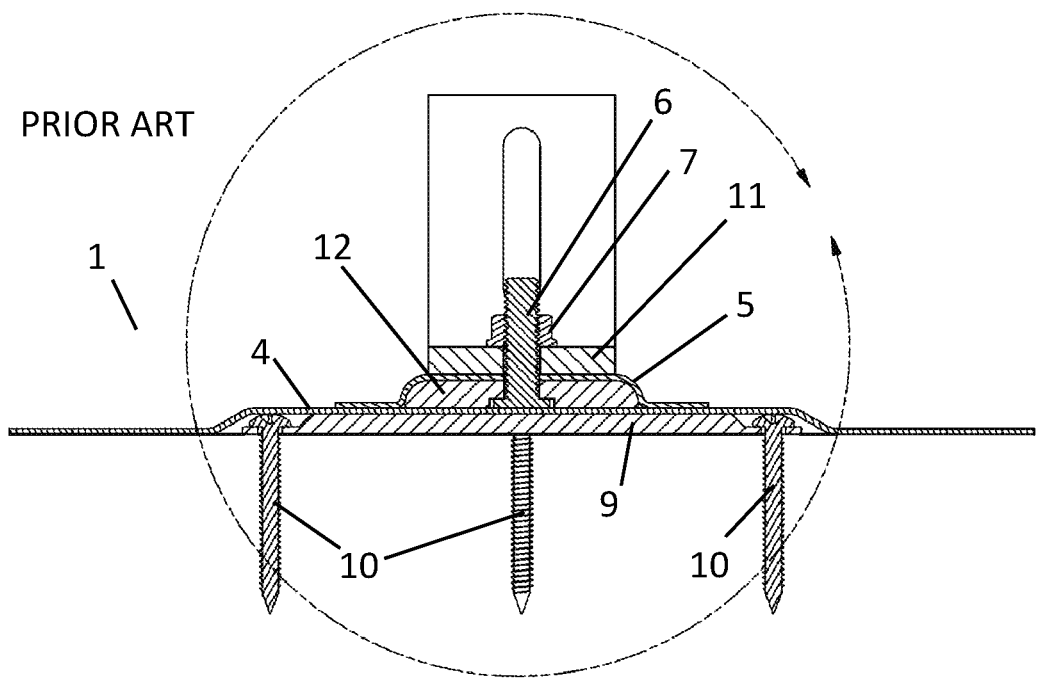
FIG. 9 shows a non-limiting example of a prior art of a mount on a roof.
Figure 10:
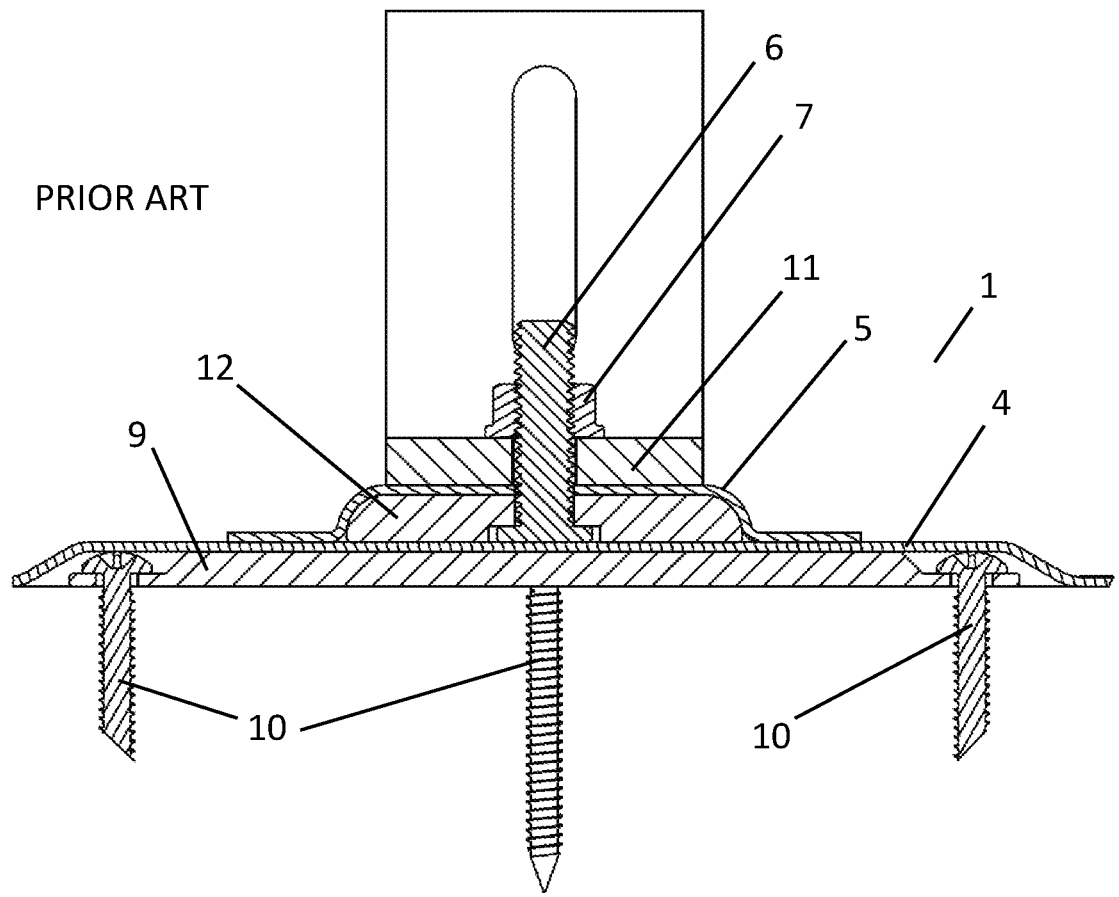
FIG. 10 shows a non-limiting example of prior art mount.
Figure 11:
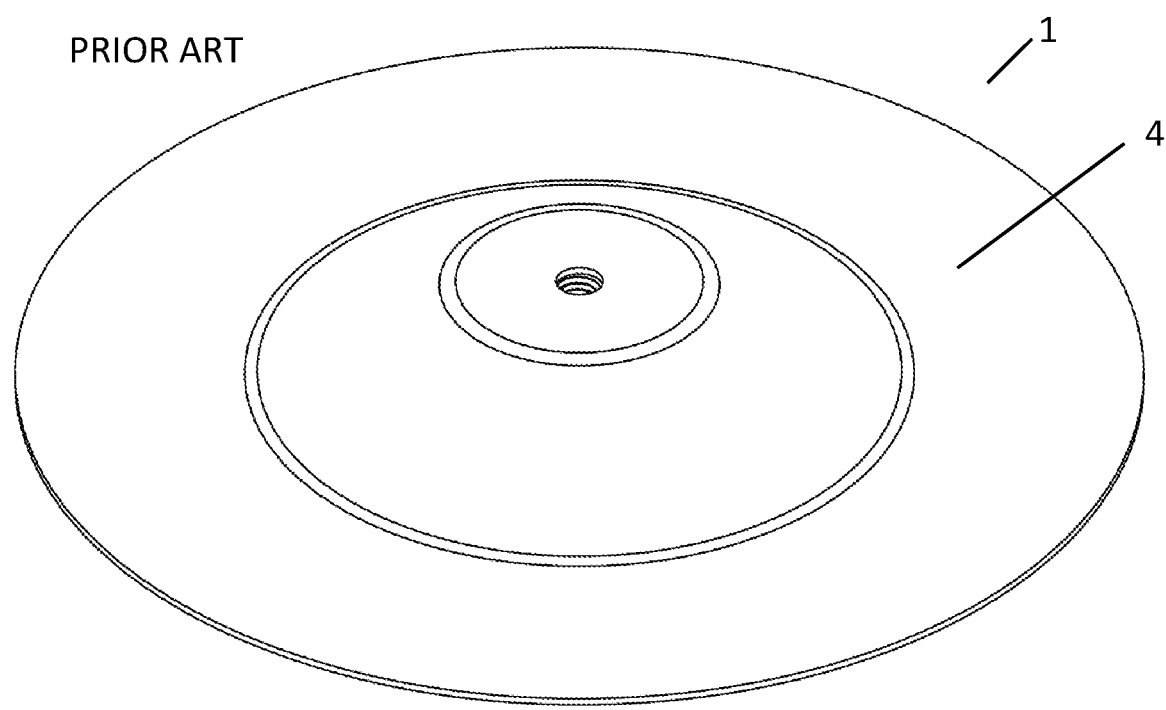
FIG. 11 shows a non-limiting example of a prior art cover.
Figure 12:
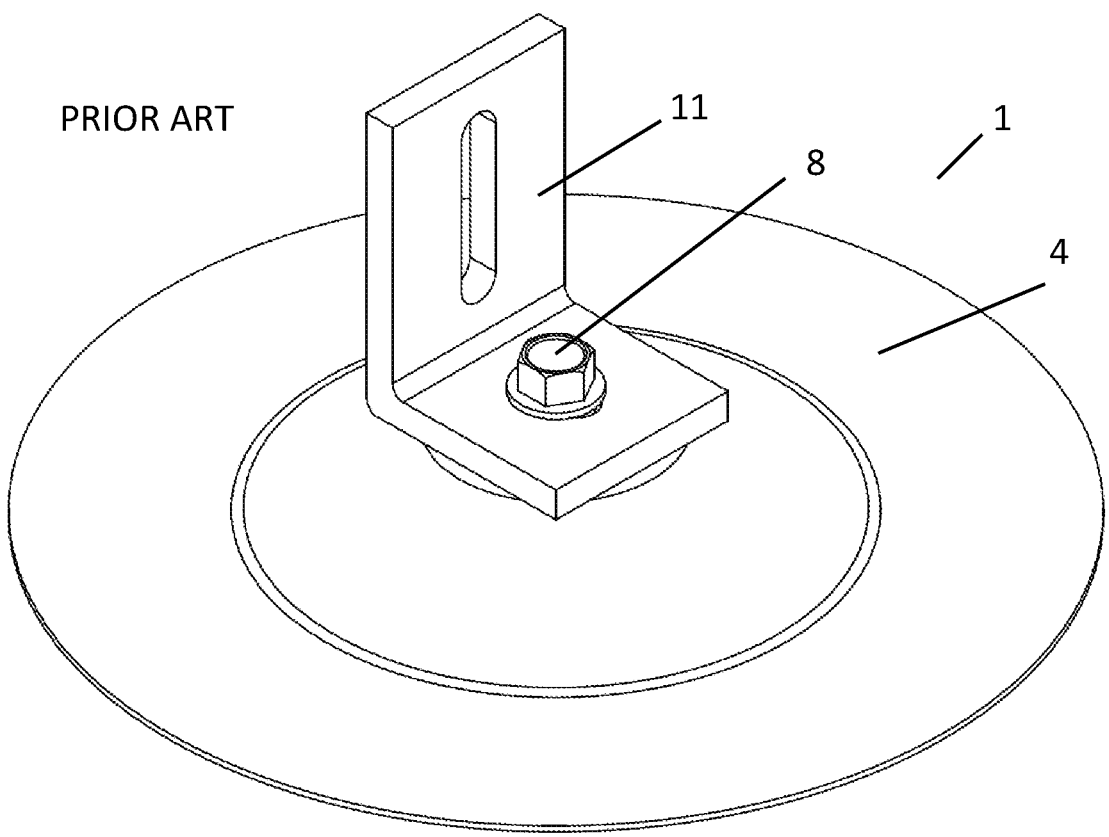
FIG. 12 shows a non-limiting example of a prior art cover attached to an attachment structure.
Figure 13:
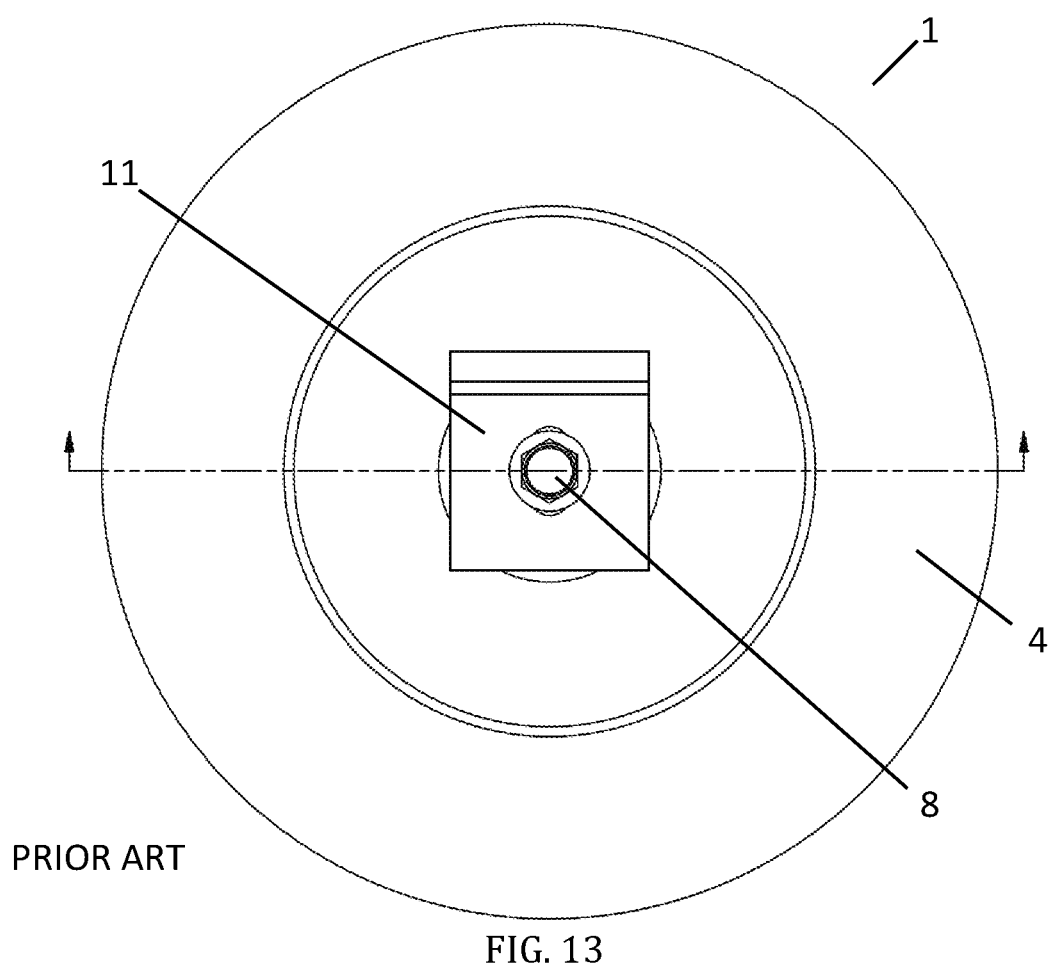
FIG. 13 shows a non-limiting example of a prior art cover.
Figure 14:
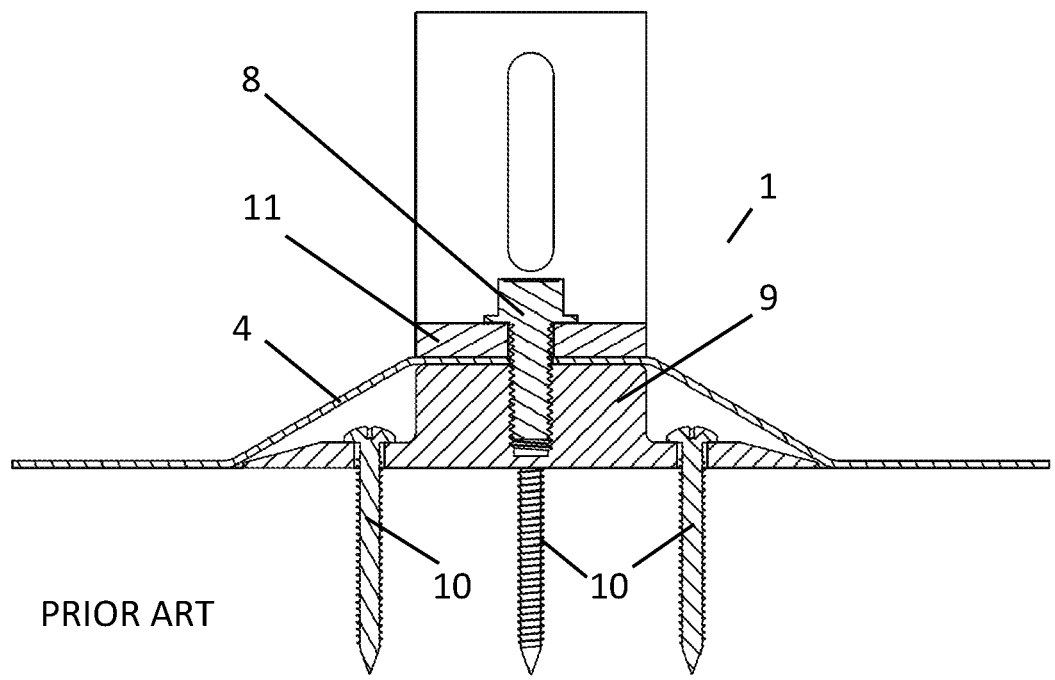
FIG. 14 shows a non-limiting example of a prior art mount.
Figure 15:
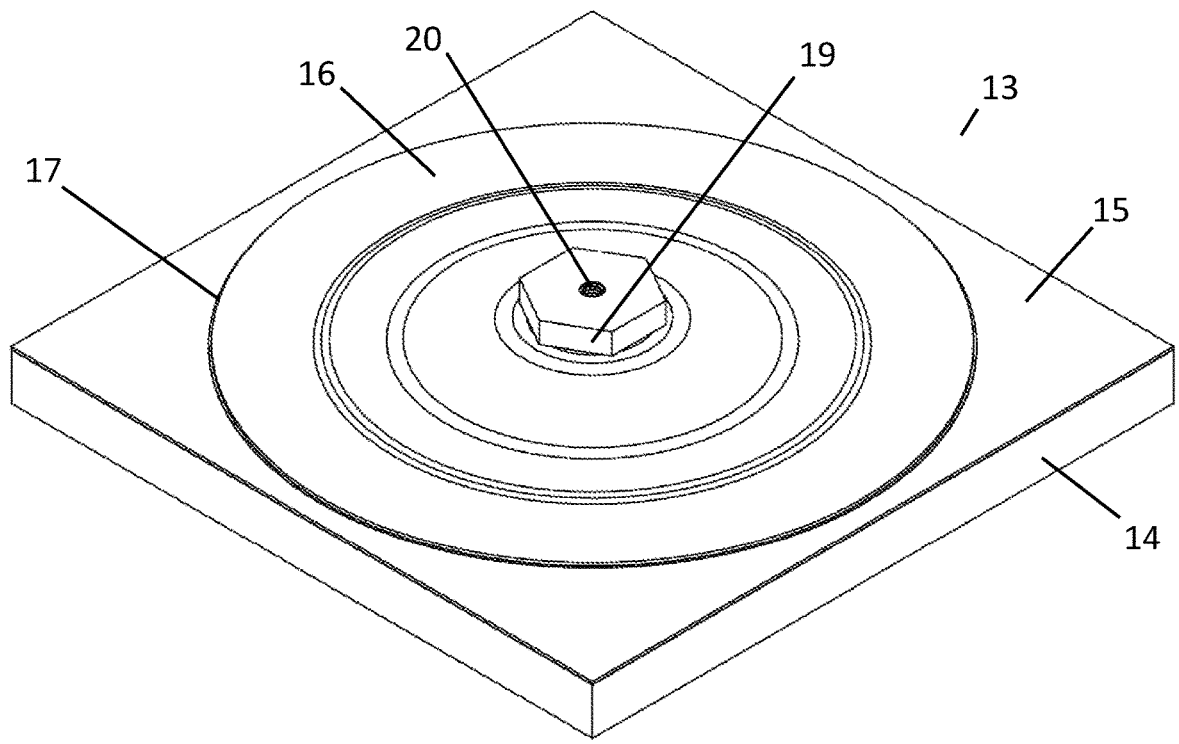
FIG. 15 shows a non-limiting example of a roof mount attached to a substrate in accordance with some embodiments of the present invention.
Figure 100:
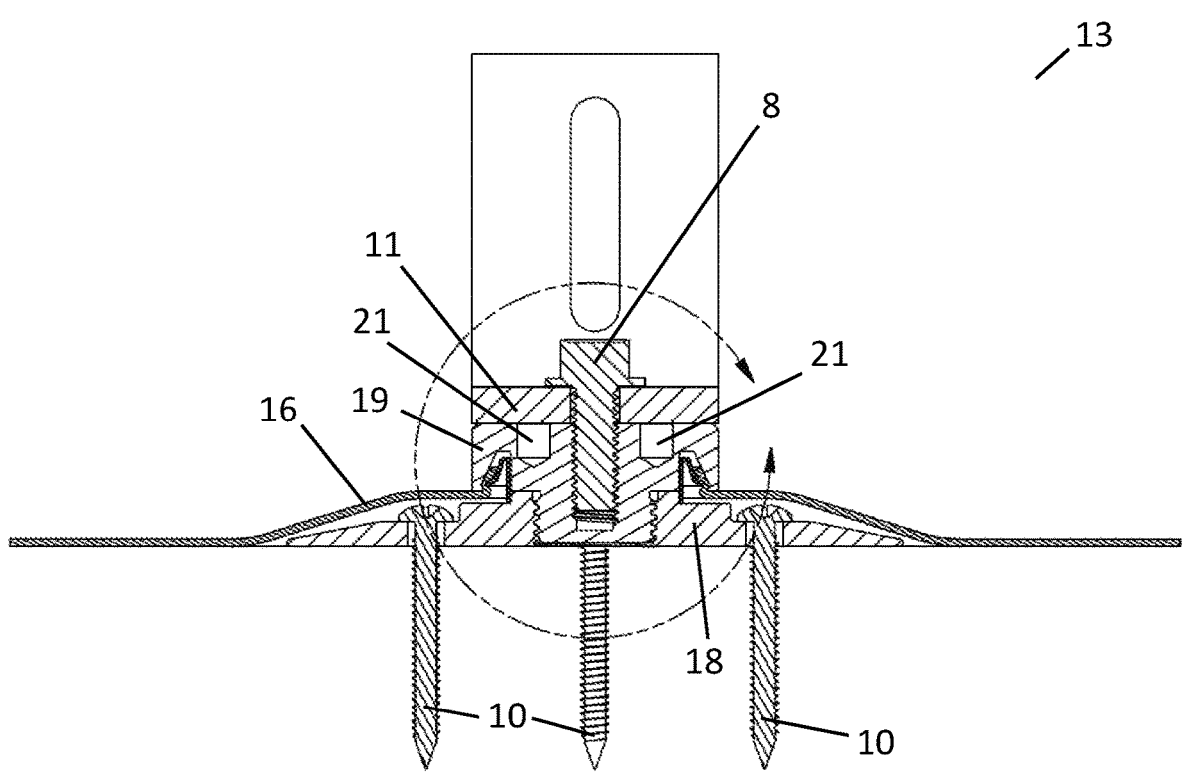
FIG. 100 shows a non-limiting example of a cross-sectional view of FIG. 99 in accordance with some embodiments of the present invention.

FIGS. 15-100 show non-limiting examples of various types of rigid cover mounts perhaps some with deformed cover mounts.

Figure 16:
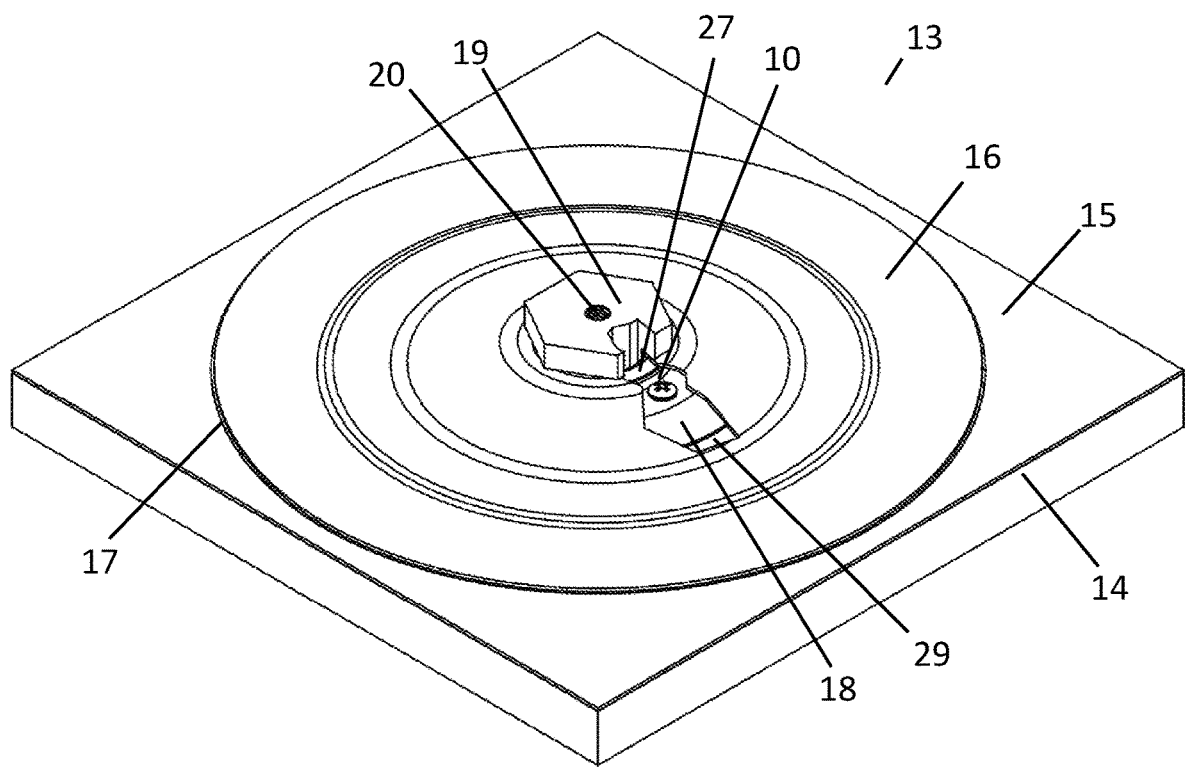
FIG. 16 shows a non-limiting example of a roof mount as shown in FIG. 15 with a section removed in accordance with some embodiments of the present invention.
Figure 17:
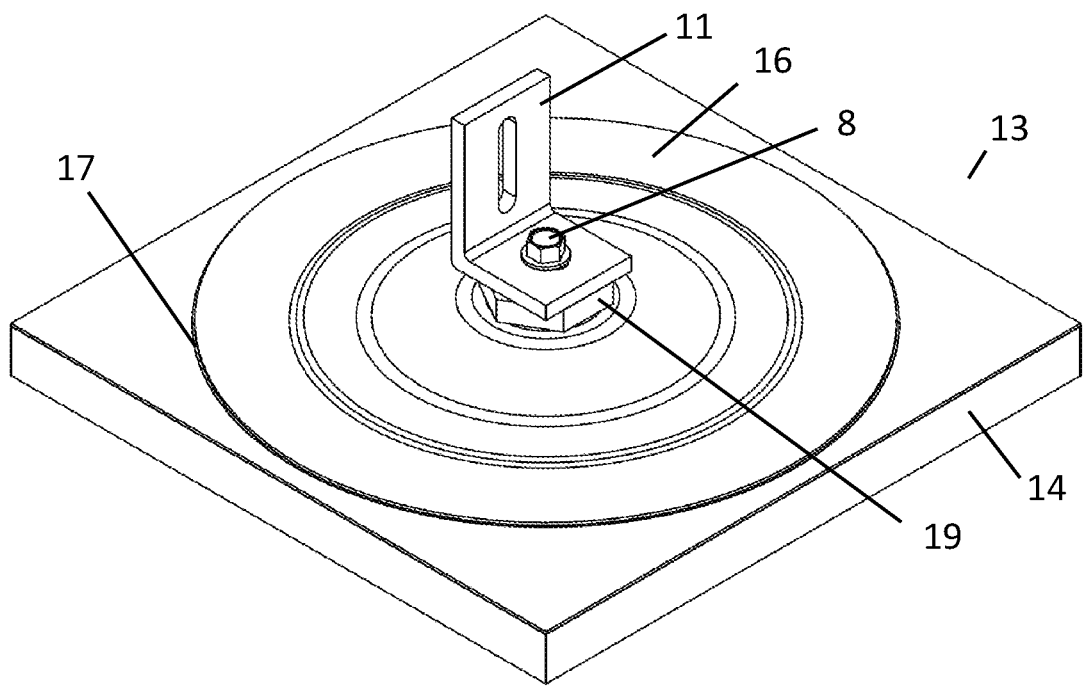
FIG. 17 shows a non-limiting example of a mount with an attachment structure attached with a bolt in accordance with some embodiments of the present invention.

FIGS. 15-30 and FIG. 138 shows a non-limiting example of a mount (13) attached to a substrate (14) and an attachment structure (11) attached to a mount (13). FIGS. 15 and 16 show a non-limiting example of a mount (13) attached to a substrate (14) perhaps with screws (10) through a mount base (18). A mount (13) may have a top roof mount (19) which may be a mount top and a bottom roof mount (18) which may be a mount base. FIG. 16 is the same as FIG. 15 perhaps except there is a section removed from the mount top (19) and a cover (16) so the components underneath may be viewed. FIG. 17 is the same as FIG. 15 except an attachment structure (11) may be attached with a bolt (8) to a mount top (19). In some embodiments, the present invention may provide a top roof mount, a bottom roof mount, and even an elastic substance. An elastic substance may be an elastomer, such as rubber or the like, and may be compressed against a cover perhaps during attachment of a top roof mount to a bottom roof mount which may secure the mount.

Figure 18:
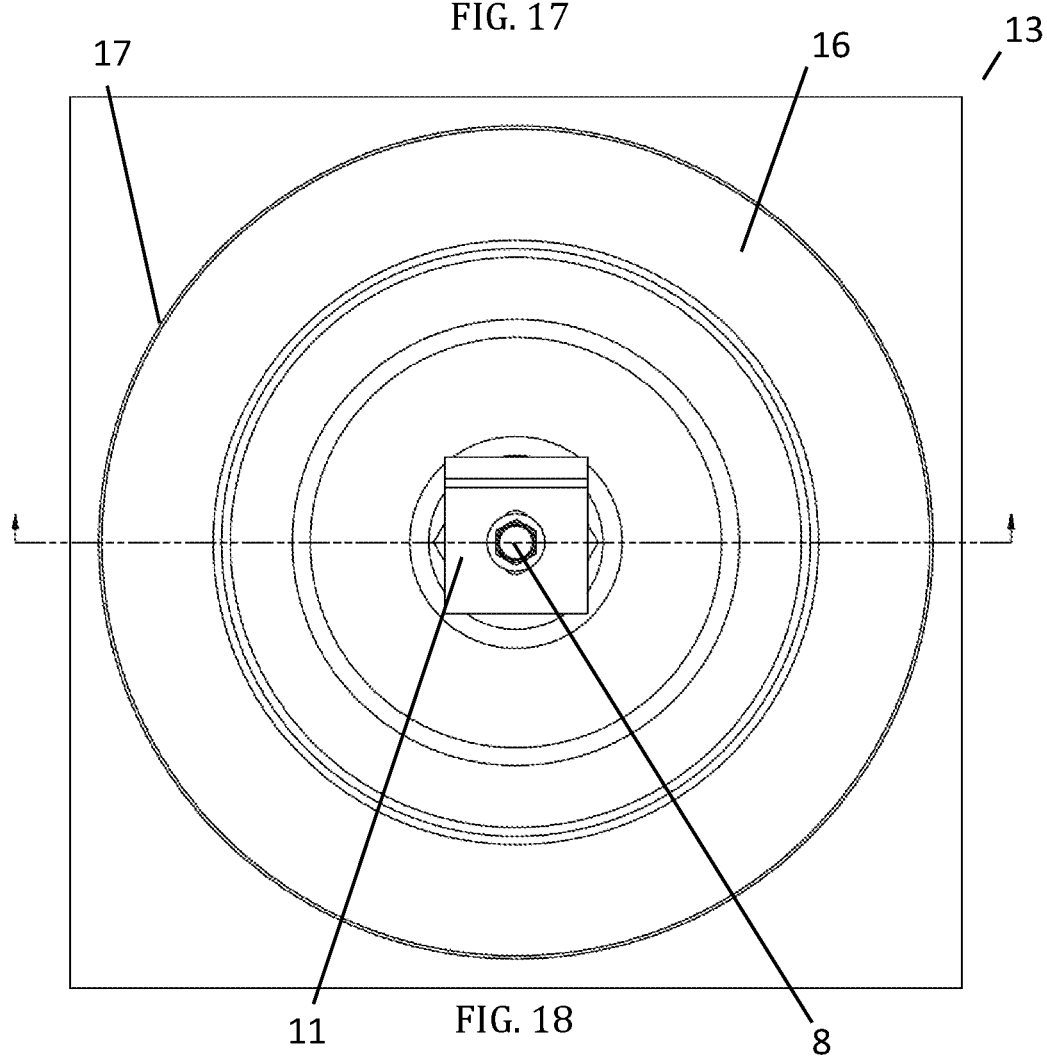
FIG. 18 shows a non-limiting example of a top view of FIG. 17 in accordance with some embodiments of the present invention.
Figure 19:
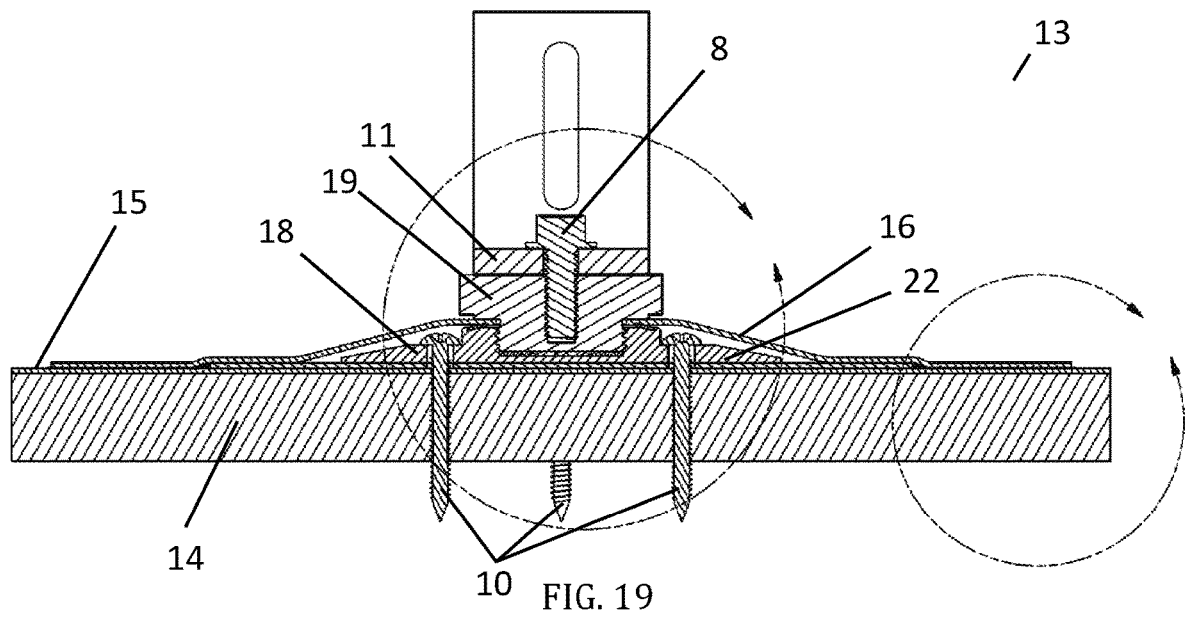
FIG. 19 shows a non-limiting example of cross-sectional view of FIG. 18 in accordance with some embodiments of the present invention.
Figure 20:
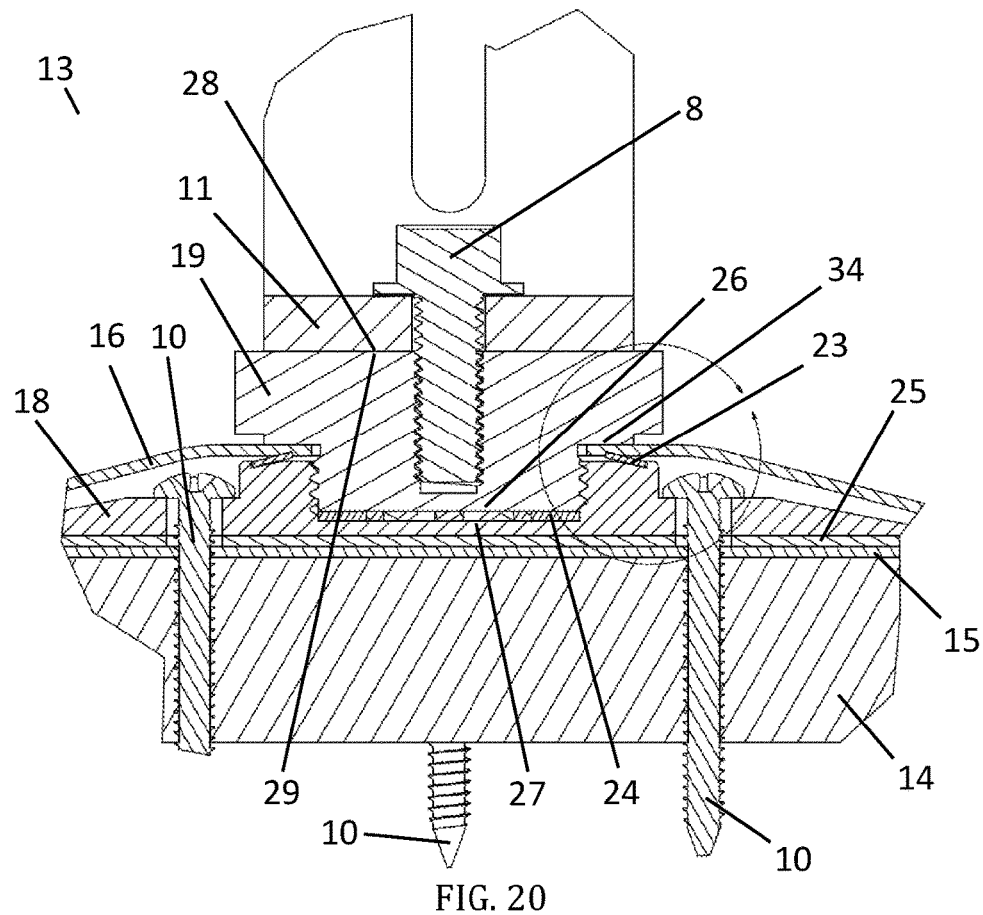
FIG. 20 shows a non-limiting example of an enlarged view of FIG. 19 in accordance with some embodiments of the present invention.
Figure 21:
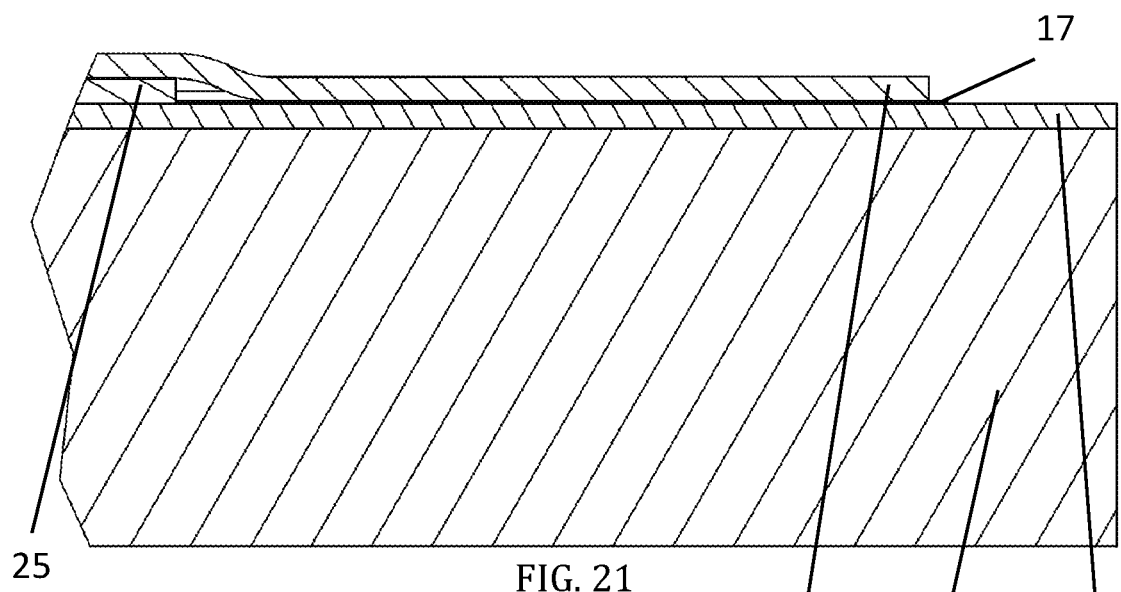
FIG. 21 shows a non-limiting example of an enlarged view of FIG. 19 in accordance with some embodiments of the present invention.
Figure 22:
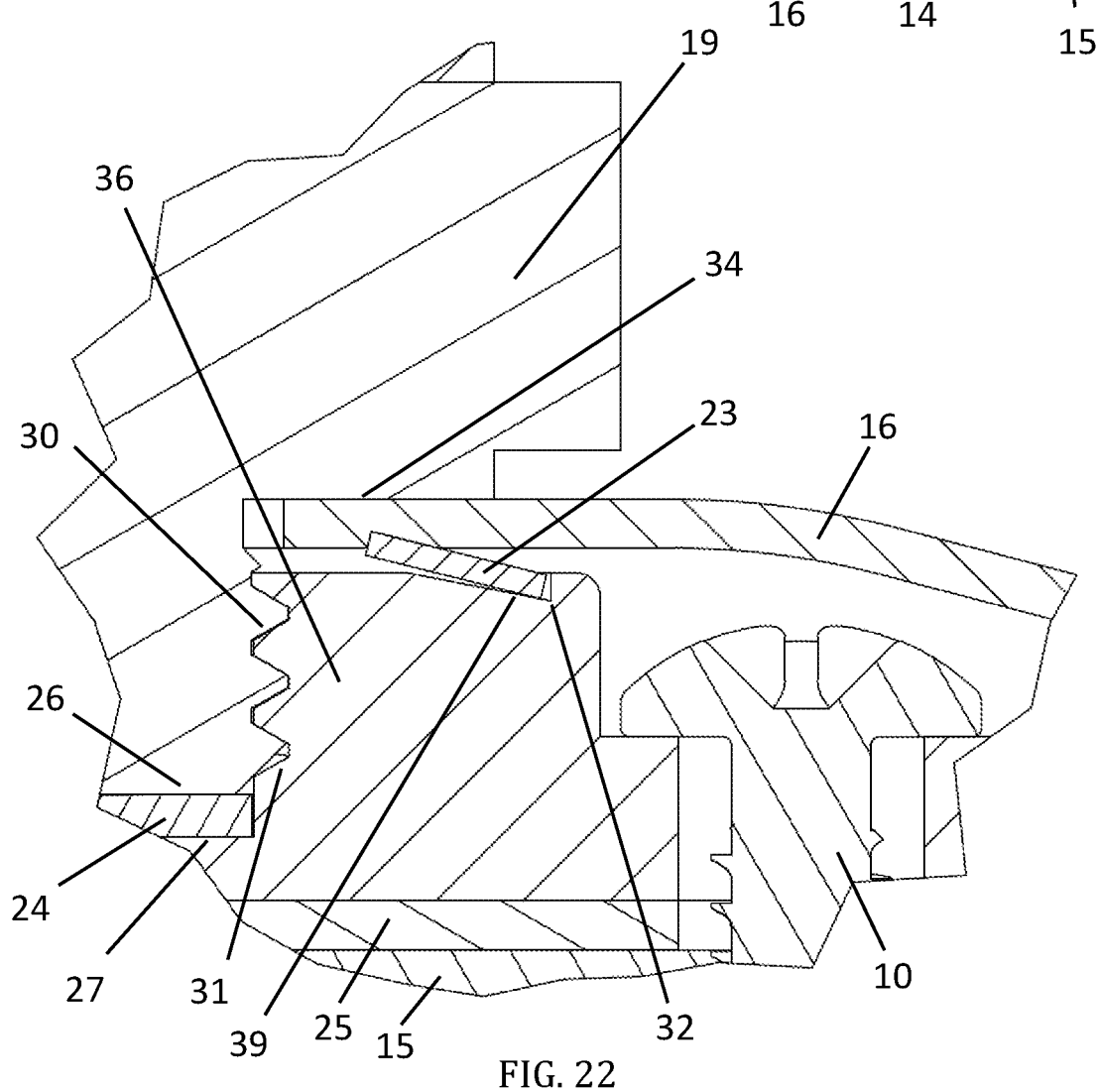
FIG. 22 shows a non-limiting example of an enlarged view FIG. 20 in accordance with some embodiments of the present invention.

FIG. 18 shows a top view of FIG. 17 and FIG. 19 is a cross-sectional view of FIG. 18. FIGS. 20 and 21 show enlarged views of those shown in FIG. 19. FIG. 22 shows an enlarged view of FIG. 20. Embodiments of the present invention may provide placing a cover over part (22) of a bottom roof mount perhaps as understood in FIGS. 18, 19, attaching a top roof mount (19) to a bottom roof mount (18); and perhaps even compressing a resilience constituent against a cover during the step of attaching a top roof mount to a bottom roof mount. A resilience constituent may contact on a top or even a bottom of a cover. A compressed and non-compressed resilience constituent may be understood in the non-limiting example in FIGS. 29 and 30. A bottom roof mount may be secured to a roof or other substrate perhaps with screws (10) and screw holes (33) or the like as discussed herein.

Figure 23:
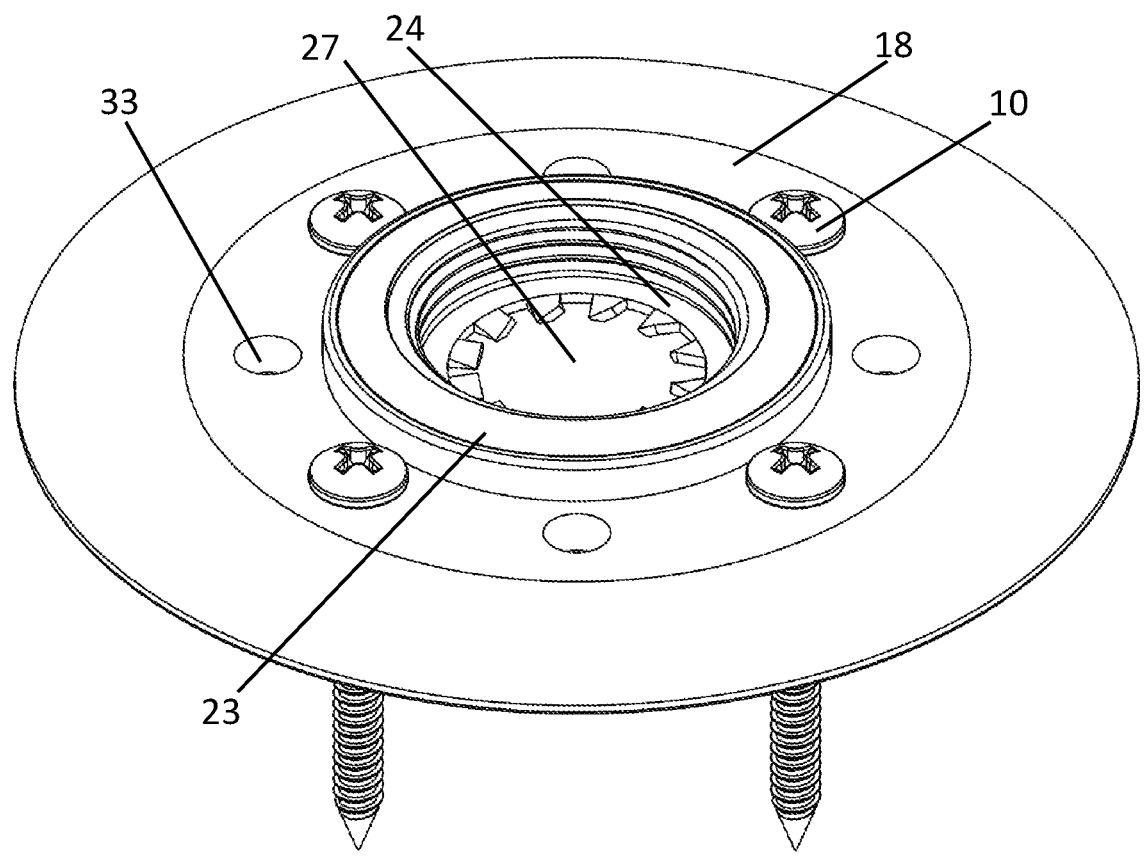
FIG. 23 shows a non-limiting example of a mount base with a lock washer in a frame in accordance with some embodiments of the present invention.

FIG. 23 show a non-limiting example of an assembly of a mount base (18) perhaps with a lock washer (24). A mount base may have screws (10) and even mount base screw holes (43). Screws (10) may attach a mount base (18) on a substrate (14) perhaps as shown in FIGS. 16, 19, and 20.

Figure 24:
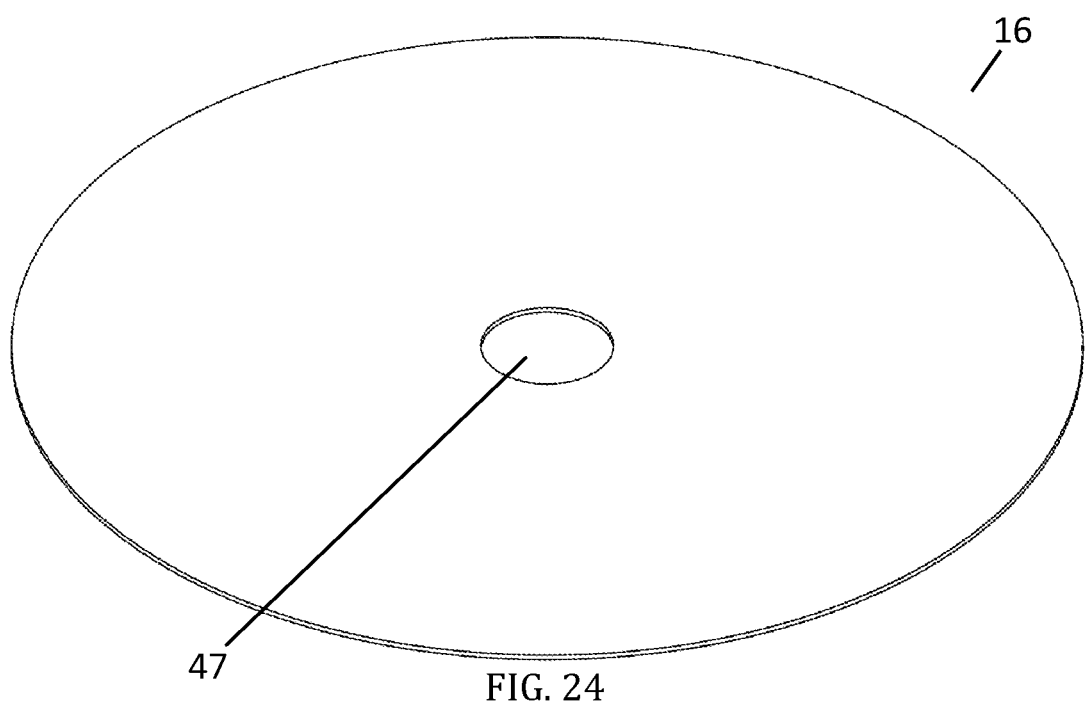
FIG. 24 shows a non-limiting example of a cover in accordance with some embodiments of the present invention.
Figure 25:
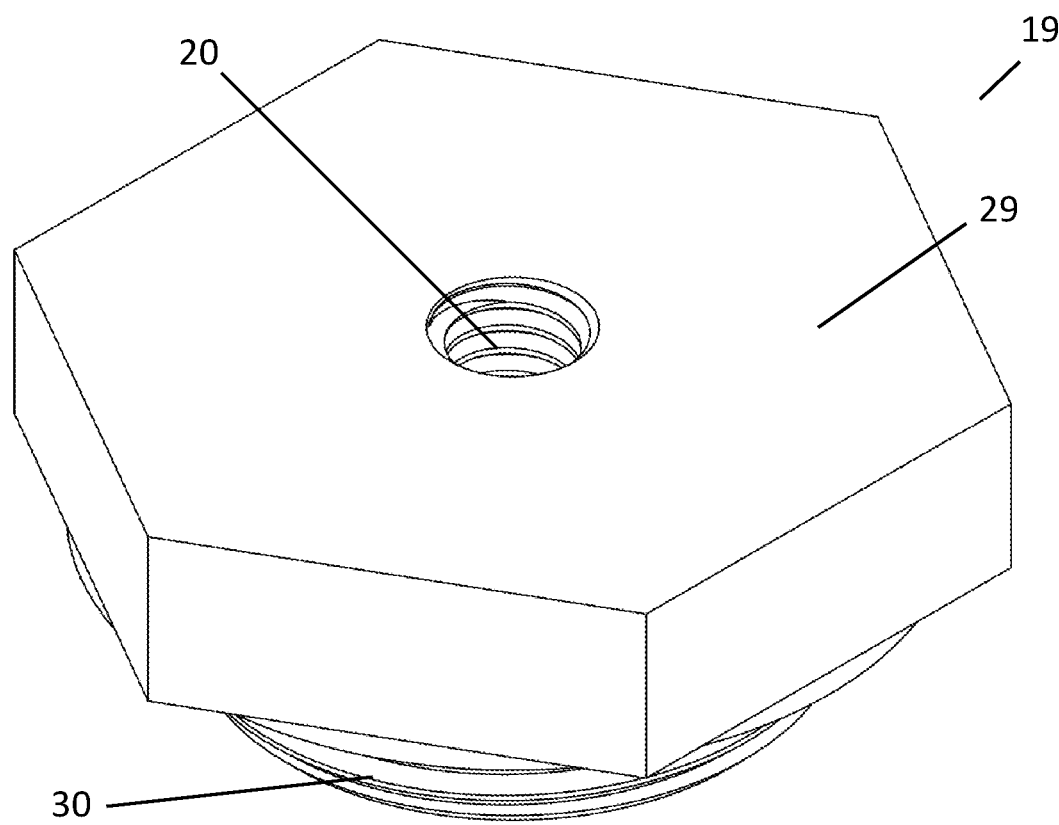
FIG. 25 shows a non-limiting example of a mount base in accordance with some embodiments of the present invention.
Figure 26:
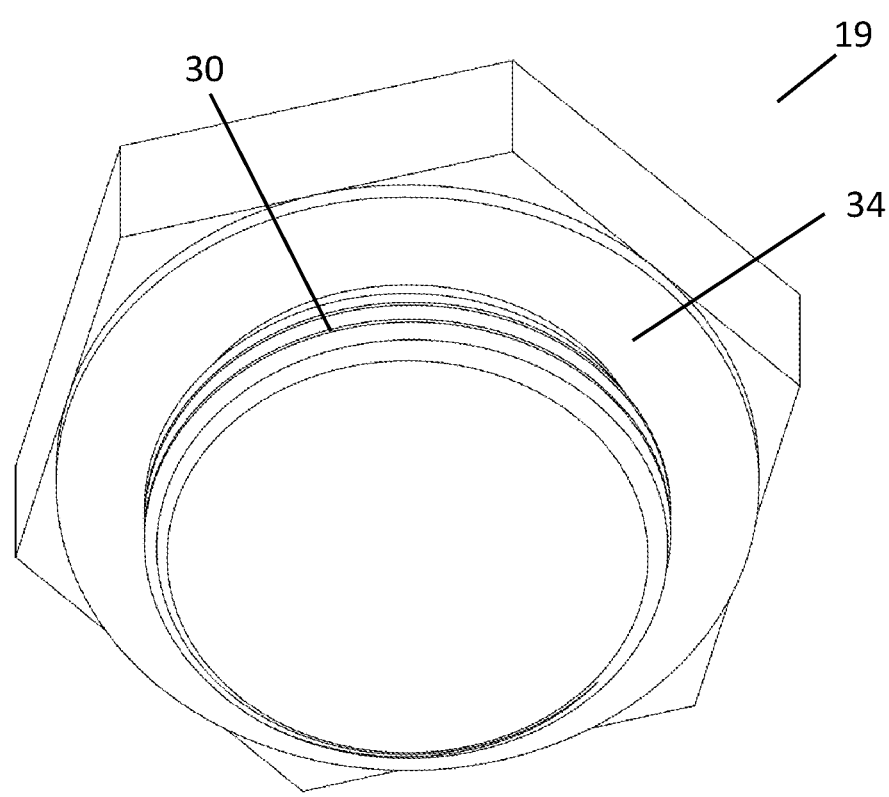
FIG. 26 shows a non-limiting example of a mount base in accordance with some embodiments of the present invention.
Figure 27:
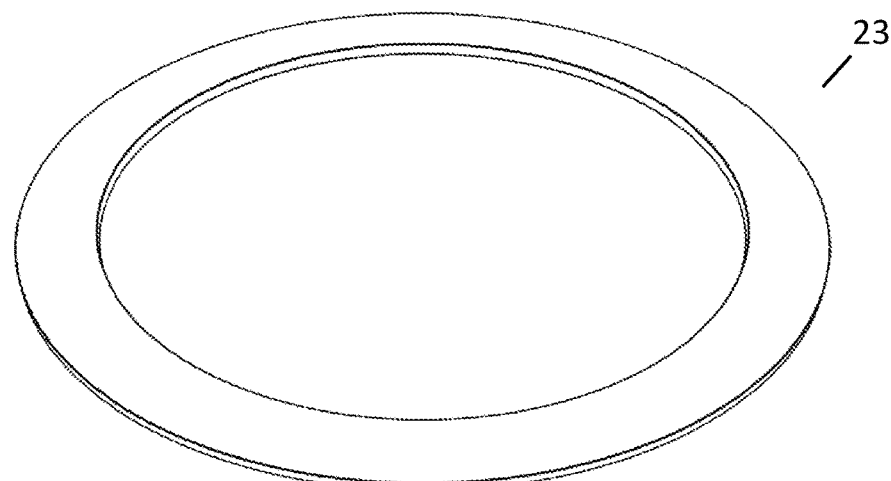
FIG. 27 shows a non-limiting example of a resilience constituent in accordance with some embodiments of the present invention.
Figure 28:
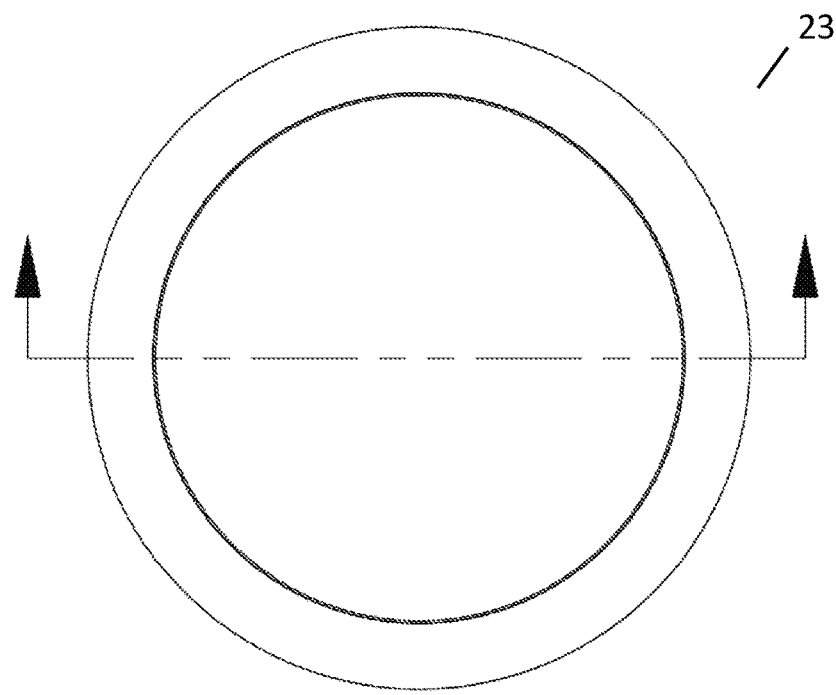
FIG. 28 shows a non-limiting example of a resilience constituent in accordance with some embodiments of the present invention.
Figure 29:
FIG. 29 shows a non-limiting example of a compressed resilience constituent in accordance with some embodiments of the present invention.
Figure 30:
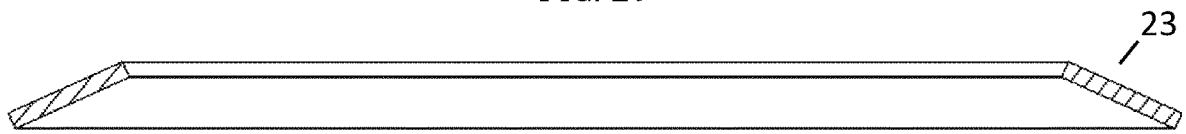
FIG. 30 shows a non-limiting example of a non-compressed resilience constituent in accordance with some embodiments of the present invention.
Figure 41:
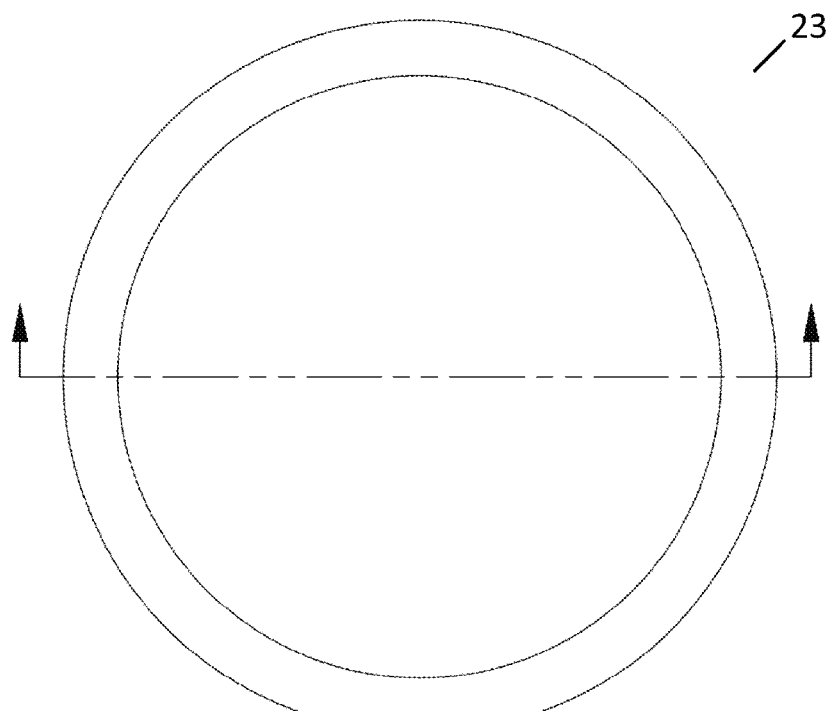
FIG. 41 shows a non-limiting example of a compressed resilience constituent in accordance with some embodiments of the present invention.
Figure 42:
FIG. 42 shows a non-limiting example of a resilience constituent in accordance with some embodiments of the present invention.
Figure 43:
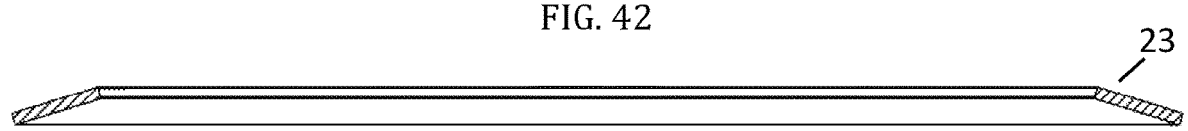
FIG. 43 shows a non-limiting example of a non-compressed resilience constituent in accordance with some embodiments of the present invention.

FIG. 24 shows a non-limiting example of a cover (16) perhaps prior to attaching it to a mount base (18). FIGS. 25-26 show a non-limiting example of a mount top (19) and FIGS. 27-30 show a non-limiting example of a resilience constituent (23). FIGS. 42 and 43 may be a cross section view shown in FIG. 41. FIG. 29 shows a non-limiting example of a compressed resilience constituent (23) and FIG. 30 shows a non-limiting example of a non-compressed resilience constituent (23).

A mount base extension (25) may be added under a mount base (18) perhaps to increase a load bearing surface on a substrate (14). A non-limiting example of mount base extension (25) is shown in FIGS. 19-22 and FIG. 138. Non-limiting examples of mount base extension holes (48) are shown in FIG. 138 and may align with mount base screw holes (33) perhaps as shown in FIG. 23.

A cover (16) perhaps with a cover hole (47) as shown in FIG. 24, may be placed on top of a mount base (18) as shown in FIG. 23. A mount top (19) perhaps as shown in FIGS. 25 and 26, may be started into a mount base (18) perhaps by engaging mount top threads (30) in mount base threads (31). Referring to FIGS. 19-20 and 22-23, when a mount top base (19) may be screwed into a mount base (18), a mount top cover surface (34) may push a cover (16) into a resilience constituent (23) perhaps against a mount base spring surface (39) and may even compress a resilience constituent (23).

Embodiments of the present invention may provide compressing a resilience constituent perhaps until a top roof mount may rigidly contact or even attach to a bottom roof mount. A mount top (19) may be securely tightened perhaps when using mount top spanner holes (21) or any other feature which may allow a firm grip on a mount top (19). When securely tightened, a mount top stop surface (26) may rigidly contact a top flat area of a lock washer (24). A bottom flat area of a lock washer (24) may rigidly contact a mount base stop surface (27) which may make a rigid connection between a mount top (19) and a mount base (18). Teeth of a lock washer (24) may be embedded into a mount top stop surface (26) and a mount base stop surface (27) may prevent a mount top (19) from unscrewing from a mount base (18). In embodiments, a top roof mount may be a rigid top roof mount and a bottom roof mount may be a rigid bottom roof mount.

Without a lock washer (24), a mount top stop surface (26) may contact a mount base stop surface (27) and may have a rigid connection between these surfaces. This may make a rigid connection between a mount top (19) and a mount base (18). Locking features on a mount top stop surface (26) or perhaps even on a mount base stop surface (27), or both surfaces, may prevent a mount top (19) from unscrewing from a mount base (18).

When a resilience constituent (23) may be compressed, it may exert a force on a bottom of a cover (16) and may push a top cover against a mount top cover surface (34) which may create a water intrusion barrier between a top of a cover (16) and even a mount top cover surface (34).

A cover (16) may be attached with an adhesive (17) perhaps to a water proof layer (15) such as shown in FIG. 21. This may create a water intrusion barrier perhaps between a cover (16) and a water proof layer (15). With water intrusion barriers discussed, water intrusion into a substrate (14) perhaps due to a mount (13) may not occur. When a bolt (8) may be tightened, an attachment structure bottom surface (28) may make a rigid contact with a mount top surface (29). There may now be rigid contacts between an attachment structure (11) and a mount base (18).

FIGS. 31-43, 24 and 138 shows a non-limiting example of a mount (13) and an attachment structure (11) attached to a mount (13). A substrate (14), adhesive (17), water proof layer (15), and perhaps even a mount extension (25) which are not shown but could apply. FIGS. 15-30 and 138 show non-limiting examples of a substrate (14), adhesive (17), water proof layer (15), and even a mount extension (25).

Figure 31:
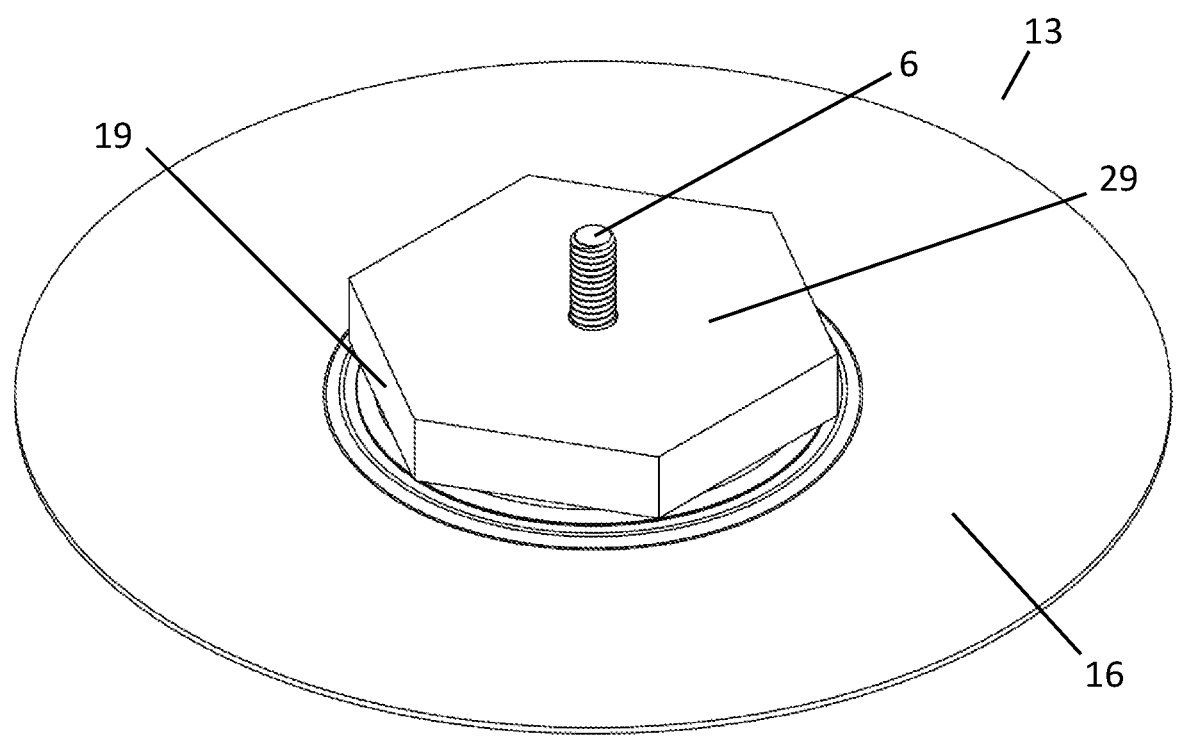
FIG. 31 shows a non-limiting example of a mount in accordance with some embodiments of the present invention.
Figure 32:
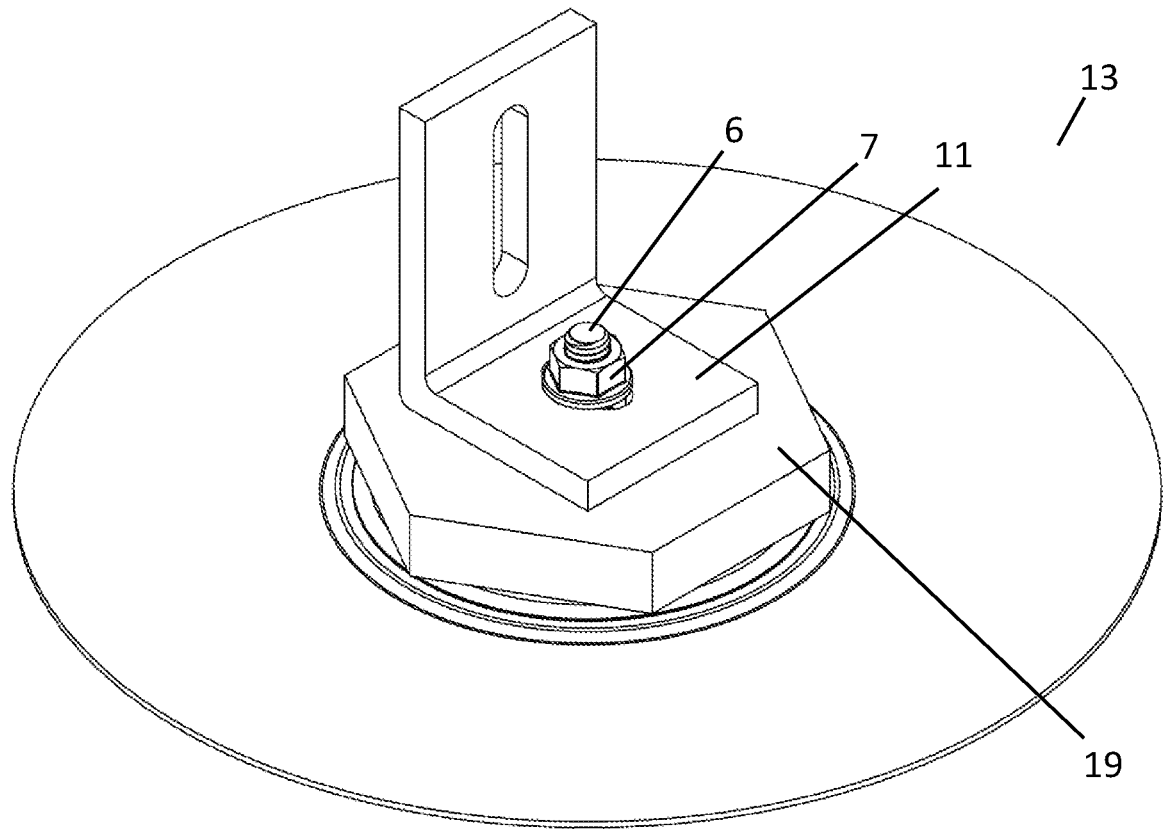
FIG. 32 shows a non-limiting example of a mount attached to attachment structure in accordance with some embodiments of the present invention.
Figure 33:
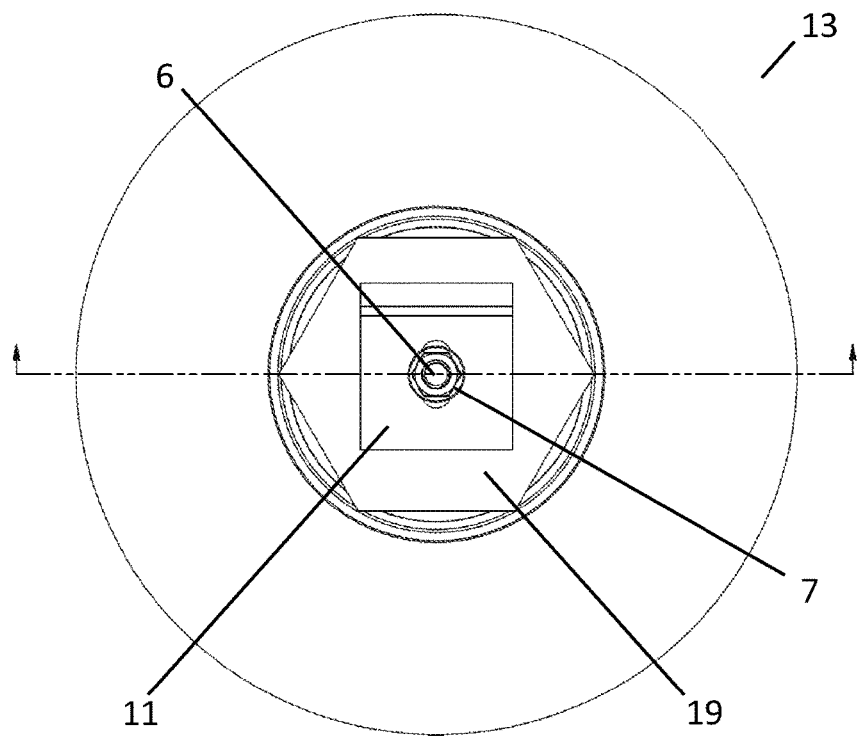
FIG. 33 shows a top view of FIG. 32 in accordance with some embodiments of the present invention.
Figure 34:
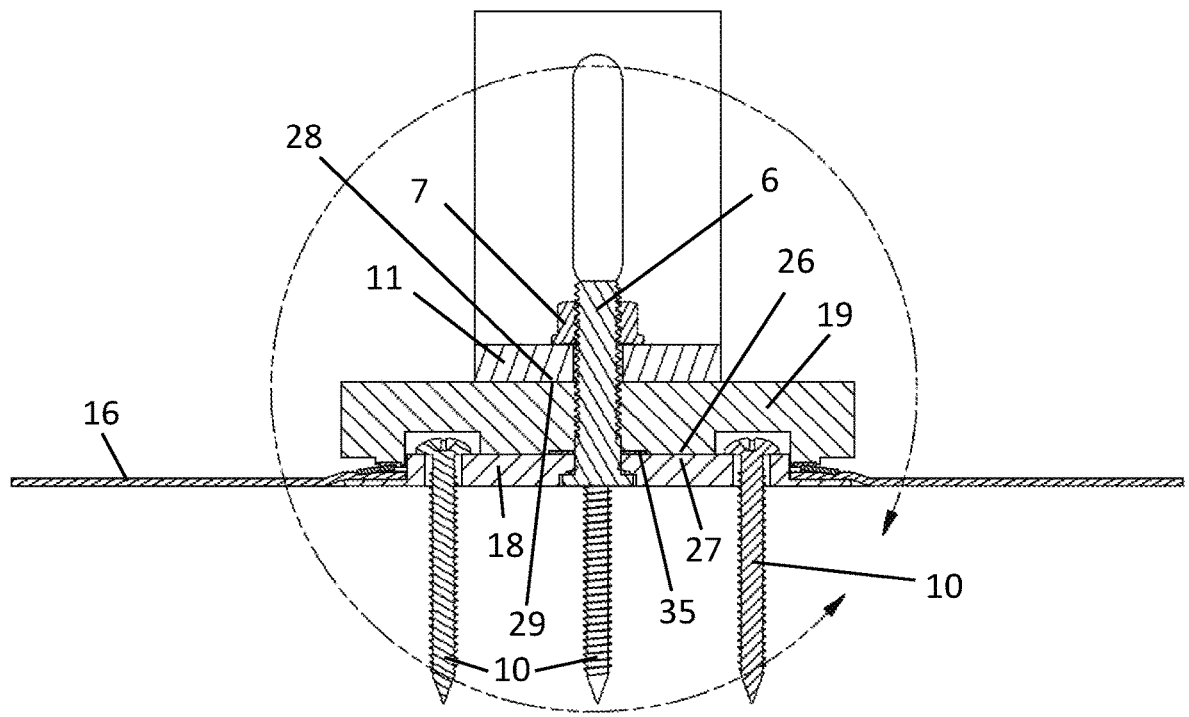
FIG. 34 shows a non-limiting example of cross-section view of FIG. 33 in accordance with some embodiments of the present invention.
Figure 35:
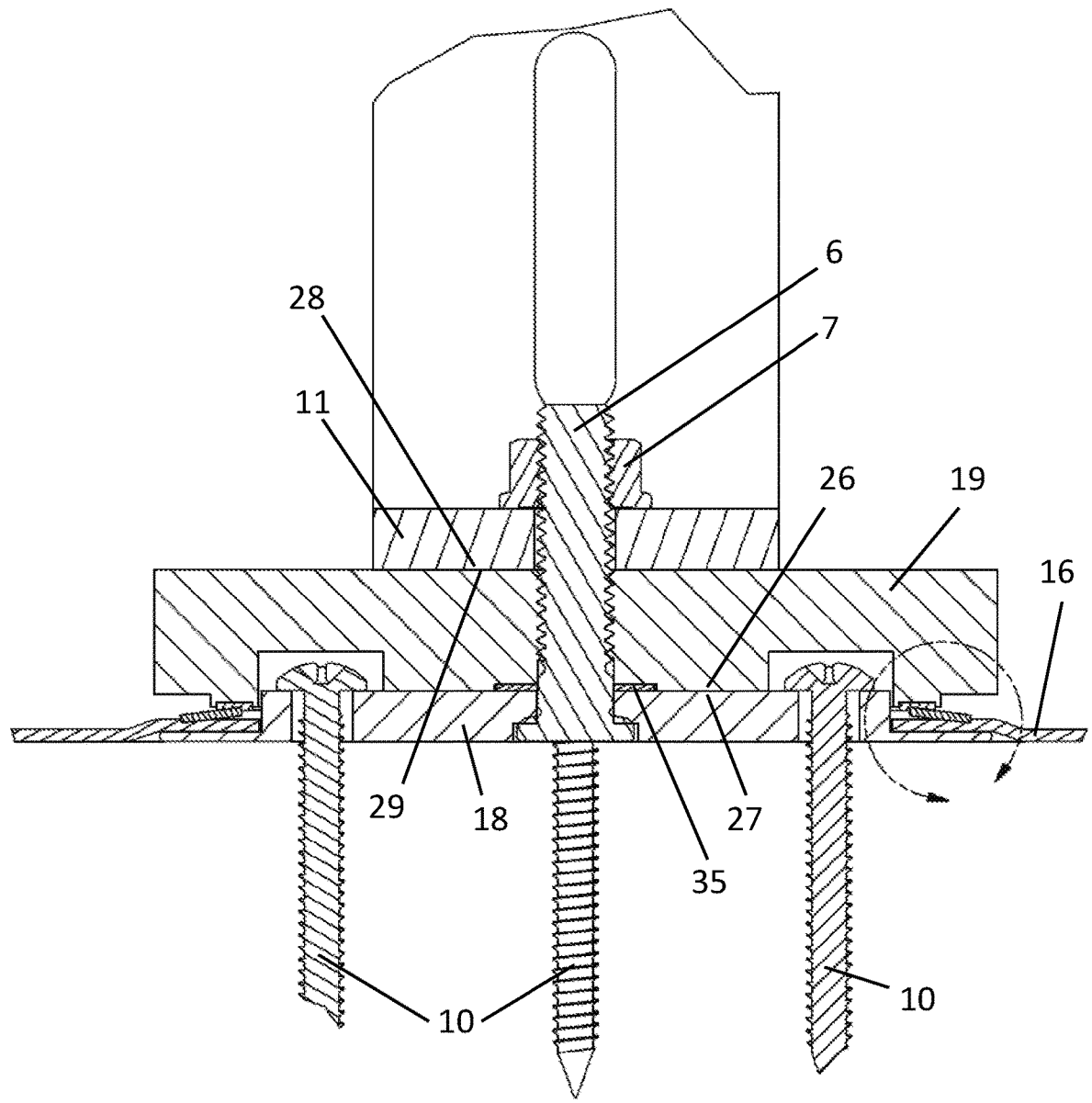
FIG. 35 shows a non-limiting example of an enlarged view of FIG. 33 in accordance with some embodiments of the present invention.
Figure 36:
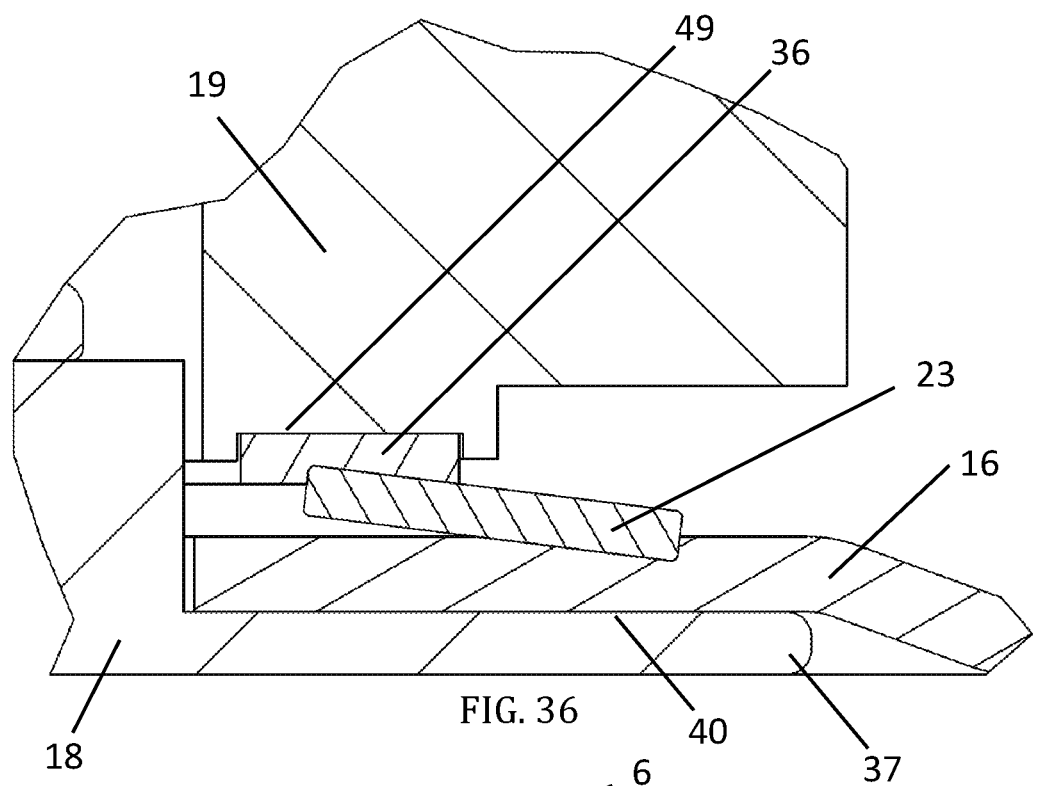
FIG. 36 shows a non-limiting example of an enlarged view of FIG. 35 in accordance with some embodiments of the present invention.

FIG. 31 shows a non-limiting example of a mount (13). FIG. 32 may be the same as FIG. 31 except an attachment structure (11) may be attached to a mount (13). FIG. 33 is a top view of FIG. 32 and FIG. 34 is a cross-section view of FIG. 33. FIG. 35 is an enlarged view of what is shown in FIG. 34. FIG. 36 is an enlarged view of what is shown in FIG. 35.

Figure 37:
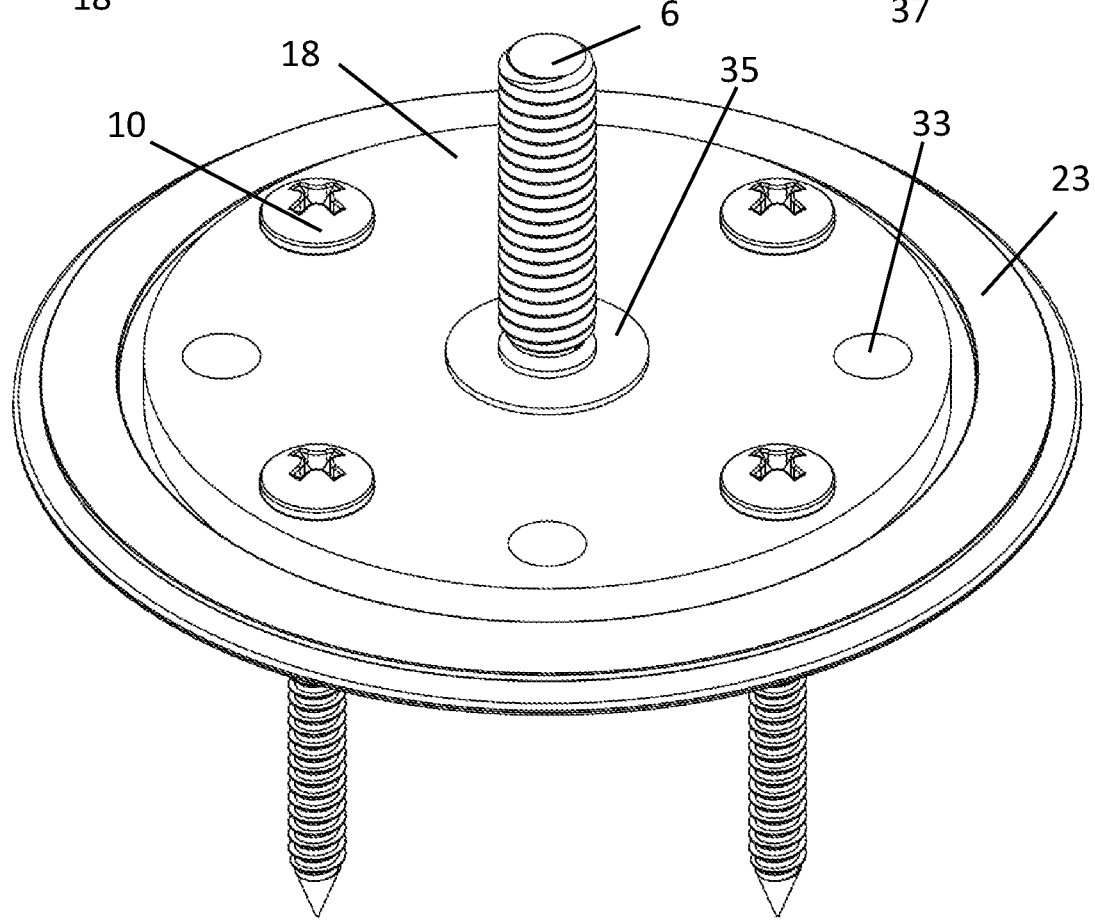
FIG. 37 shows a non-limiting example of a mount base in accordance with some embodiments of the present invention.
Figure 38:
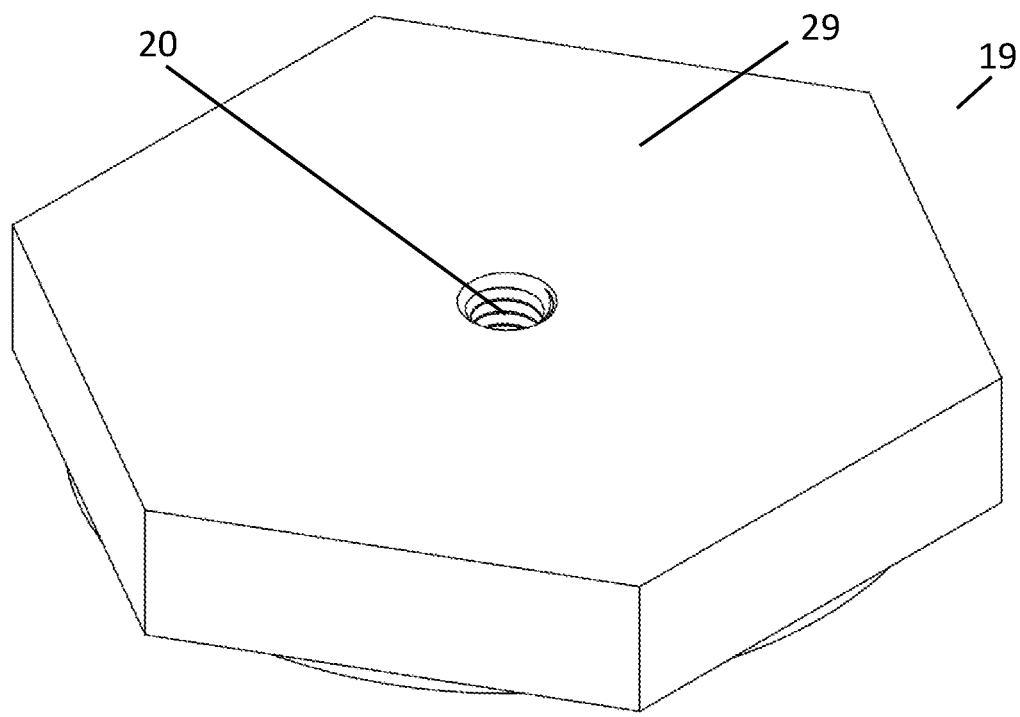
FIG. 38 shows a non-limiting example of a mount top in accordance with some embodiments of the present invention.
Figure 39:
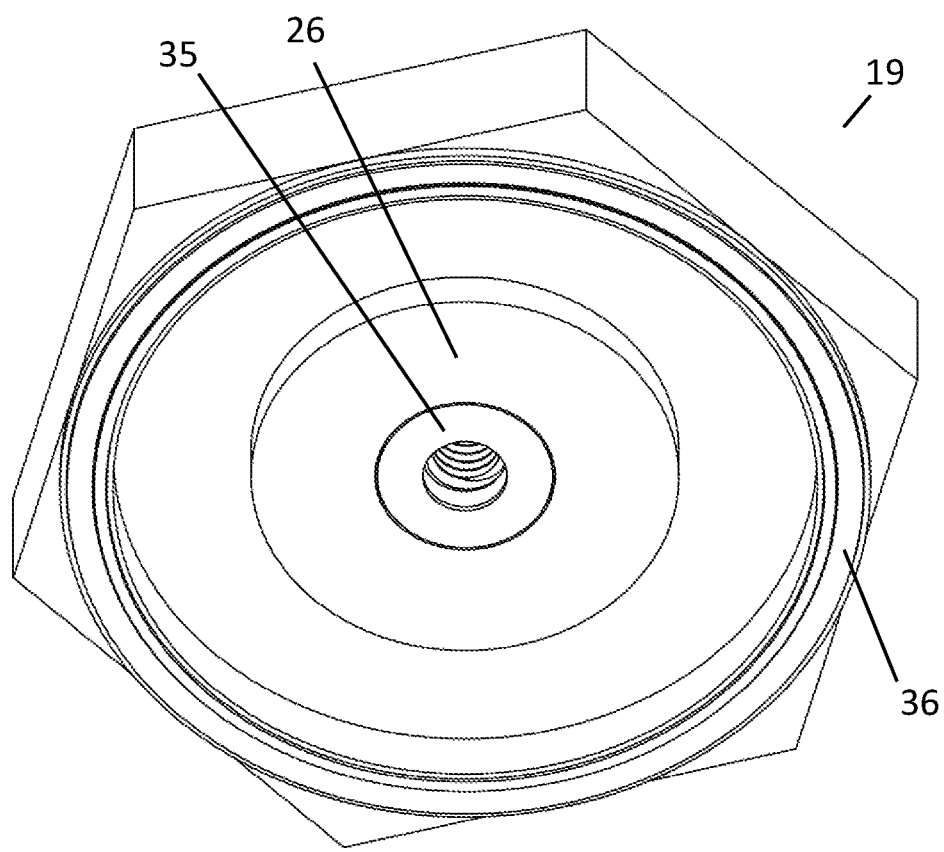
FIG. 39 shows a non-limiting example of a mount top in accordance with some embodiments of the present invention.
Figure 40:
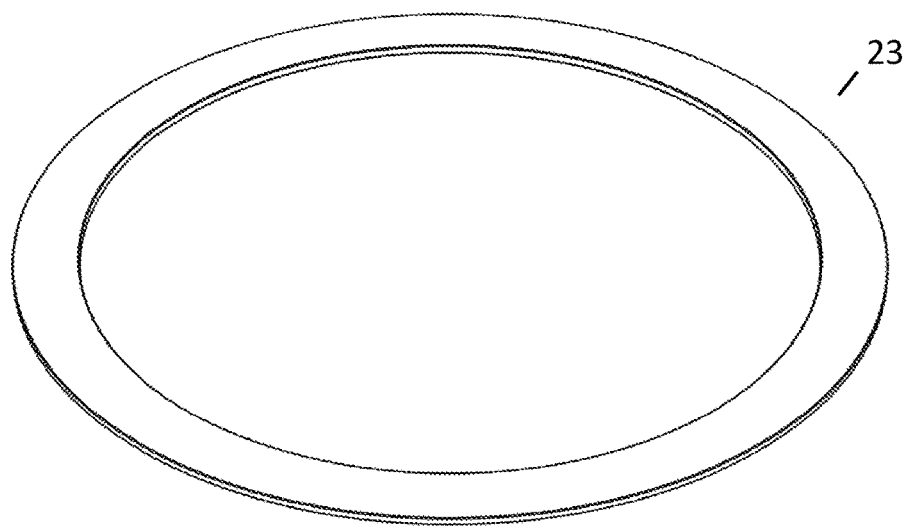
FIG. 40 shows a non-limiting example of a resilience constituent in accordance with some embodiments of the present invention.

FIG. 37 shows a non-limiting example of a mount base (18) perhaps with screws (10). FIG. 24 shows a non-limiting example of a cover (16) perhaps with a cover hole (47) such as before it may be attached to a mount base (18). FIGS. 38 and 39 show a non-limiting example of a mount top (19). FIGS. 40-43 show a non-limiting example of a resilience constituent (23). FIG. 41 show a non-limiting example of a compressed resilience constituent (23) and FIG. 43 show a non-limiting example of a non-compressed resilience constituent (23).

Referring to FIGS. 34-43 and 24, a cover (16) may have a cover hole (47) and may be placed on a mount base (18) perhaps as shown in FIG. 37. A mount top (19) may be screwed onto a stud (6) perhaps in a mount top threaded hole (20). A hex shape of a mount top (19) may be used to tighten a mount top (19) which may continue to compress a resilience constituent (23) perhaps until a mount top stop surface (26) may contact a mount base stop surface (27) which may create a rigid connection between a mount top (19) and a mount base (18).

A resilience constituent compression force may force a resilience constituent (23) against a spring seal (36) and perhaps even a top of a cover (16). A resilience constituent (23) may force a spring seal (36) against a mount top spring seal surface (49) and may even force a bottom of a cover perhaps against a mount base cover surface (40). This may create a water intrusion barrier perhaps between a mount top spring seal surface (49) and a spring seal (36); between a spring seal (36) and a resilience constituent (23); between a resilience constituent (23) and a cover (16); and perhaps even between a cover (16) and a mount base cover surface (40). This may create a water intrusion barrier perhaps between a mount top spring seal surface (49) and even a mount base cover surface, (40).

A mount base lip (37) may allow a cover (16) to be closer to a bottom of a mount base (18). This may allow a cover (16) perhaps to conform better when it may be attached to a water proof layer (15).

A seal (35) may create a water intrusion barrier perhaps between a top mount (19) and even a base mount (18) such as around a stud (6). A head of a stud (6) perhaps when pressed into a mount base (18) may create a water intrusion barrier between a stud (6) and a mount base (18). A spring seal (36) may be a non-rigid material such as but not limited to an elastomer or the like. A spring seal (36) could be attached to a resilience constituent (23).

A cover (16) may be attached with an adhesive (17) to a water proof layer (15) as may be understood in FIG. 21. This may create a water intrusion barrier between a cover (16) and a water proof layer (15). With water intrusion barriers discussed, there may be little to no water intrusion path to a substrate (14) perhaps due to a mount (13).

An attachment structure (11) may be attached to a mount top (19). When a nut (7) may be tightened, an attachment structure bottom surface (28) may contact a mount top surface (29) which may create a rigid connection between an attachment structure (11) and a mount top (19). This may create a rigid connection between an attachment structure (11) and a mount base (18).

FIGS. 44-56, 24 and 138 show a non-limiting example of a mount (13), and an attachment structure (11) attached to a mount (13). A substrate (14), adhesive (17), water proof layer (15), and perhaps even a mount extension (25) may not be shown but may be used. FIGS. 15-30 and 138 may provide non-limiting examples of a substrate (14), adhesive (17), water proof layer (15), and even a mount extension (25).

Figure 44:
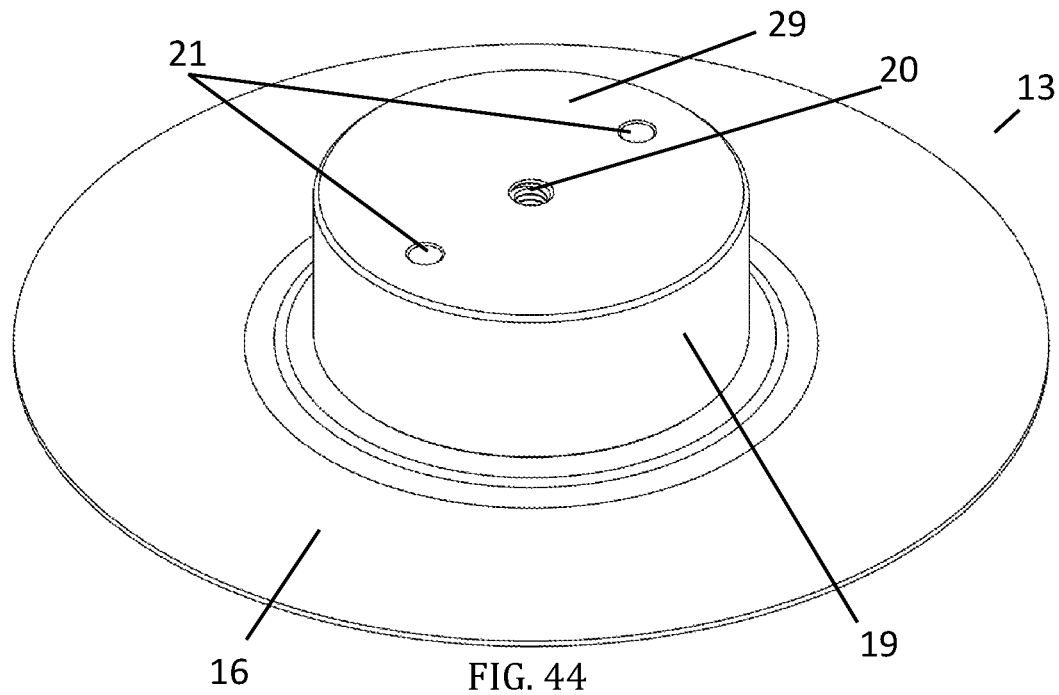
FIG. 44 shows a non-limiting example of a mount in accordance with some embodiments of the present invention.
Figure 45:
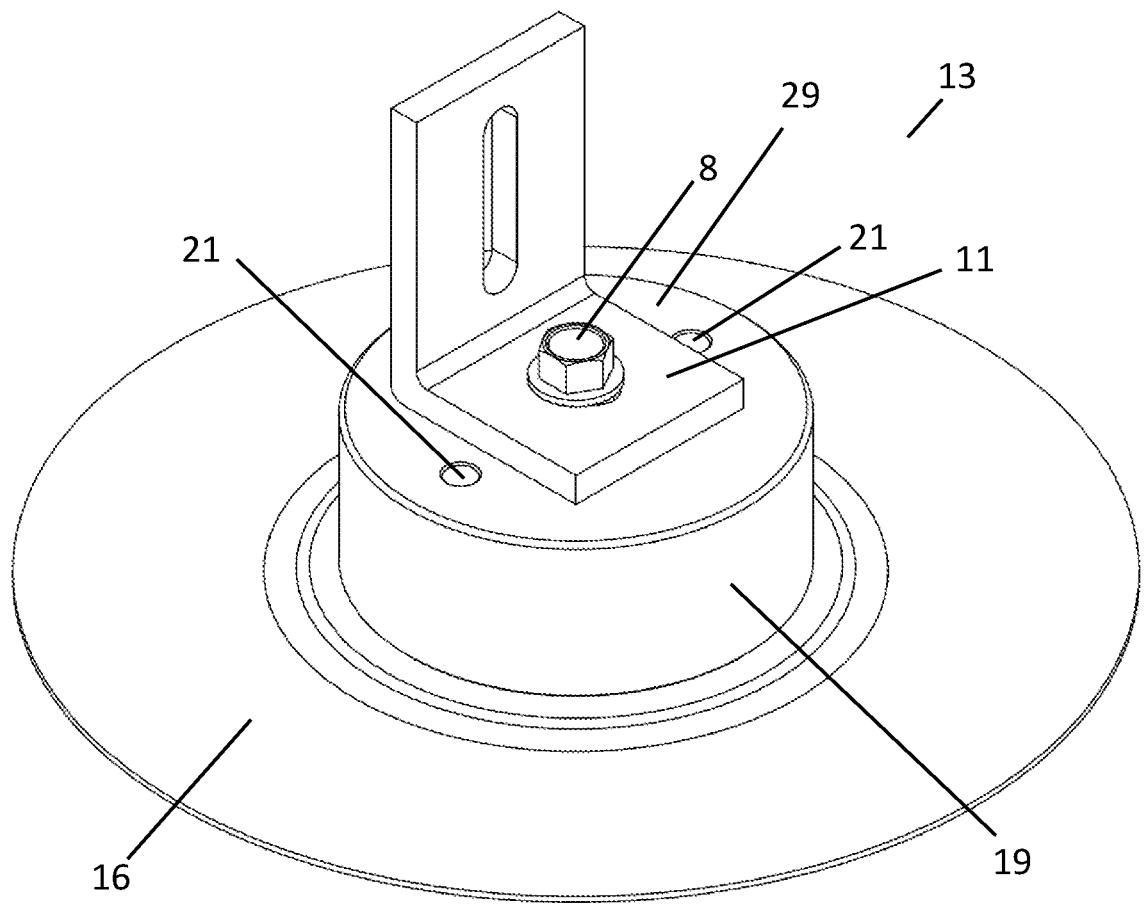
FIG. 45 shows a non-limiting example of a mount attached to an attachment structure in accordance with some embodiments of the present invention.
Figure 46:
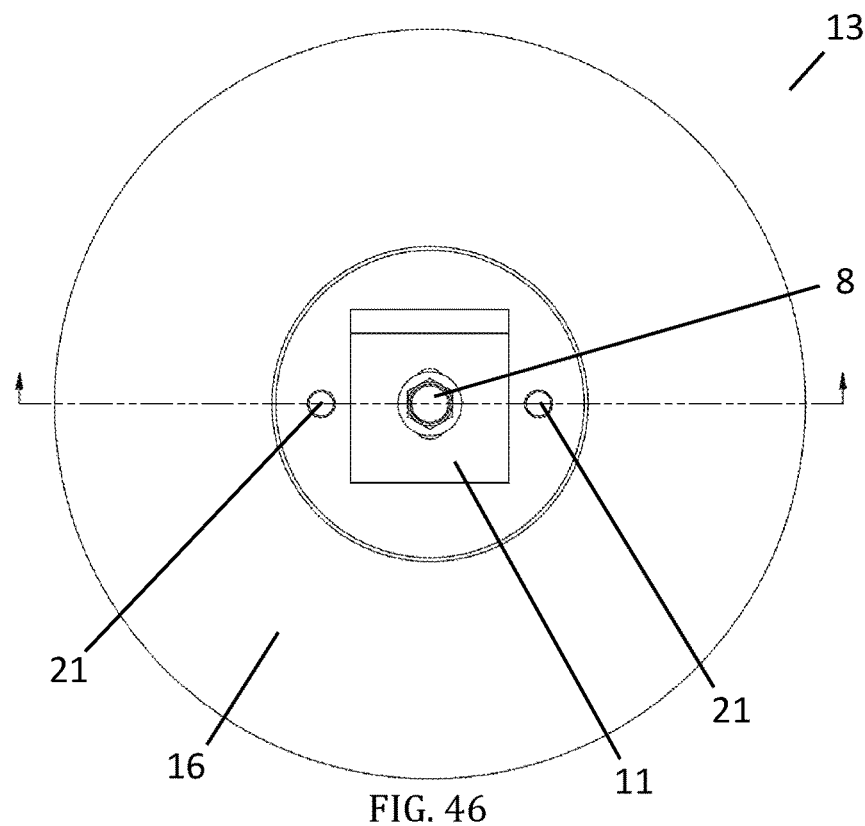
FIG. 46 shows a non-limiting example of top view of FIG. 45 in accordance with some embodiments of the present invention.
Figure 47:
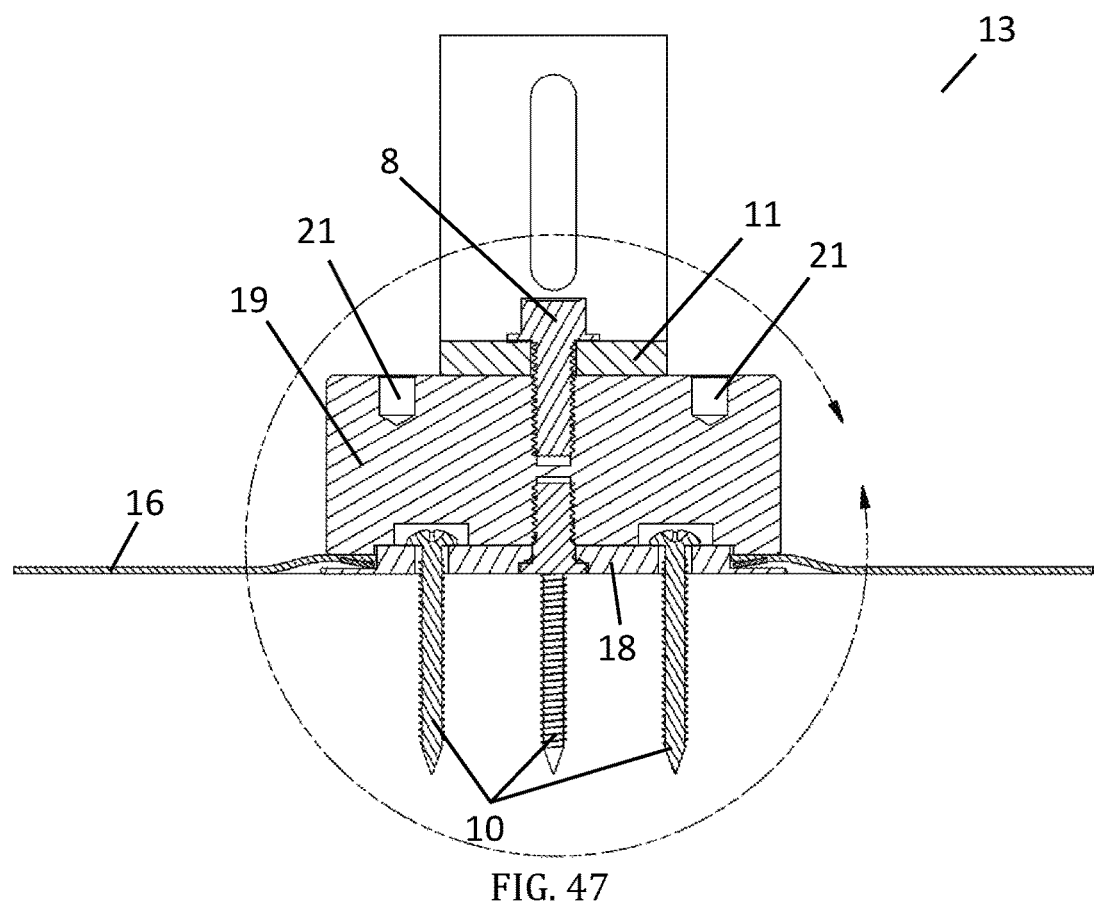
FIG. 47 shows a non-limiting example of a cross-section view of FIG. 46 in accordance with some embodiments of the present invention.
Figure 48:
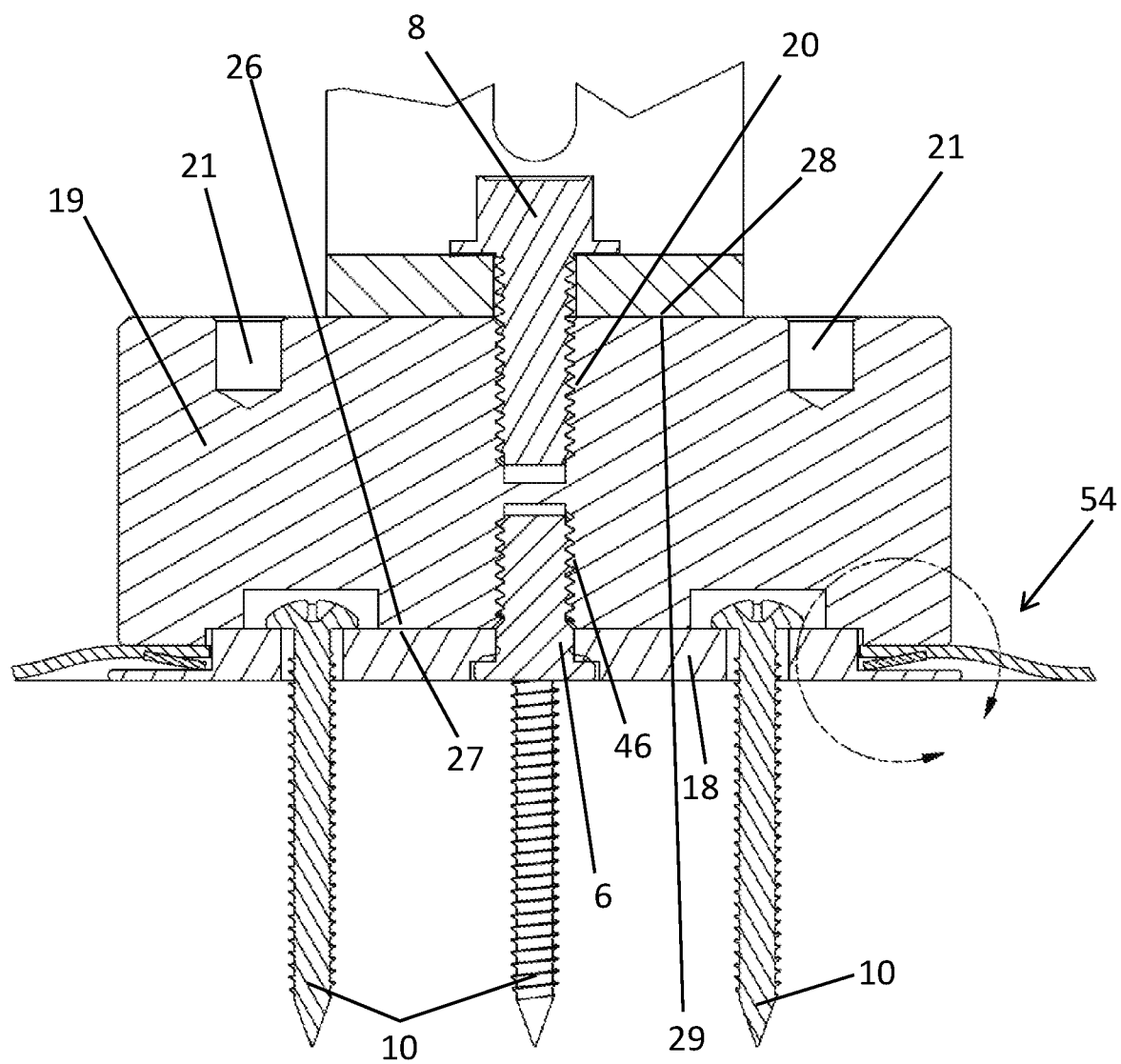
FIG. 48 shows a non-limiting example of an enlarged view as shown in FIG. 47 in accordance with some embodiments of the present invention.
Figures 49, 50:
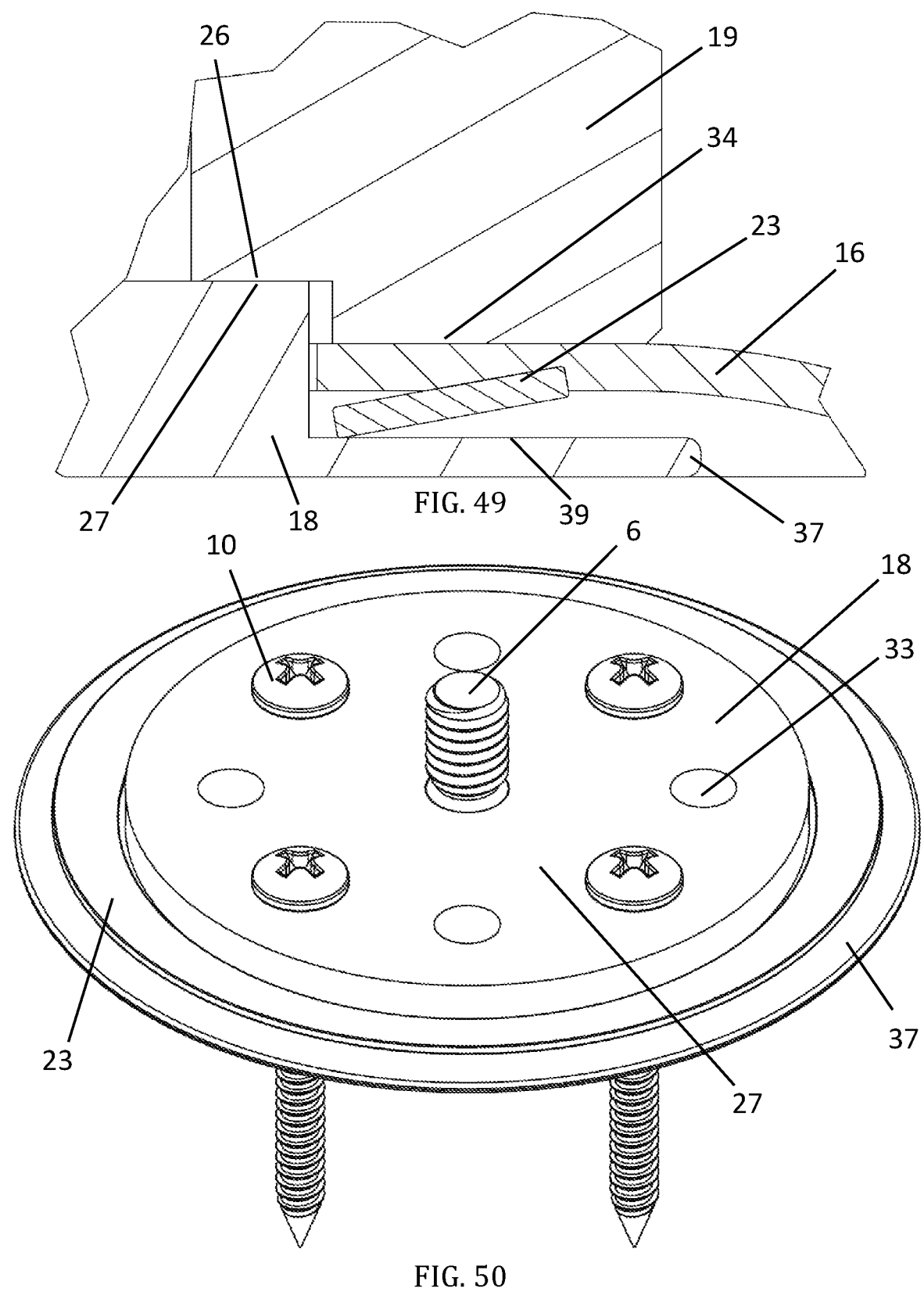
FIG. 49 shows a non-limiting example of an enlarged view of FIG. 48 in accordance with some embodiments of the present invention.
FIG. 50 shows a non-limiting example of a mount in accordance with some embodiments of the present invention.

FIG. 44 shows a non-limiting example of a mount (13). FIG. 45 may be the same as FIG. 44 perhaps except an attachment structure (11) may be attached to a mount (13). FIG. 46 is a top view of FIG. 45 and FIG. 47 is a cross-section view of FIG. 46. FIG. 48 is an enlarged view as shown in FIG. 47. FIG. 49 is an enlarged view as shown in FIG. 48.

Embodiments of the present invention may provide that cover may be placed close (54) to a roof or the like. A cover may be placed over or even around part of a roof mount, such as a bottom roof mount; however, if a cover may be rigid, it may not flex. A cover may be between about 0.5 to about 0.25 inches above a roof or the like. Of course, any placement may be used and all measurements are included in this disclosure.

Figure 51:
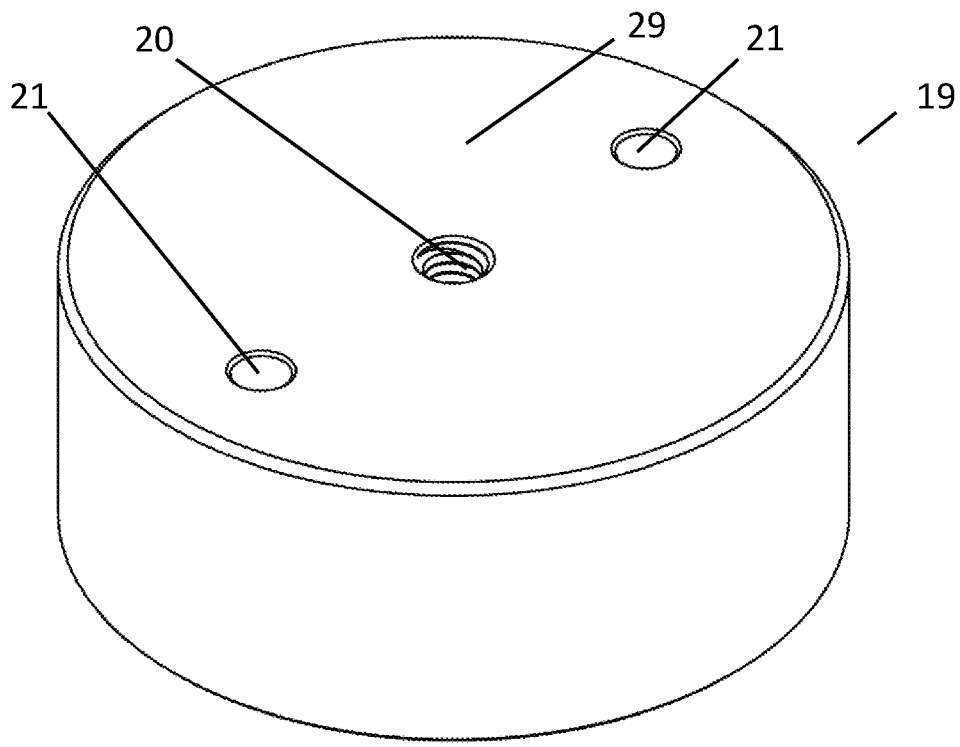
FIG. 51 shows a non-limiting example of a mount top in accordance with some embodiments of the present invention.
Figure 52:
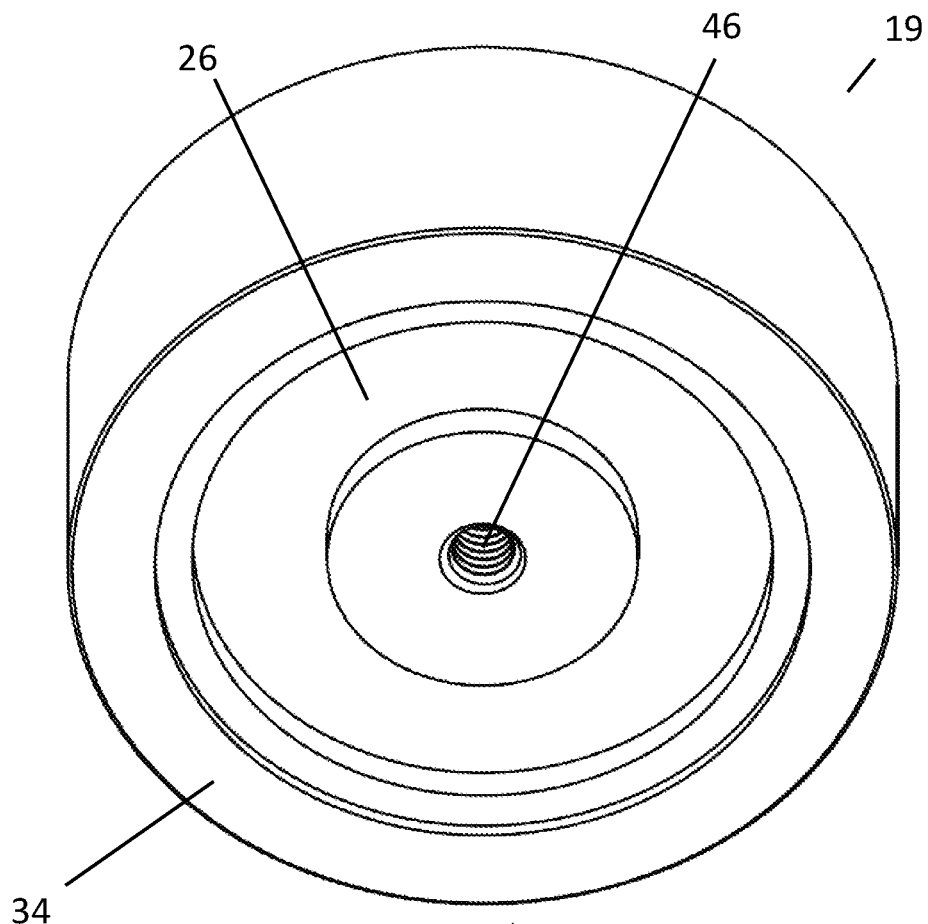
FIG. 52 shows a non-limiting example of a mount top in accordance with some embodiments of the present invention.
Figure 53:
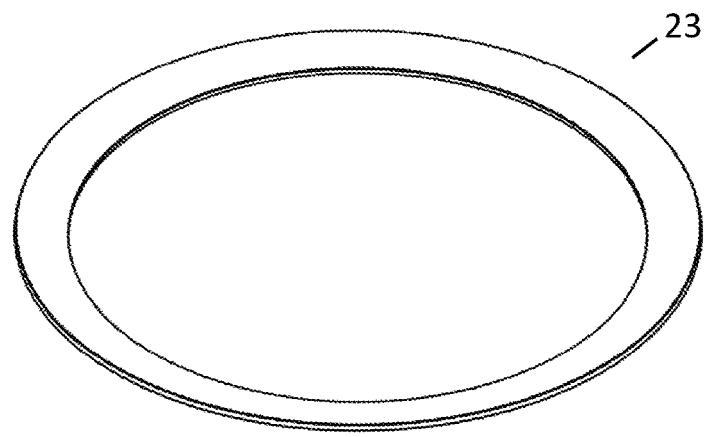
FIG. 53 shows a non-limiting example of a resilience constituent in accordance with some embodiments of the present invention.
Figure 54:
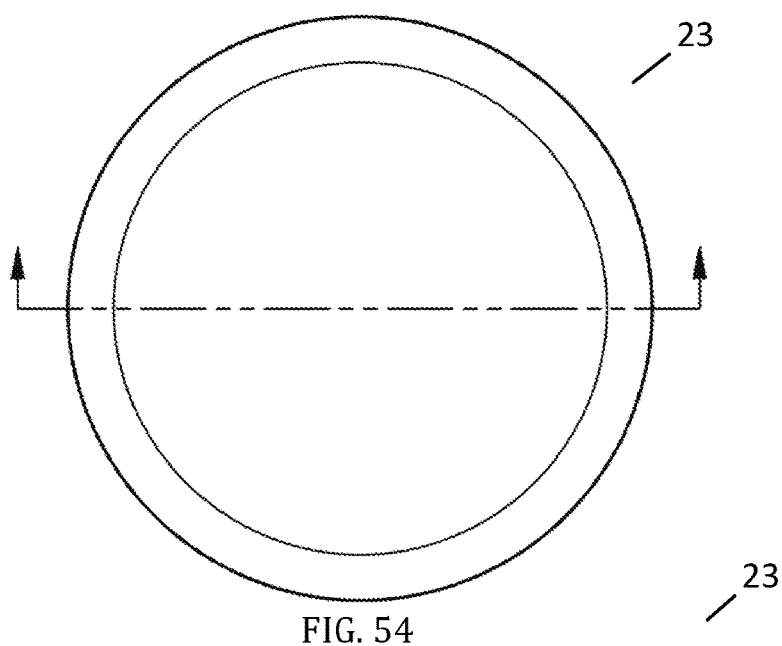
FIG. 54 shows a non-limiting example of resilience constituent in accordance with some embodiments of the present invention.
Figure 55:
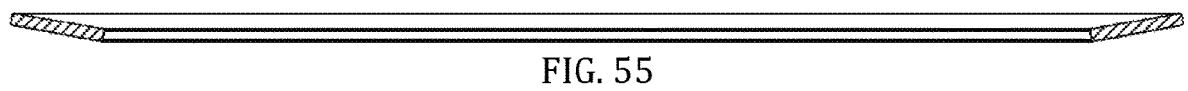
FIG. 55 shows a non-limiting example of compressed resilience constituent in accordance with some embodiments of the present invention.
Figure 56:
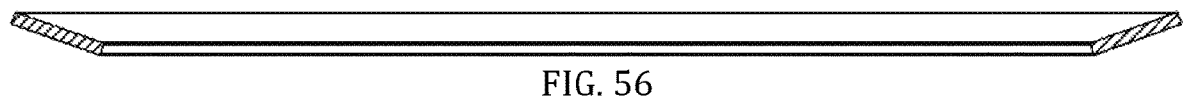
FIG. 56 shows a non-limiting example of a non-compressed resilience constituent in accordance with some embodiments of the present invention.

FIG. 50 shows a non-limiting example of a mount base (18) perhaps with screws (10). FIG. 24 shows a non-limiting example of a cover (16) perhaps with a cover hole (47) before it may be attached to a mount base (18). FIGS. 51 and 52 show a non-limiting example of a mount top (19). FIGS. 53-56 show a non-limiting example of a resilience constituent (23). FIG. 55 shows a non-limiting example of a compressed resilience constituent (23) and FIG. 56 shows a non-limiting example of a non-compressed resilience constituent (23).

Referring to FIGS. 47-56 and 24, a cover (16) perhaps with a cover hole (47) may be placed on a mount base (18) perhaps as shown in FIG. 50. A mount top (19) may be screwed onto a stud (6) perhaps in a mount top bottom threaded hole (46). Mount top spanner holes (21) may be used to tighten a mount top (19) which may continue to compress a resilience constituent (23) until a mount top stop surface (26) may contact a mount base stop surface (27) which may create a rigid connection between a mount top (19) and a mount base (18).

A resilience constituent (23) may be compressed between a bottom of a cover (16) and a mount base spring surface (39). A resilience constituent compression force may force a resilience constituent (23) against a cover (16) and may even force a cover (16) against a mount top cover surface (34) which may create a water intrusion barrier perhaps between a top of a cover (16) and a mount top cover surface (34). Localized pressure from an edge of a resilience constituent (23) may create further pressure between a top of a cover (16) and against a mount top cover surface (34) which may create a water intrusion barrier.

A cover (16) may be attached with an adhesive (17) perhaps to a water proof layer (15) perhaps as shown in FIG. 21. This may create a water intrusion barrier perhaps between a cover (16) and a water proof layer (15). With water intrusion barriers discussed, there may be little to no water intrusion path to a substrate (14) perhaps due to a mount (13).

An attachment structure (11) may be attached to a mount top (19). When a bolt (8) may be tightened, an attachment structure bottom surface (28) may contact a mount top surface (29) which may create a rigid connection between an attachment structure (11) and a mount top (19). This may create a rigid connection between an attachment structure (11) and a mount base (18).

A mount top (19) may be attached to a mount base (18) perhaps with multiple screws from a bottom of a mount base (18) into a mount top (19). This may be an alternative to using a stud (6). Multiple screws may offset to a mount top threaded hole (20) which may allow a mount top (19) to be a smaller height.

FIGS. 57-69, 24 and 138 show a non-limiting example of a mount (13) and even an attachment structure (11) attached to a mount (13). A substrate (14), adhesive (17), a water proof layer (15), and perhaps even a mount extension (25) may not be shown but may apply. FIGS. 15-30, and 138 may provide a non-limiting example of a substrate (14), adhesive (17), water proof layer (15), and even a mount extension (25).

Figure 57:
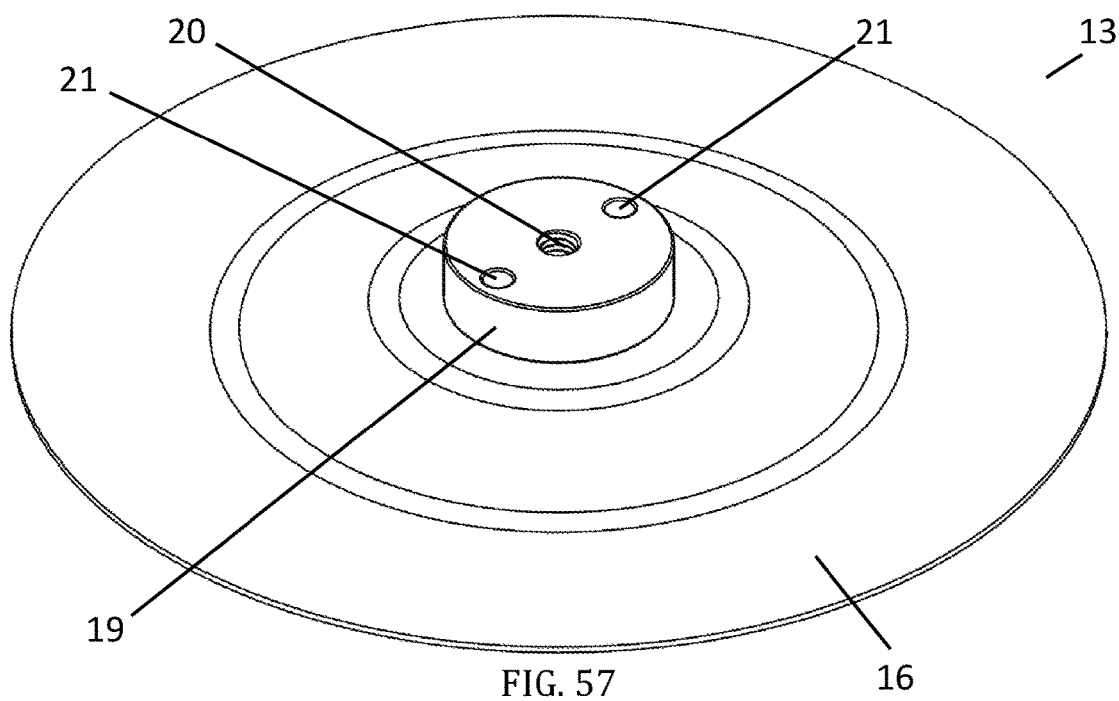
FIG. 57 shows a non-limiting example of a mount in accordance with some embodiments of the present invention.
Figure 58:
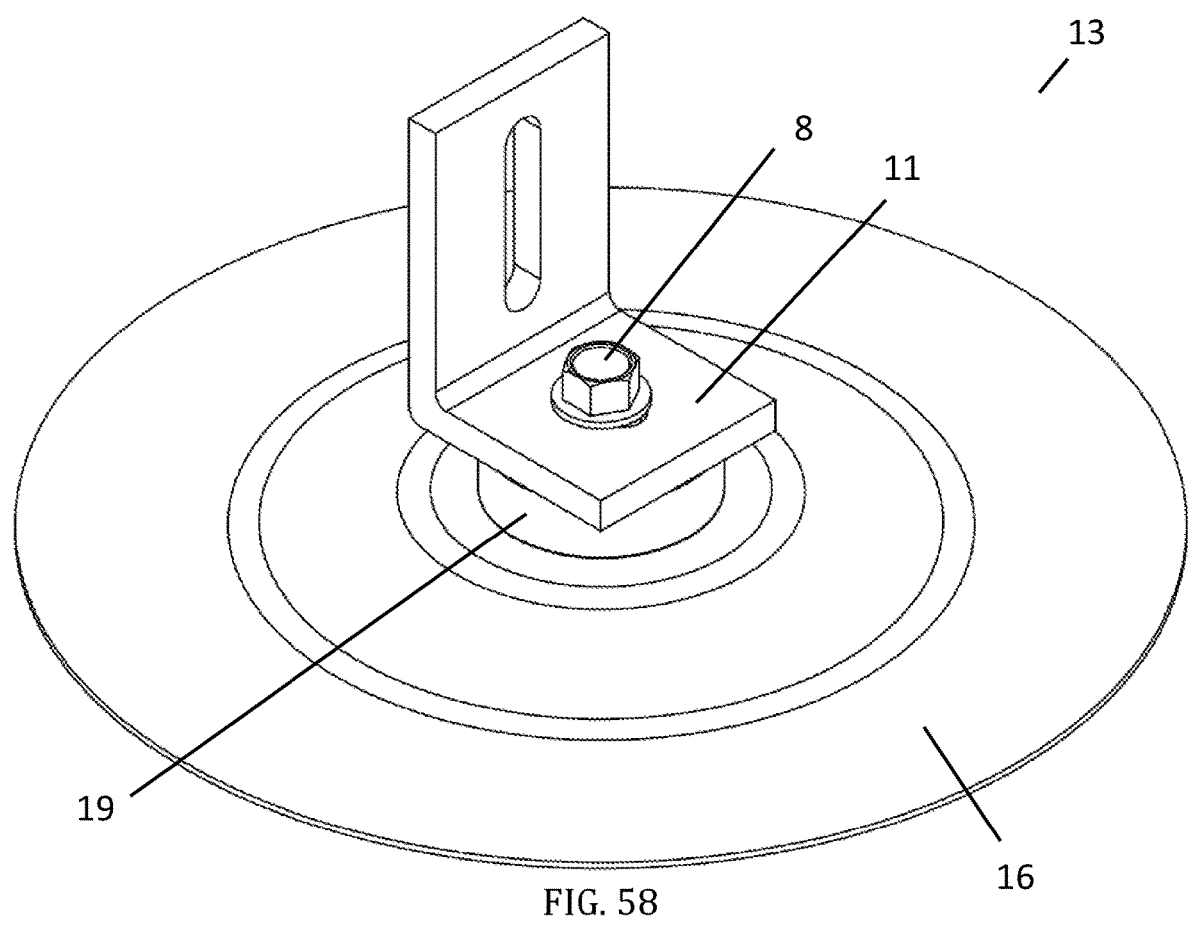
FIG. 58 shows a non-limiting example of a mount attached to an attachment structure in accordance with some embodiments of the present invention.
Figure 59:
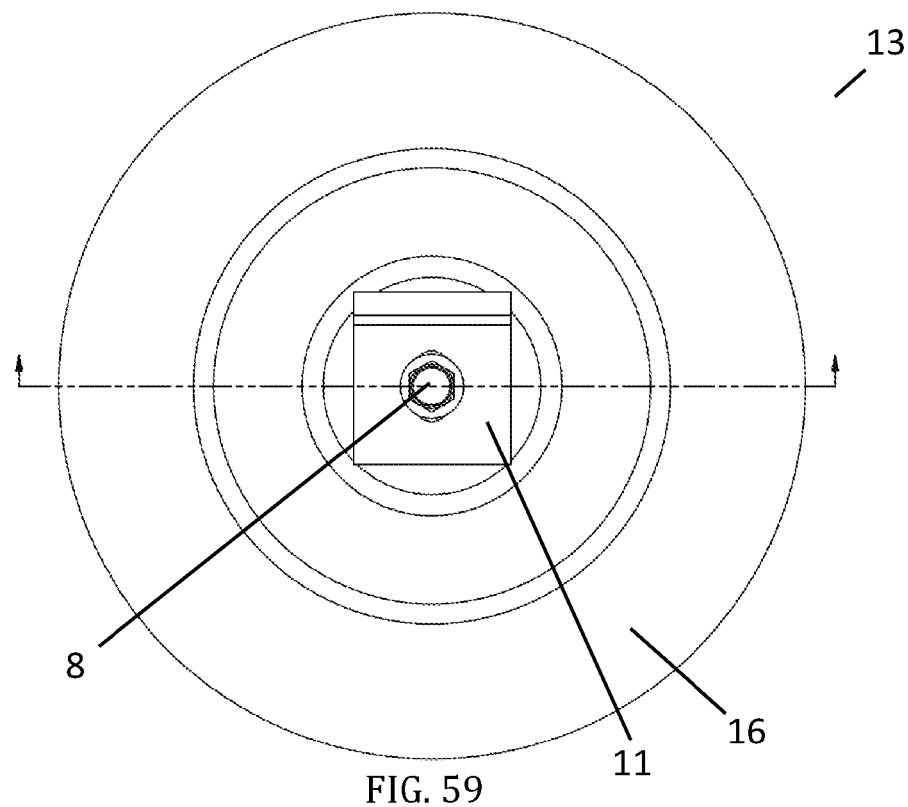
FIG. 59 shows a non-limiting example of a top view of FIG. 58 in accordance with some embodiments of the present invention.
Figure 60:
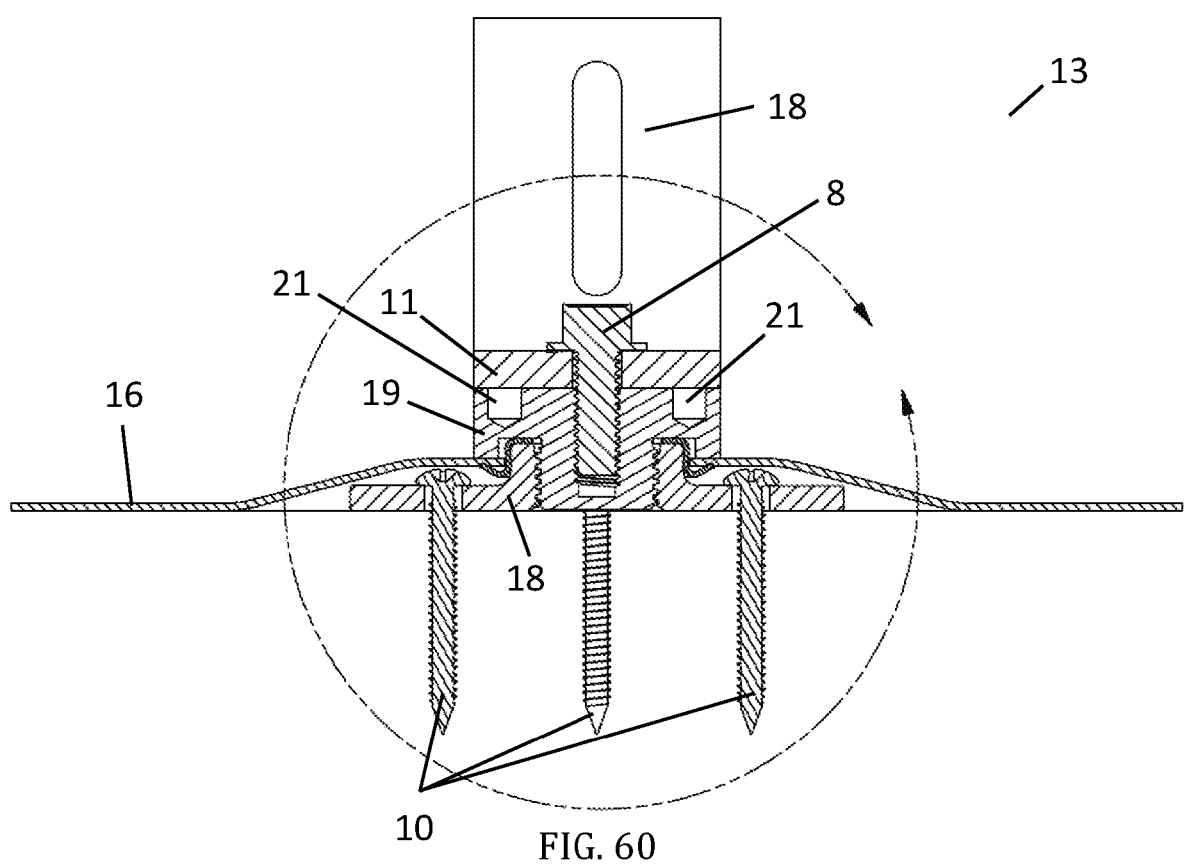
FIG. 60 shows a non-limiting example of a cross-section view of FIG. 59 in accordance with some embodiments of the present invention.
Figure 61:
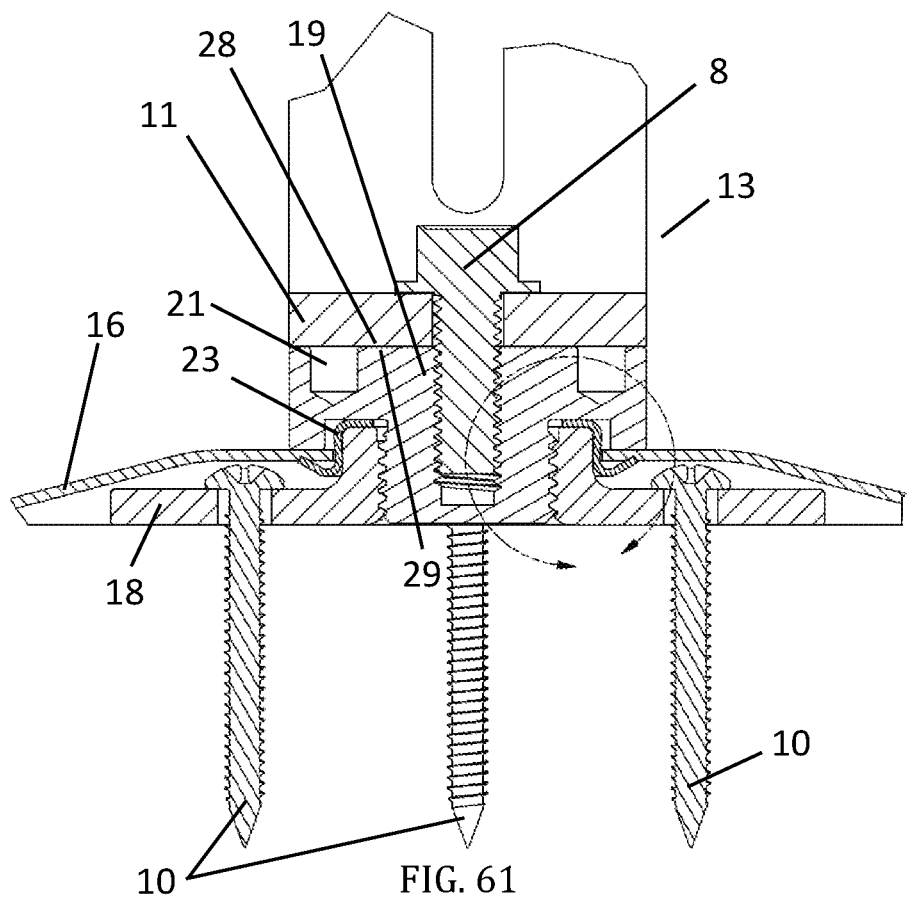
FIG. 61 shows a non-limiting example of an enlarged view of FIG. 60 in accordance with some embodiments of the present invention.
Figure 62:
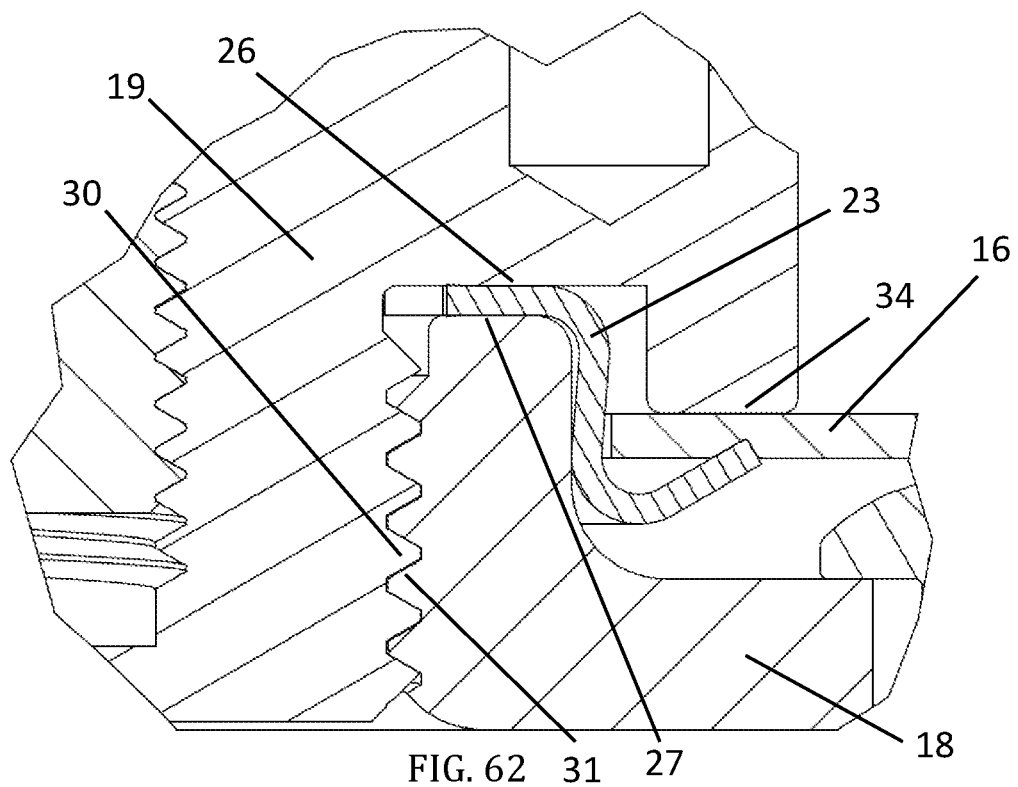
FIG. 62 shows a non-limiting example of an enlarged view of FIG. 61 in accordance with some embodiments of the present invention.
Figure 66:
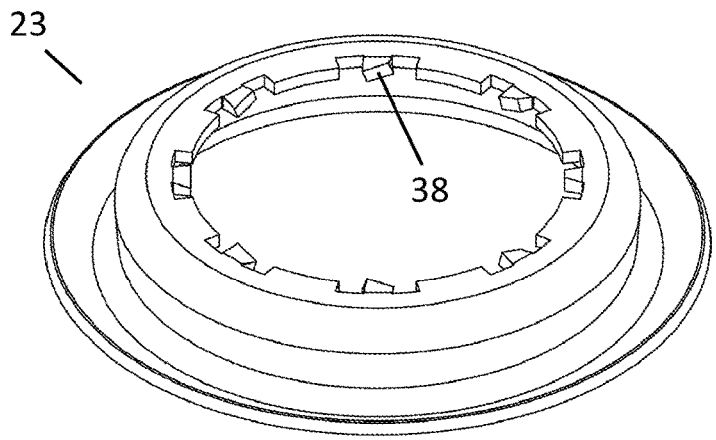
FIG. 66 shows non-limiting example of a resilience constituent in accordance with some embodiments of the present invention.
Figure 67:
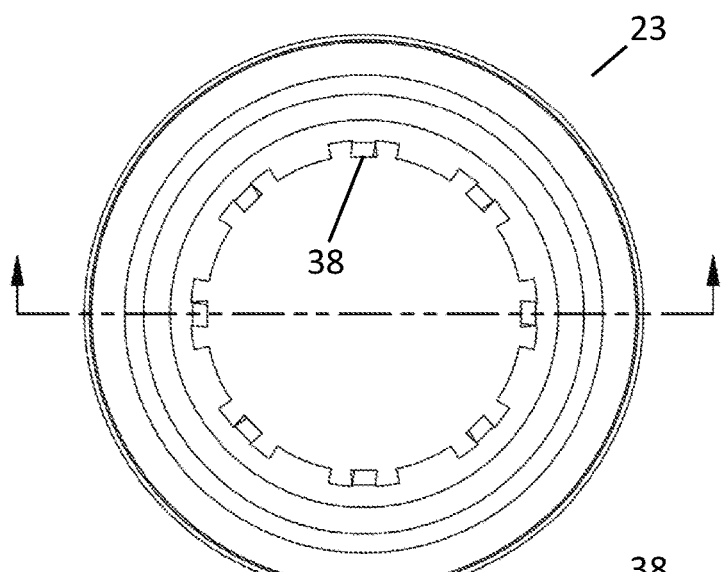
FIG. 67 shows a non-limiting example of a resilience constituent in accordance with some embodiments of the present invention.

FIG. 57 shows a non-limiting example of a mount (13). FIG. 58 may be the same as FIG. 57 perhaps except an attachment structure (11) may be attached to a mount (13). FIG. 59 is a top view of FIG. 58 and FIG. 60 is a cross-section view of FIG. 59. FIG. 61 is an enlarged view of that as shown in FIG. 60. FIG. 62 is an enlarged view of that as shown in FIG. 61.

Figure 68:
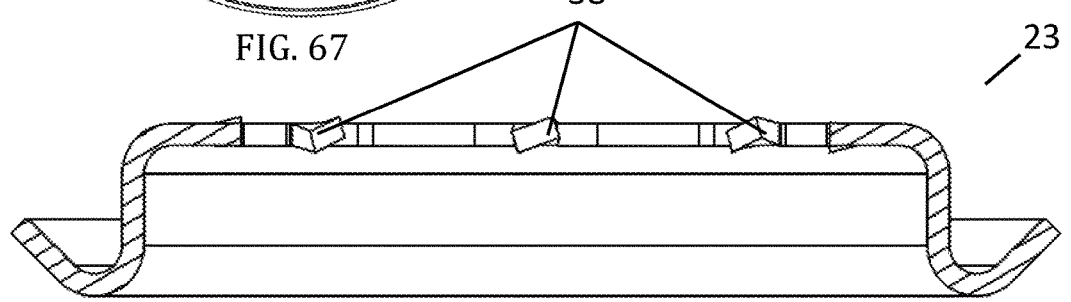
FIG. 68 shows a non-limiting example of a non-compressed resilience constituent in accordance with some embodiments of the present invention.
Figure 69:
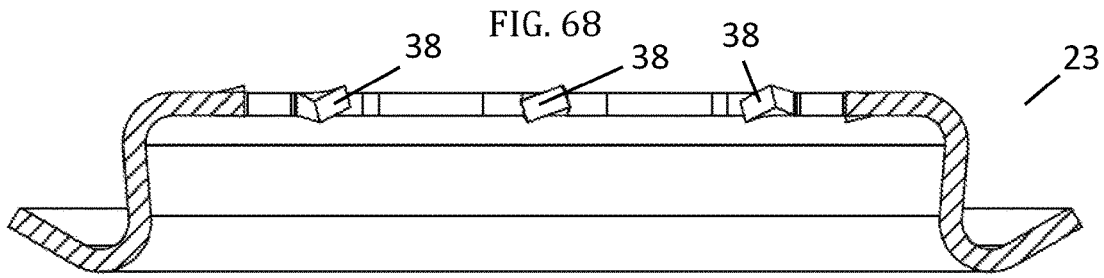
FIG. 69 shows a non-limiting example of a compressed resilience constituent in accordance with some embodiments of the present invention.

FIG. 63 shows a non-limiting example of a mount base (18) perhaps with screws (10) and even a resilience constituent (23). FIG. 24 shows a non-limiting example of a cover (16) perhaps with a cover hole (47) before it may be attached to a mount base (18). FIGS. 64 and 65 show a non-limiting example of a mount top (19). FIGS. 66-69 show a non-limiting example of a resilience constituent (23). FIG. 69 shows a non-limiting example of a compressed or even bent resilience constituent (23) and FIG. 68 shows a non-limiting example of a non-compressed resilience constituent (23).

Referring to FIGS. 60-69 and 24, a cover (16) perhaps with a cover hole (47) may be placed on a mount base (18) perhaps as shown in FIG. 63. A mount top (19) may be started into a mount base (18) perhaps by engaging mount top threads (30) in mount base threads (31). Mount top spanner holes (21) may be used to tighten a mount top (19) which may continue to compress a resilience constituent (23) perhaps until a mount top stop surface (26) may contact a top of a resilience constituent (23). A bottom of a resilience constituent (23) may contact a mount base stop surface (27) which may create a rigid connection between a mount top (19) and a resilience constituent (23) and a resilience constituent (23) and a mount base (18). This may create a rigid connection between a mount top (19) and a mount base (18).

A resilience constituent (23) may have locking teeth (38) that may embed into a mount top stop surface (26) and even a base stop surface (27) which may keep a mount top (19) and a mount base (18) from loosening.

A resilience constituent (23) may be compressed or even bent which may allow a resilience constituent to push up on a bottom of a cover (16), push a top of a cover (16) against a mount top cover surface (34) which may create a water intrusion barrier between a top of a cover (16) and even a mount top cover surface (34). Localized pressure from an edge of a resilience constituent (23) may create further pressure between a top of a cover (16) and a mount top cover surface (34) which may create a water intrusion barrier.

A cover (16) may be attached with an adhesive (17) perhaps to a water proof layer (15) perhaps as shown in FIG. 21. This may create a water intrusion barrier between a cover (16) and a water proof layer (15). With water intrusion barriers discussed, there may be no water intrusion path to a substrate (14) perhaps due to a mount (13).

An attachment structure (11) may be attached to a mount top (19). When a bolt (8) may be tightened, an attachment structure bottom surface (28) may contact a mount top surface (29) which may create a rigid connection between an attachment structure (11) and a mount top (19). This may create a rigid connection between an attachment structure (11) and a mount base (18).

FIGS. 70-83, 24, and 138, shows a non-limiting example of a mount (13), and an attachment structure (11) which may be attached to a mount (13). A substrate (14), adhesive (17), water proof layer (15), and even a mount extension (25) may not be shown may be apply.

Figure 70:
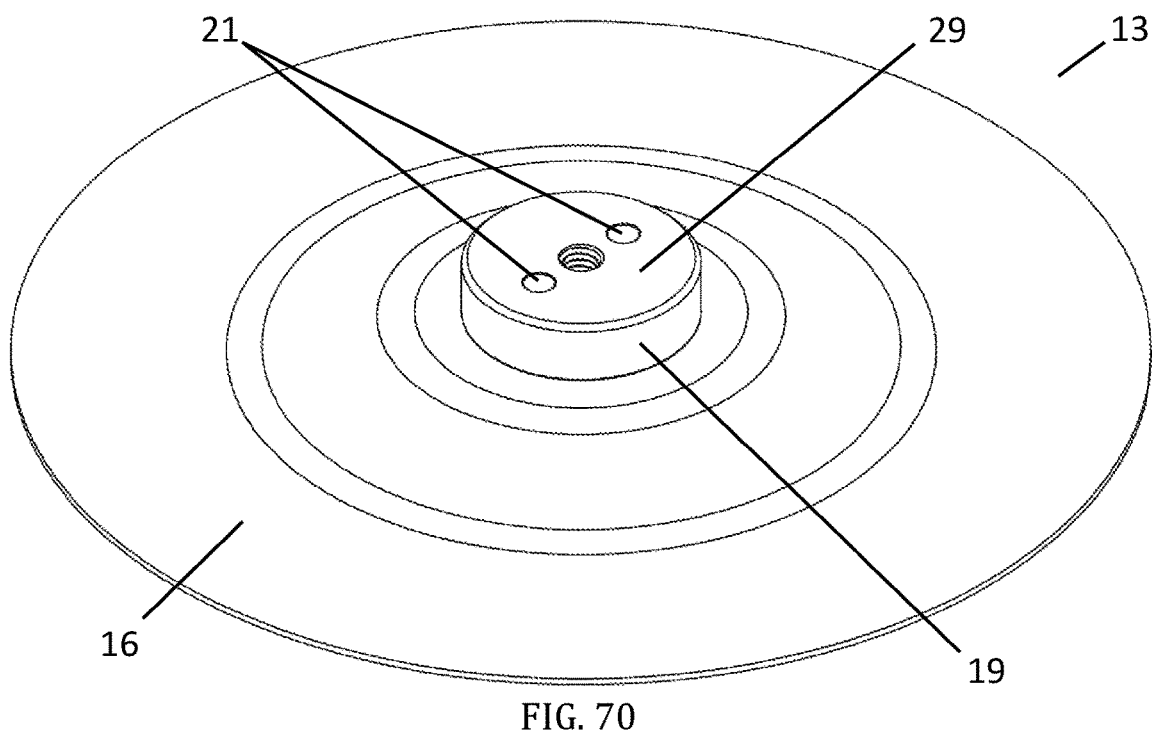
FIG. 70 shows a non-limiting example of a mount in accordance with some embodiments of the present invention.
Figure 71:
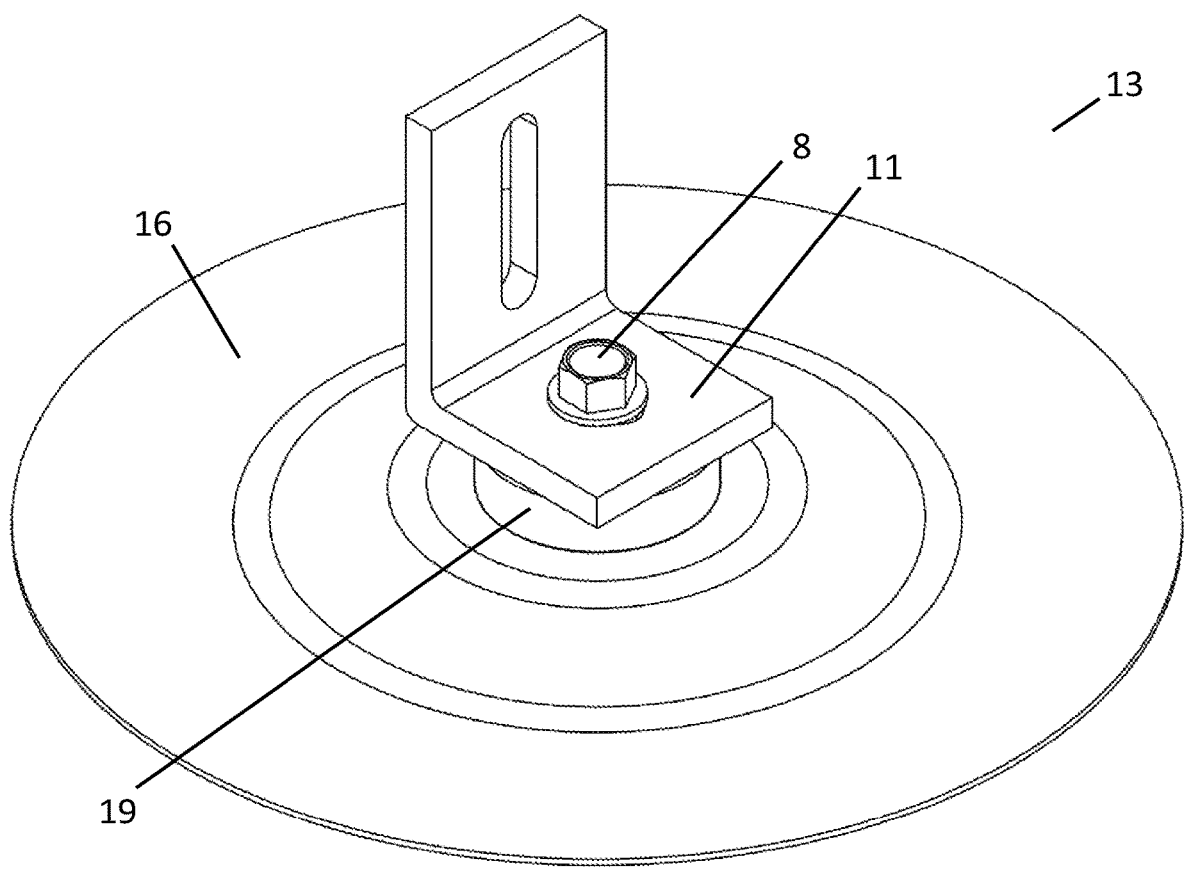
FIG. 71 shows a non-limiting example of a mount attached to an attachment structure in accordance with some embodiments of the present invention.
Figure 72:
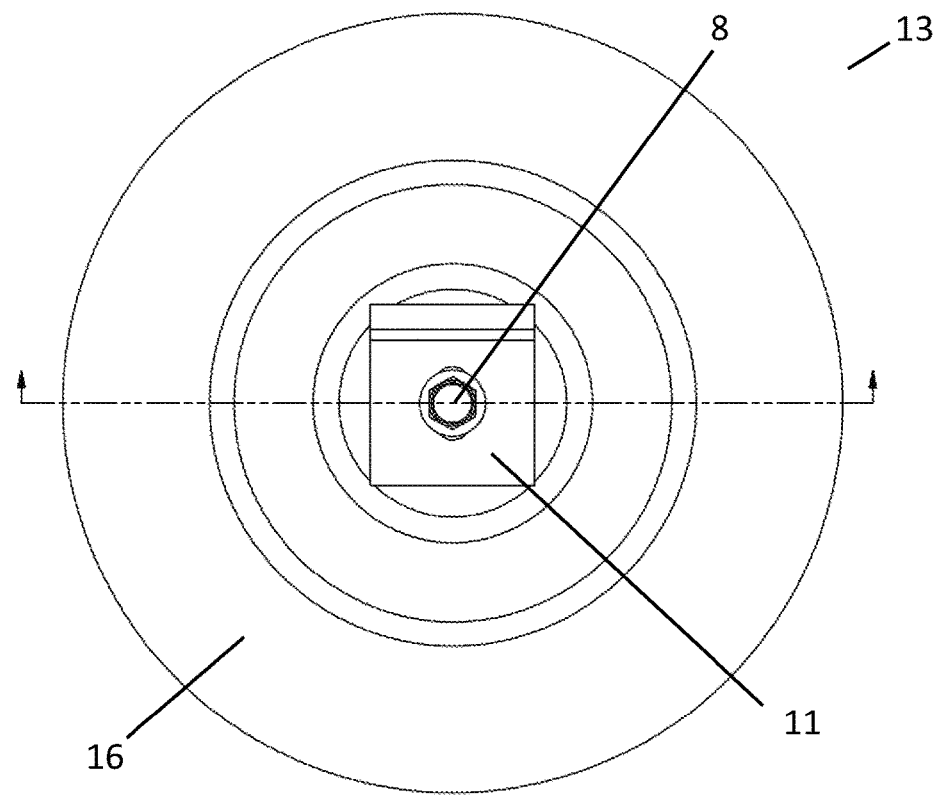
FIG. 72 shows a non-limiting example of a top view of FIG. 71 in accordance with some embodiments of the present invention.
Figure 73:
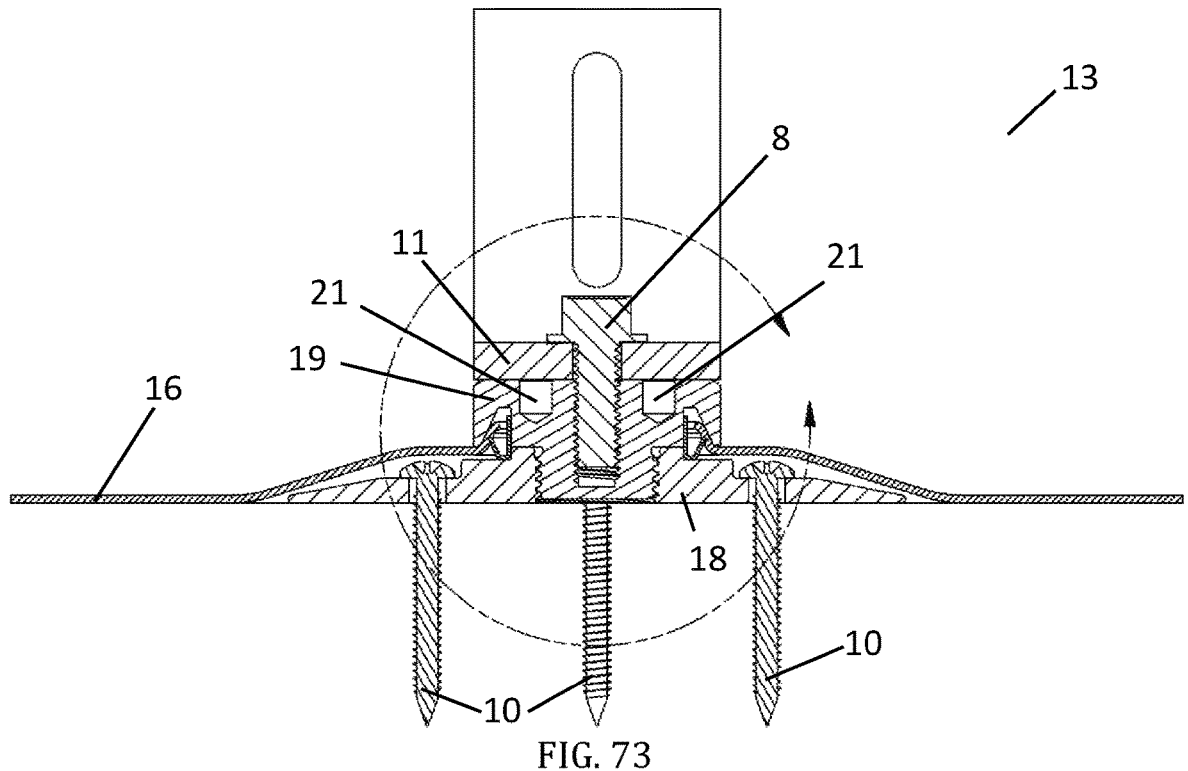
FIG. 73 shows a non-limiting example of a cross-section view of FIG. 72 in accordance with some embodiments of the present invention.
Figure 74:
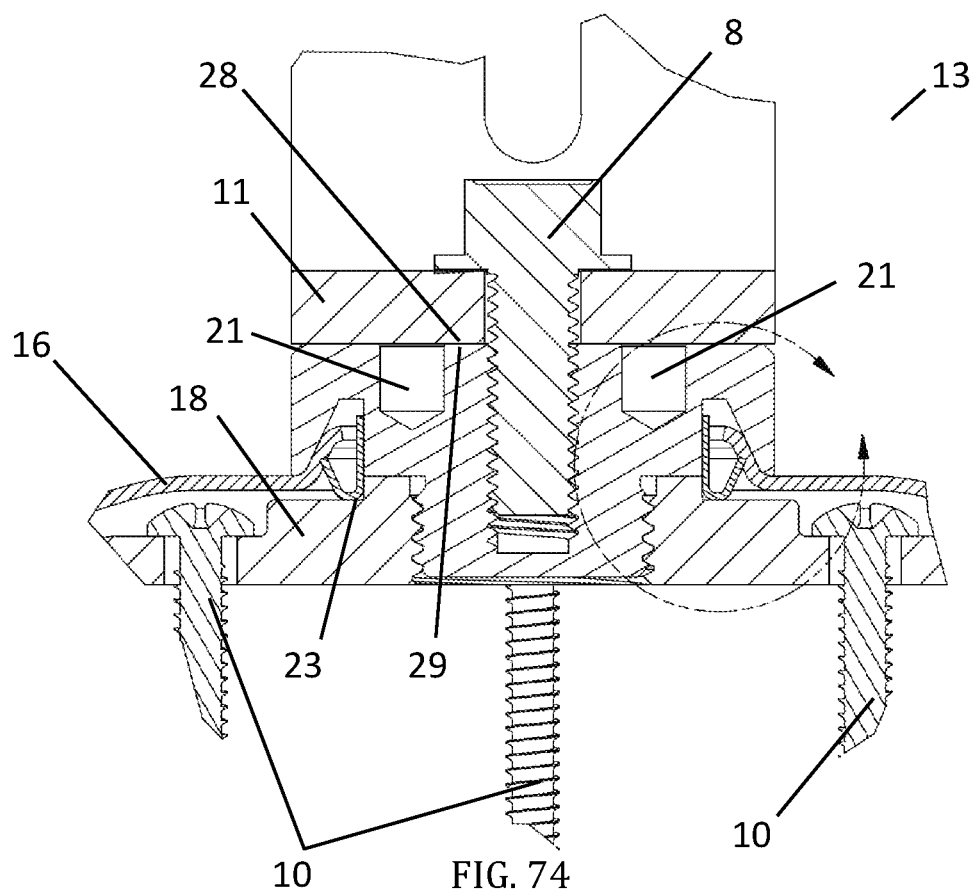
FIG. 74 shows a non-limiting example of an enlarged view of FIG. 73 in accordance with some embodiments of the present invention.
Figure 75:
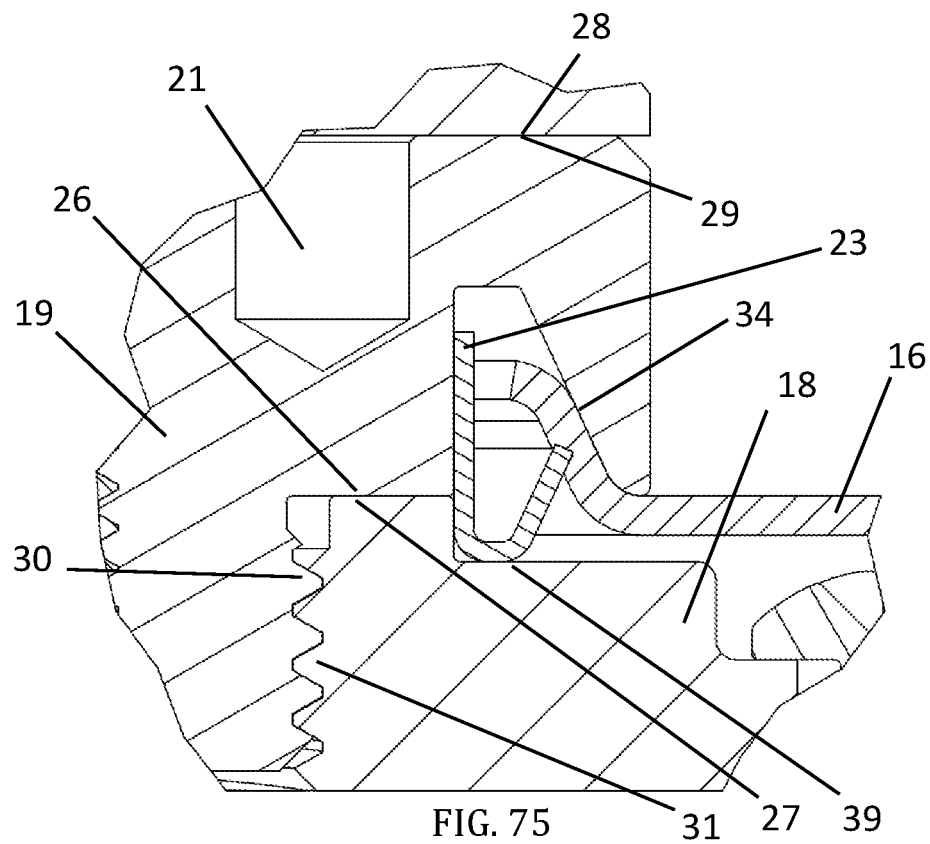
FIG. 75 shows a non-limiting example of an enlarged view of FIG. 74 in accordance with some embodiments of the present invention.
Figure 79:
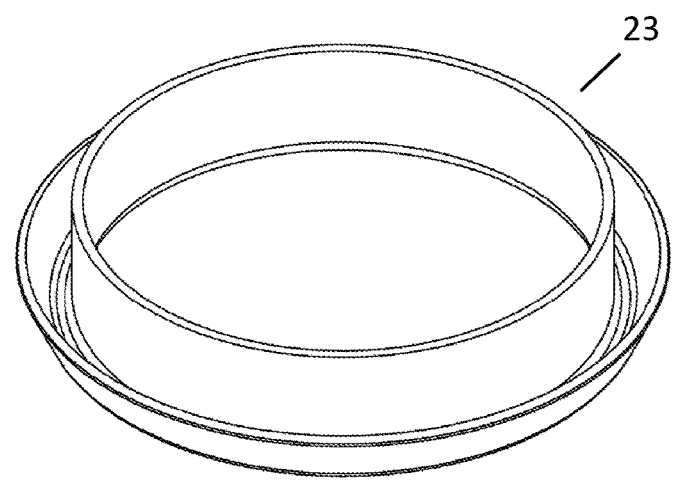
FIG. 79 shows a non-limiting example of a resilience constituent in accordance with some embodiments of the present invention.
Figure 80:
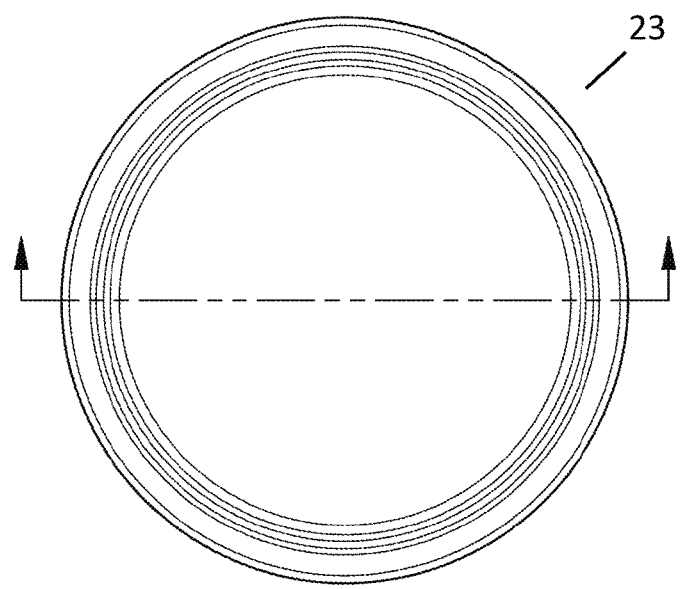
FIG. 80 shows a non-limiting example of a resilience constituent in accordance with some embodiments of the present invention.

FIG. 70 shows a non-liming example of a mount (13). FIG. 71 may be the same as FIG. 70 perhaps except an attachment structure (11) may be attached to a mount (13). FIG. 72 shows a top view of FIG. 71 and FIG. 73 is a cross-sectional view of FIG. 72. FIG. 74 shows an enlarged of the views shown in FIG. 73. FIG. 75 shows an enlarged view of FIG. 74.

FIG. 76 shows an assembly of a mount base (18) which may have a resilience constituent (23), screws (10), and even mount base screw holes (43). Screws (10) may attach a mount base (18) perhaps on a substrate (14) perhaps as shown in FIGS. 16, 19, and 20.

Figure 81:
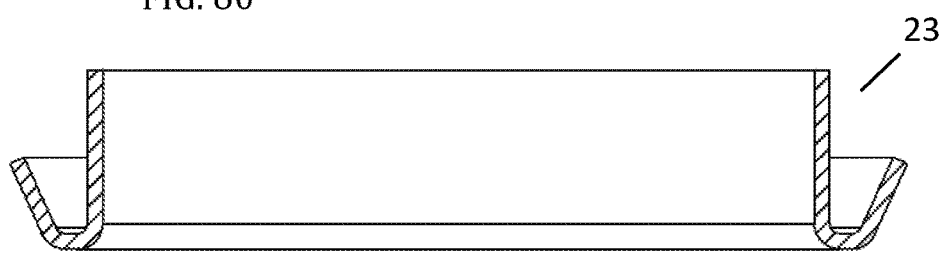
FIG. 81 shows a non-limiting example of a compressed resilience constituent in accordance with some embodiments of the present invention.
Figure 82:
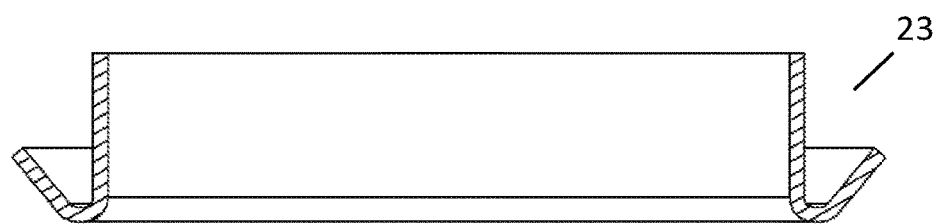
FIG. 82 shows a non-limiting example of a non-compressed resilience constituent in accordance with some embodiments of the present invention.

FIG. 76 shows a non-liming example of a mount base (18) perhaps with screws (10) and even a resilience constituent (23). FIG. 24 shows a non-liming example of a cover (16) which may have a cover hole (47) such as before it may be attached to a mount base (18). FIGS. 77 and 78 show a non-liming example of a mount top (19). FIGS. 79-82 show non-liming example of a resilience constituent (23). FIG. 81 shows a non-liming example of a compressed resilience constituent (23) and FIG. 82 shows a non-liming example of a non-compressed resilience constituent (23).

Figure 83:
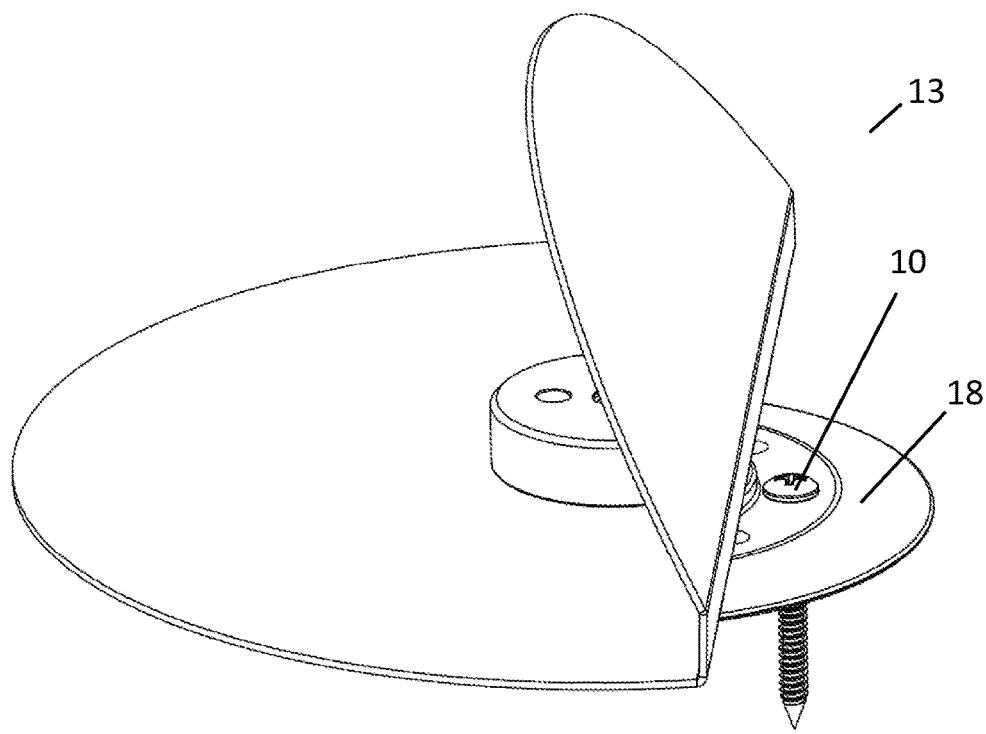
FIG. 83 shows a non-limiting example of a cover in accordance with some embodiments of the present invention.

FIG. 83 shows a non-liming example of a cover (16) which may be lifted up perhaps to expose screws (10). This FIG. 83 shows a non-liming example that a mount (13) may be assembled prior to attaching a mount base (18) with screws (10) to a substrate (14) perhaps by lifting up a cover (16).

Referring to FIGS. 73-82 and 24, a cover (16) with cover hole (47), as shown in FIG. 24, may be placed on a top of a mount base (18). A mount top (19) may then be started into a mount base (18) perhaps by engaging mount top threads (30) in mount base threads (31). A resilience constituent (23) may push a cover (16) against a mount top cover surface (34). A resilience constituent (23) may compress perhaps until a mount top stop surface (26) may rigidly contact a mount base stop surface (27). A mount base spring surface (39) may vertically retain a resilience constituent from moving downward. A mount top (19) may be securely tightened perhaps using mount top spanner holes (21) or any other feature which may allow a firm grip on a mount top (19). When securely tightened, a mount top stop surface (26) may rigidly contact a mount base stop surface (27) which may make a rigid connection between a mount top (19) and a mount base (18).

When a resilience constituent (23) may be compressed, it may exert a force on a bottom of a cover (16) and may even push a top cover against a mount top cover surface (34) which may create a water intrusion barrier between a top of a cover (16) and a mount top cover surface (34). Localized pressure from an edge of a resilience constituent (23) may create further pressure between a top of a cover (16) and against a mount top cover surface (34) which may increase a water intrusion barrier.

A cover (16) may be attached with an adhesive (17) to a water proof layer (15) perhaps as shown in FIG. 21. This may create a water intrusion barrier between a cover (16) and a water proof layer (15). With water intrusion barriers discussed, water intrusion into a substrate (14) perhaps due to a mount (13) may not occur. When a bolt (8) may be tightened, an attachment structure bottom surface (28) may make a rigid contact with a mount top surface (29).

There may now be rigid contacts between an attachment structure (11) and a mount base (18). A mount base (18) may be attached to a substrate (14) perhaps with screws (10) through mount base screw holes (33) perhaps after attaching a mount top (19). A mount (13) may be assembled and then attached to a substrate (14). As shown in the non-limiting example of FIG. 83, a cover (16) may be lifted and screws (10) may be screwed through mount base screw holes, into a substrate (14). An attachment structure (11) may be attached to a mount (13) perhaps prior to a mount (13) being attached to a substrate (14). Additional attachment structures may be attached to an attachment structure (11) perhaps prior to a mount (13) attachment to a substrate (14). This may allow for moving attachment structures around perhaps prior to a mount (13) attachment. Once everything may be in place, screws (10) may be screwed in a substrate (14) and a cover (16) which may then be attached to a water proof layer (15) with an adhesive (17) perhaps as shown in FIG. 21.

FIGS. 84-96, 24 and 138, show a non-limiting example of a mount (13) and an attachment structure (11) may be attached to a mount (13). A substrate (14), an adhesive (17), a water proof layer (15), and perhaps a mount extension (25) may not be shown but may apply in some embodiments.

Figure 84:
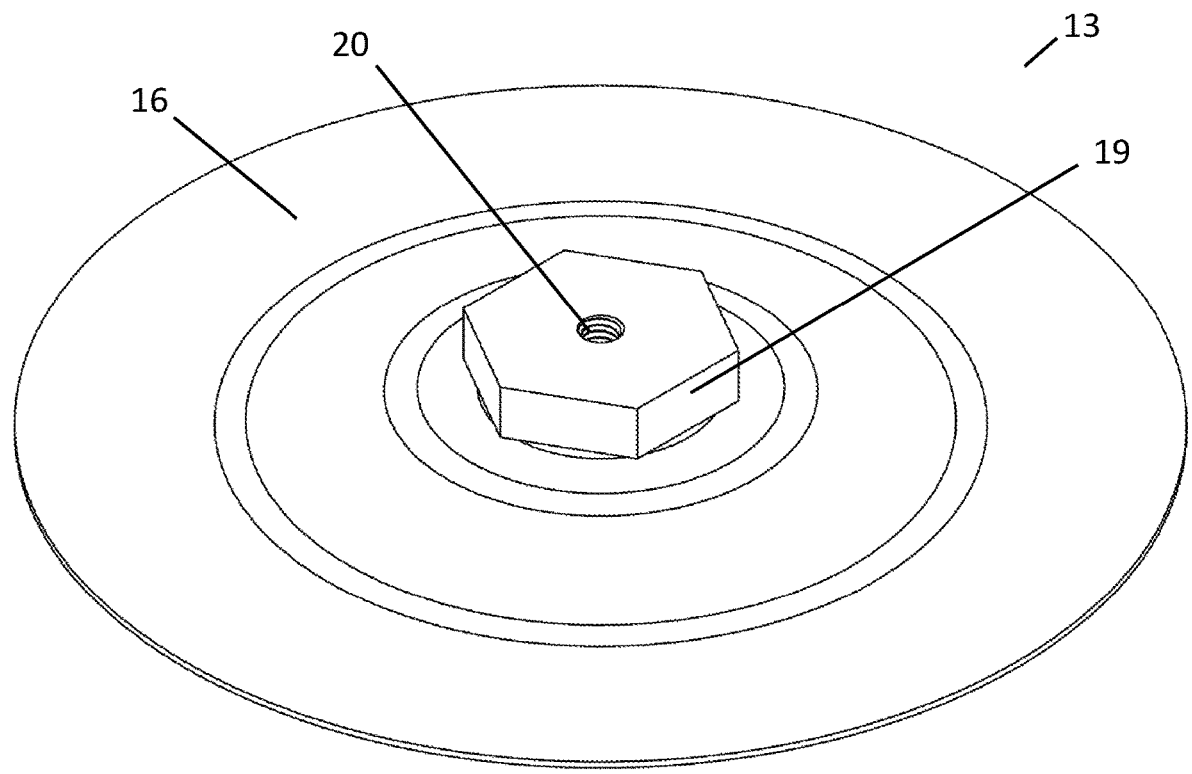
FIG. 84 shows a non-limiting example of a mount in accordance with some embodiments of the present invention.
Figure 85:
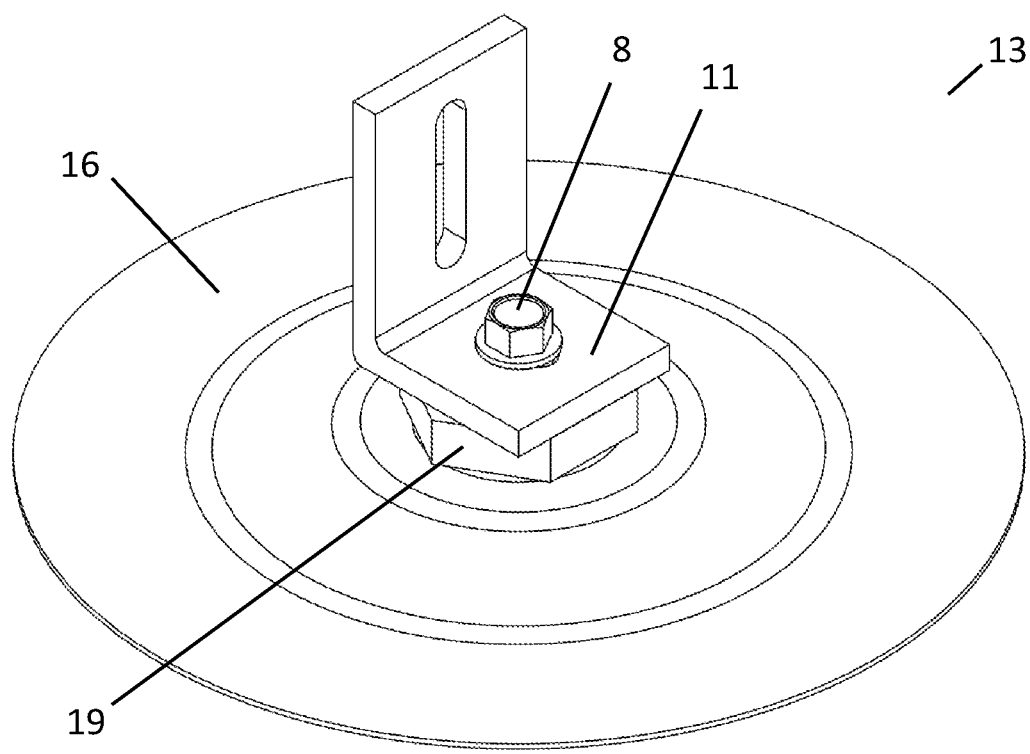
FIG. 85 shows a non-limiting example of a mount attached to attachment structure in accordance with some embodiments of the present invention.
Figure 86:
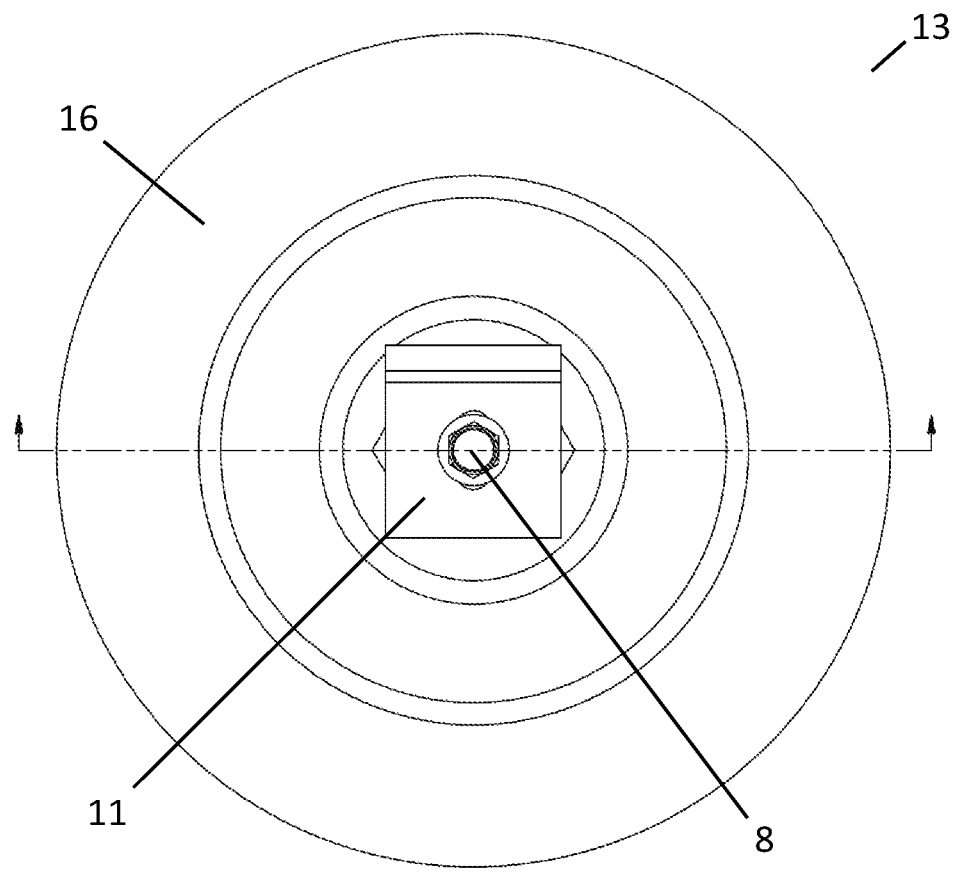
FIG. 86 shows a non-limiting example of a top view of FIG. 85 in accordance with some embodiments of the present invention.
Figure 87:
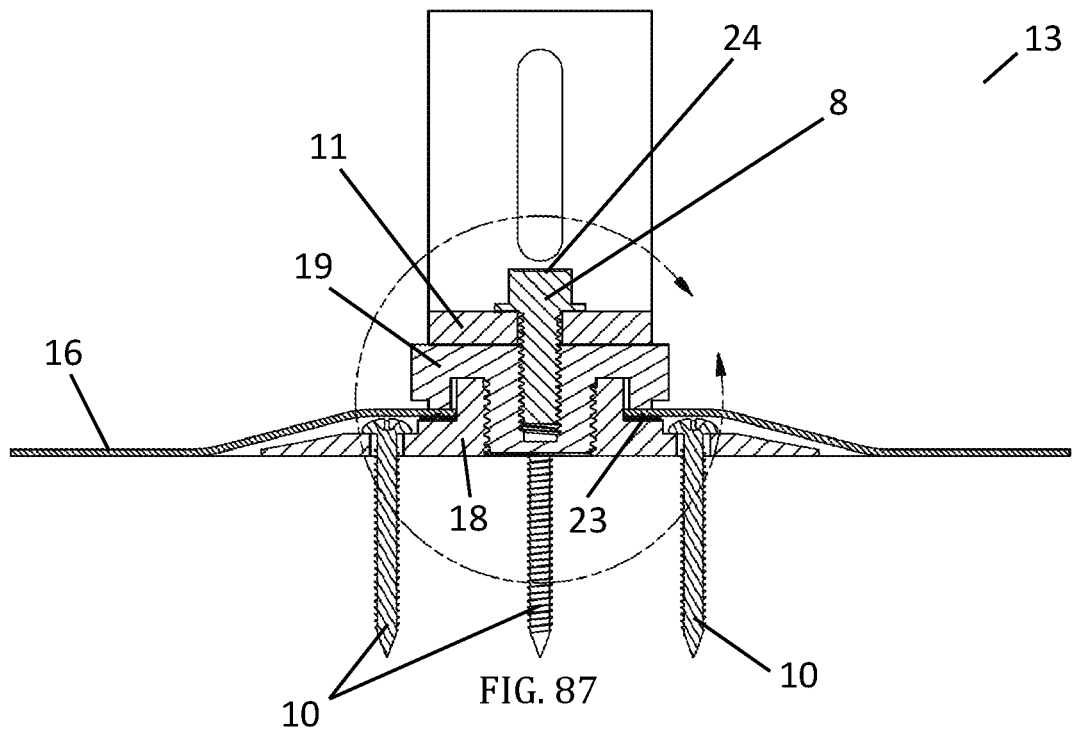
FIG. 87 shows a non-limiting example of a cross-sectional view of FIG. 86 in accordance with some embodiments of the present invention.
Figure 88:
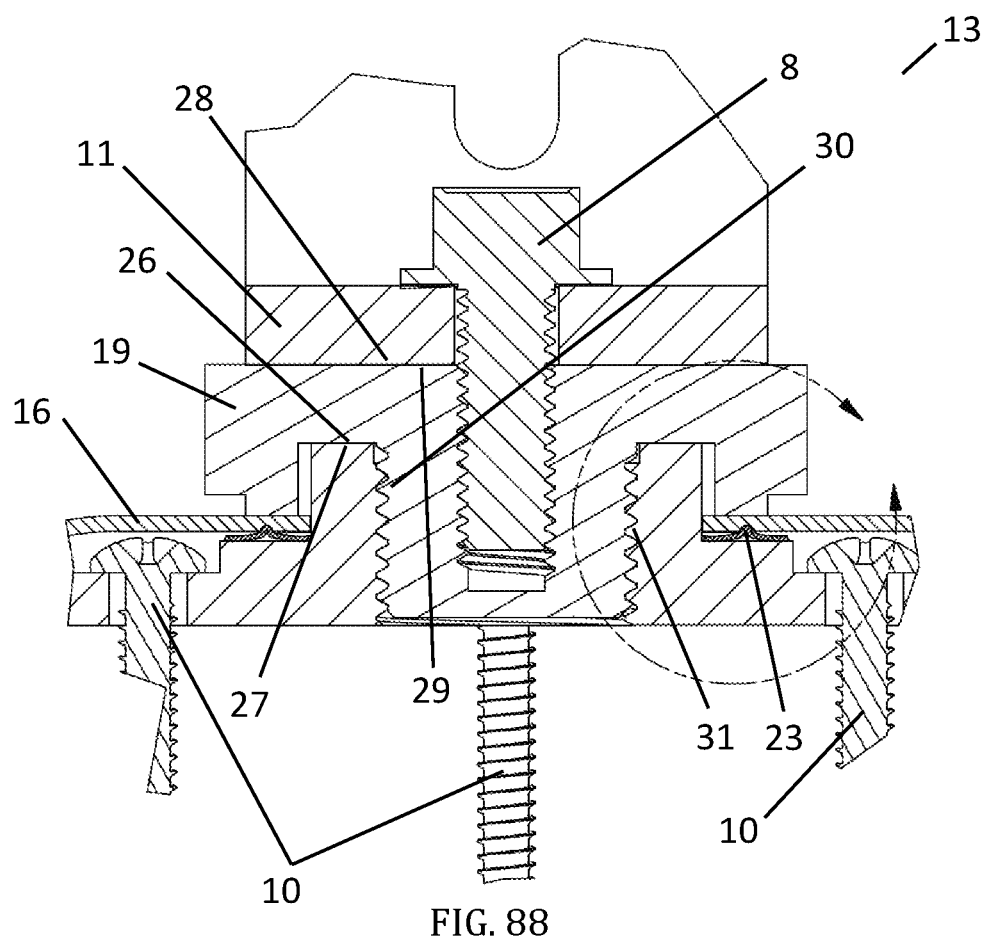
FIG. 88 shows a non-limiting example of an enlarged view of FIG. 87 in accordance with some embodiments of the present invention.
Figure 89:
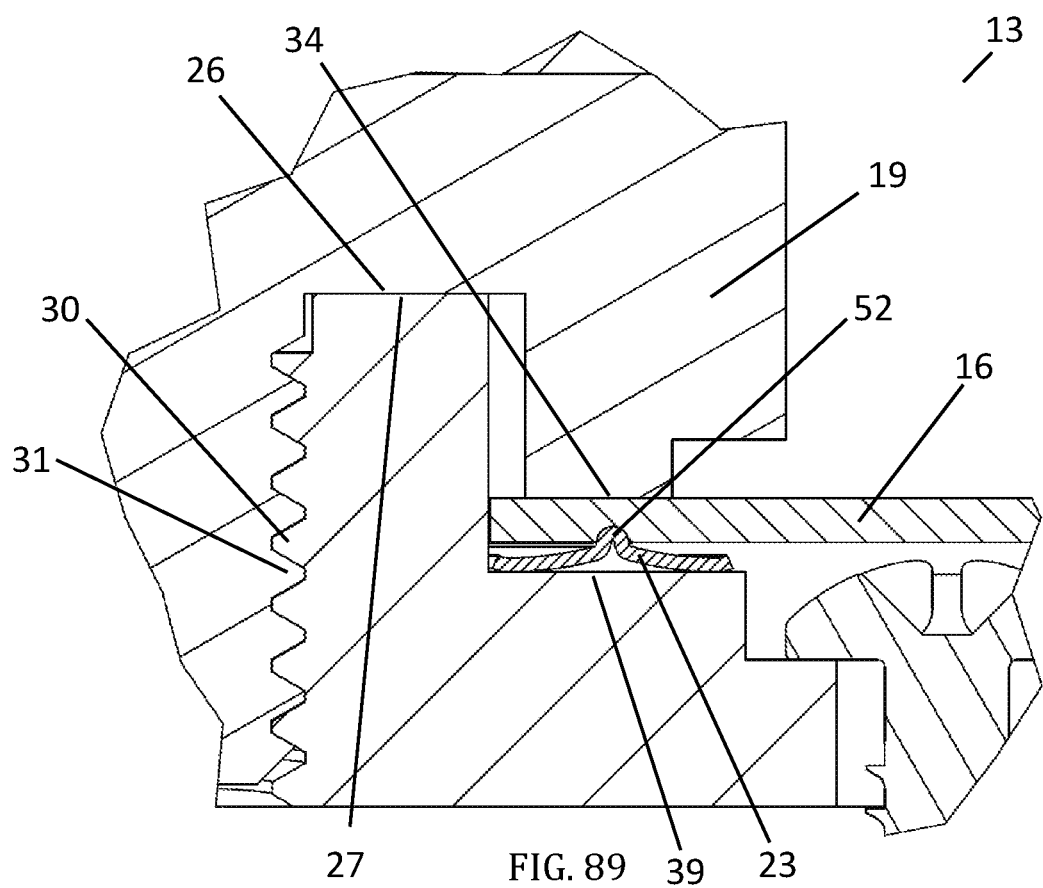
FIG. 89 shows a non-limiting example of an enlarged view of FIG. 88 in accordance with some embodiments of the present invention.

FIG. 84 shows a non-limiting example of a mount (13). FIG. 85 may be same as FIG. 84 perhaps except with an attachment structure (11) may be attached to a mount (13). FIG. 86 shows a non-limiting example of a top view of FIG. 85 and FIG. 87 is a cross-sectional view of FIG. 86. FIG. 88 shows an enlarged of the views shown in FIG. 87. FIG. 89 shows an enlarged view of FIG. 88.

Figure 90:
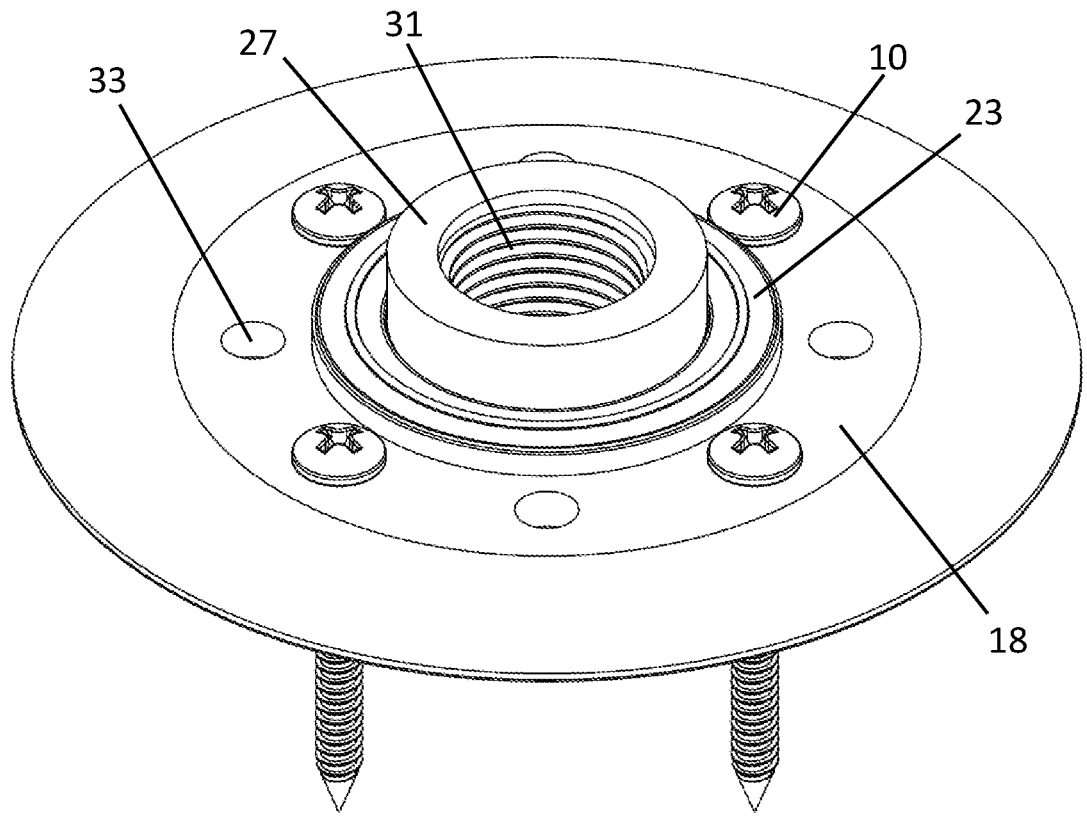
FIG. 90 shows a non-limiting example of a mount base in accordance with some embodiments of the present invention.
Figure 91:
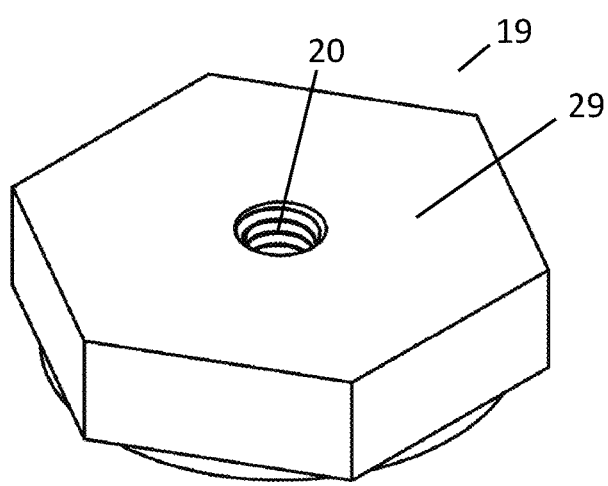
FIG. 91 shows a non-limiting example of a mount top in accordance with some embodiments of the present invention.
Figure 92:
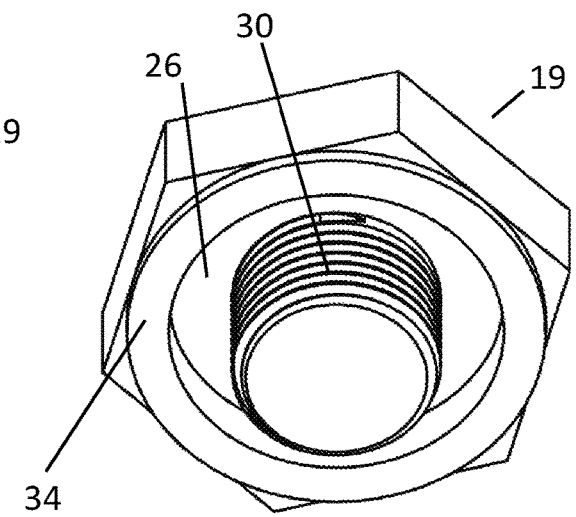
FIG. 92 shows a non-limiting example of a mount top in accordance with some embodiments of the present invention.
Figure 93:
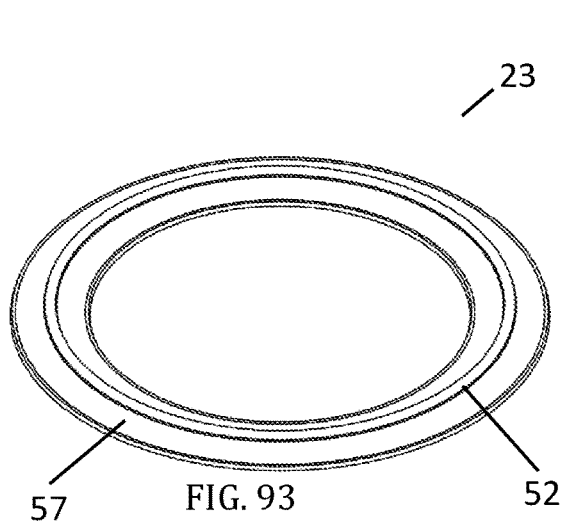
FIG. 93 shows a non-limiting example of resilience constituent in accordance with some embodiments of the present invention.
Figure 94:
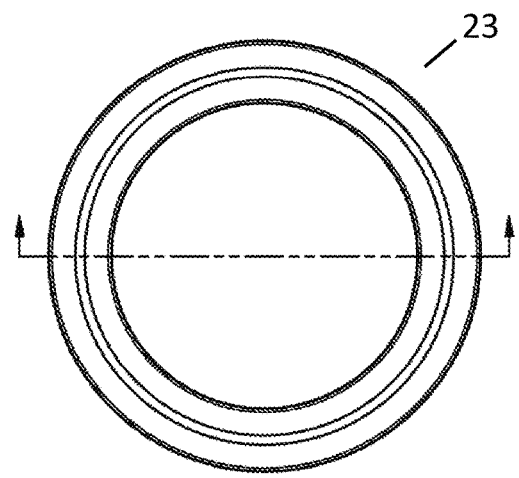
FIG. 94 shows a non-limiting example of a resilience constituent in accordance with some embodiments of the present invention.
Figure 95:
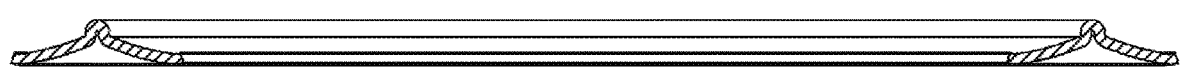
FIG. 95 shows a non-limiting example of a non-compressed resilience constituent in accordance with some embodiments of the present invention.
Figure 96:
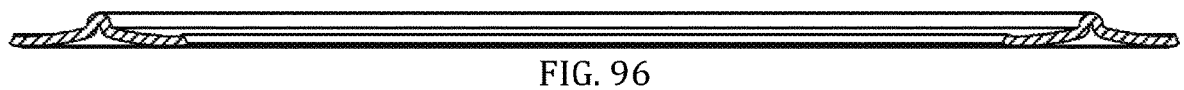
FIG. 96 shows a non-limiting example of a compressed resilience constituent in accordance with some embodiments of the present invention.

FIG. 90 shows a non-limiting example of a mount base (18) perhaps with screws (10) and even a resilience constituent (23). FIG. 24 shows a non-limiting example of a cover (16) with a cover hole (47) perhaps before it may be attached to a mount base (18). FIGS. 91 and 92 show a non-limiting example of a mount top (19). FIGS. 93-96 show a non-limiting example of a resilience constituent (23). FIG. 96 shows a non-limiting example of a compressed resilience constituent (23) and FIG. 95 shows a non-limiting example of a non-compressed resilience constituent (23).

Referring to FIGS. 87-96 and 24, a cover (16) perhaps with a cover hole (47) perhaps as shown in FIG. 24 may be placed on a top of a mount base (18). A mount top (19) may be screwed into a mount base (18) perhaps by engaging mount top threads (30) in a mount base threads (31). A resilience constituent (23) may push a cover (16) against a mount top cover surface (34). A resilience constituent (23) may compress perhaps until a mount top stop surface (26) may rigidly contact a mount base stop surface (27). In embodiments, a resilience constituent may be a disk (57) perhaps with a middle ridge (52) such as shown in the non-limiting example in FIGS. 89 and 93. A ridge may be near a middle of a disk or may be at any location on a disk or the like. In some embodiments, there may be more than one ridge in a resilience constituent. A middle ridge may apply pressure to a roof mount perhaps when compressed. A middle ridge may be an upper edge, an angle, a wave or the like and may have a height of a ridge of between about 0.01 and about 0.1 inches. Of course, any height may be used and all are included in this disclosure. A mount base spring surface (39) may prevent a resilience constituent (23) from vertically moving downward. A mount top (19) may be securely tightened perhaps using mount top spanner holes (21) or any other feature that could allow a firm grip on a mount top (19). When securely tightened, a mount top stop surface (26) may rigidly contact a mount base stop surface (27) which may make a rigid connection between a mount top (19) and a mount base (18).

When a resilience constituent (23) may be compressed, it may exert a force on a bottom of a cover (16) and even push a top cover against a mount top cover surface (34) which may create a water intrusion barrier between a top of a cover (16) and a mount top cover surface (34). Localized pressure from a protrusion of a resilience constituent (23) may create further pressure between a top of a cover (16) and a mount top cover surface (34) which may cause a water intrusion barrier.

A cover (16) may be attached with an adhesive (17) perhaps to a water proof layer (15) perhaps as shown in FIG. 21. This may create a water intrusion barrier between a cover (16) and a water proof layer (15). With water intrusion barriers discussed, water intrusion into a substrate (14) perhaps due to a mount (13) may not occur.

When a bolt (8) may be tightened, an attachment structure bottom surface (28) may make a rigid contact with a mount top upper surface (41). There may now be rigid contacts between an attachment structure (11) and a mount base (18).

FIGS. 97-120, and 24, show a non-limiting example of a mount (13) and an attachment structure (11) perhaps attached to a mount (13). A substrate (14), an adhesive (17), a water proof layer (15), and a mount extension (25) may not be shown but may apply in some embodiments.

Figure 97:
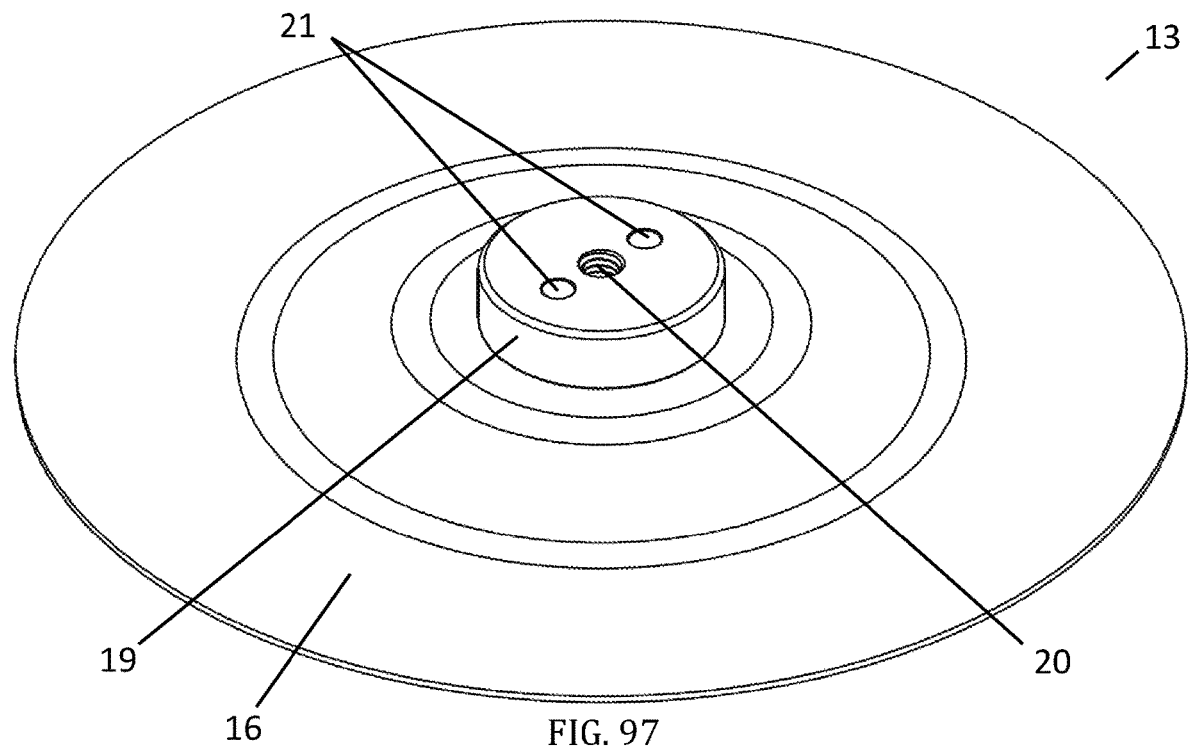
FIG. 97 shows a non-limiting example of mount in accordance with some embodiments of the present invention.
Figure 98:
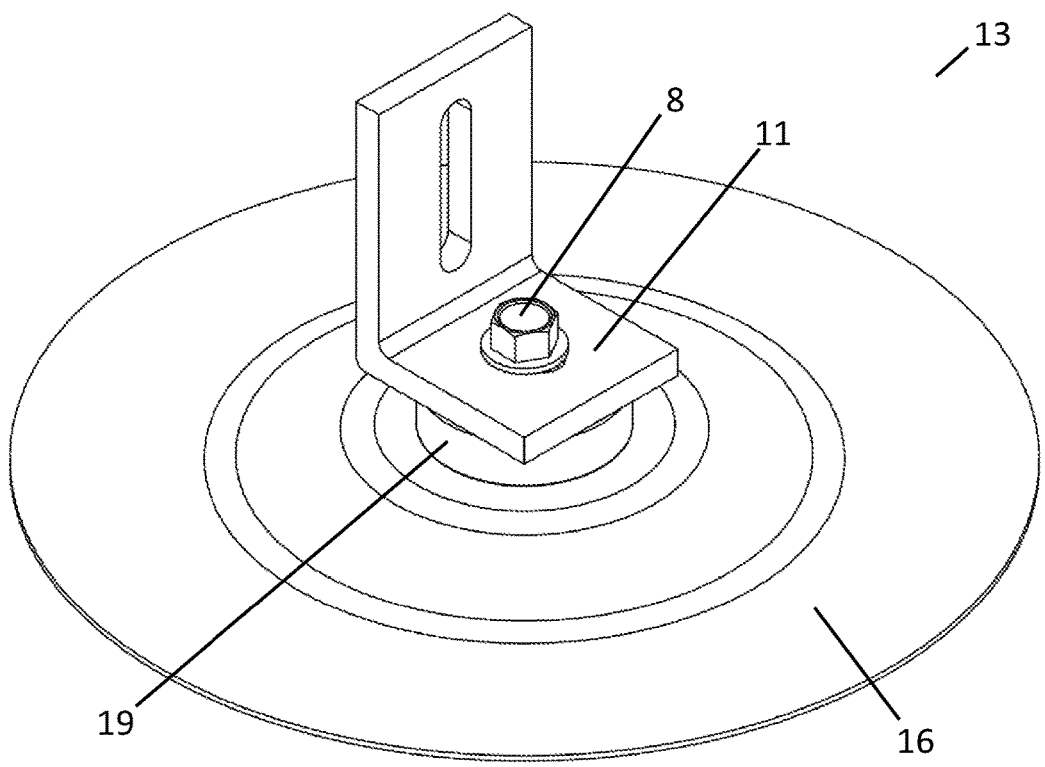
FIG. 98 shows a non-limiting example of a mount attached to an attachment structure in accordance with some embodiments of the present invention.
Figure 99:
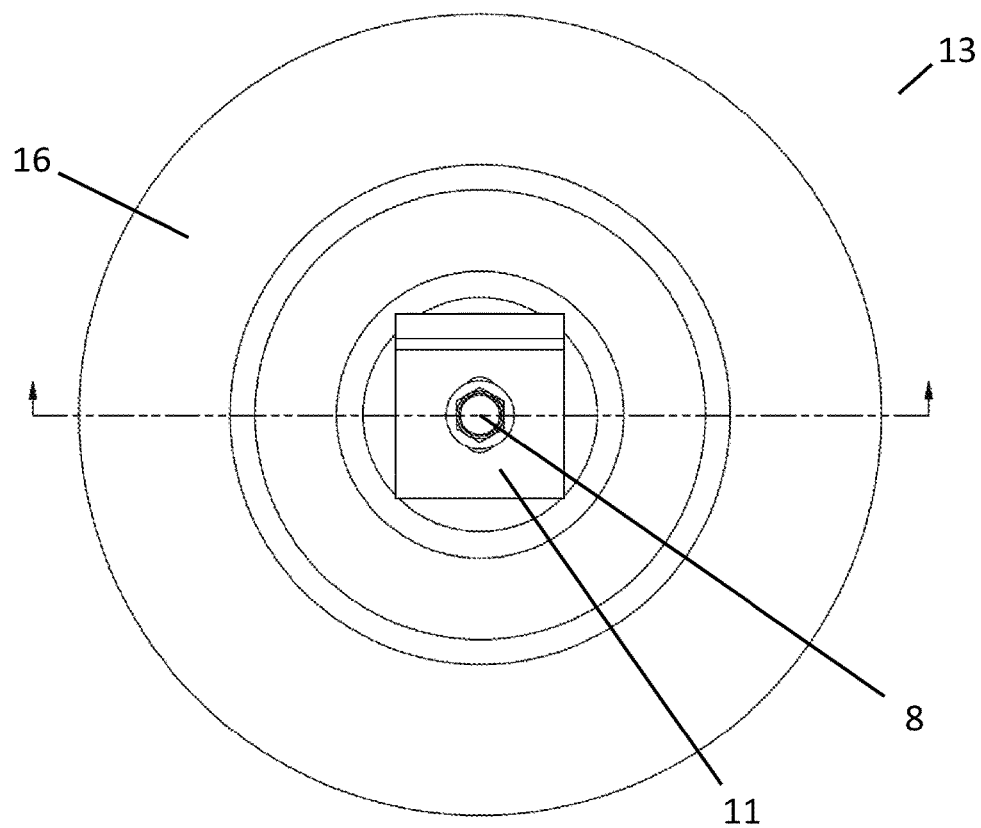
FIG. 99 shows a non-limiting example of a top view of FIG. 98 in accordance with some embodiments of the present invention.
Figure 101:
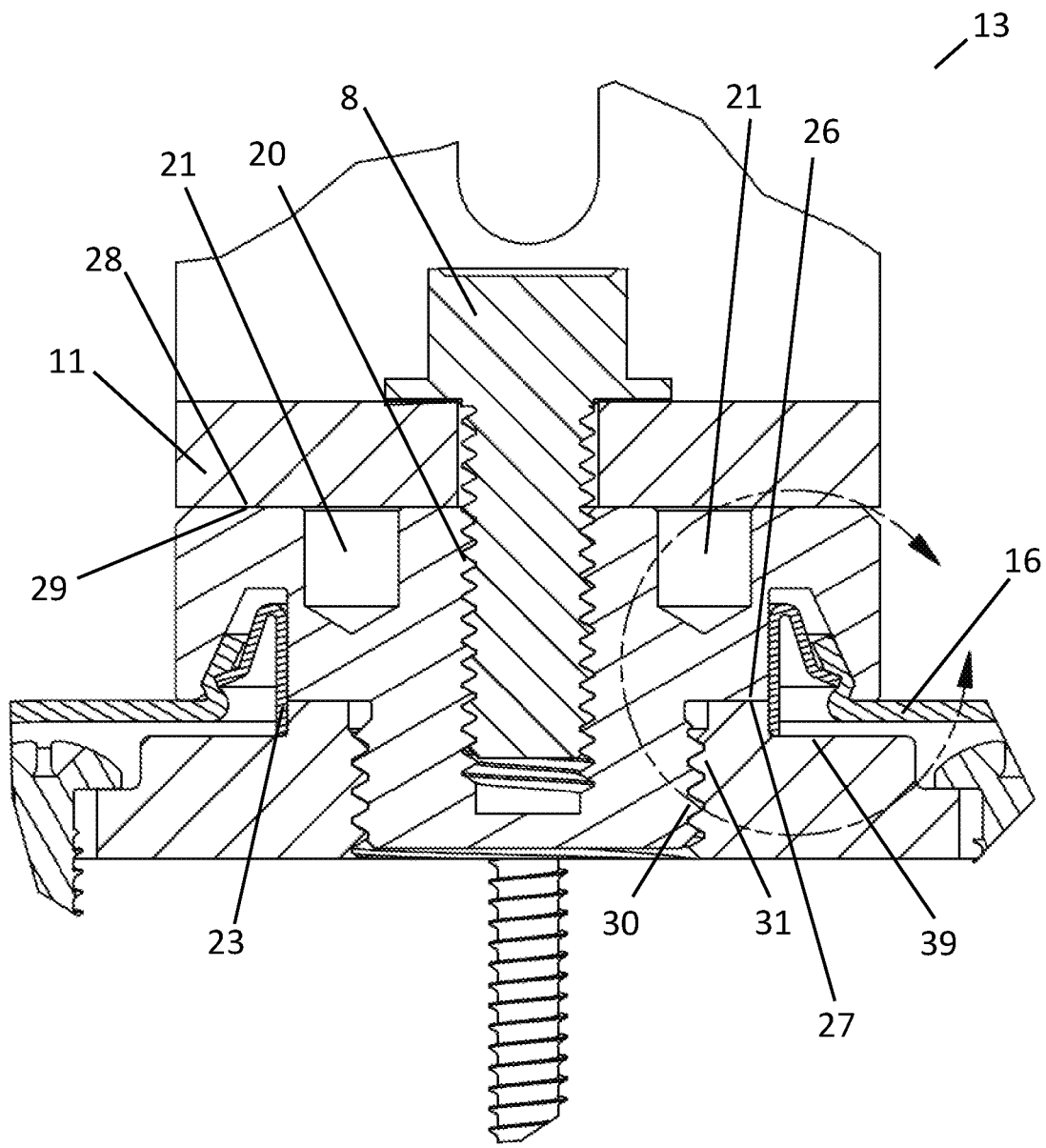
FIG. 101 shows a non-limiting example of an enlarged view of FIG. 100 in accordance with some embodiments of the present invention.
Figure 102:
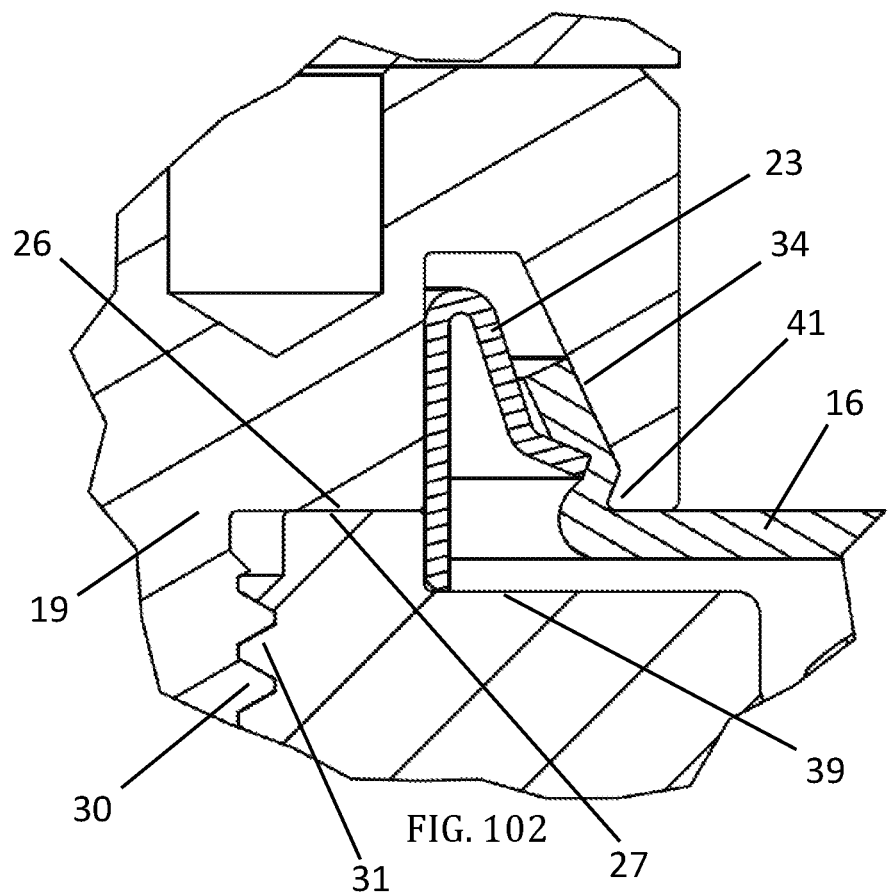
FIG. 102 shows a non-limiting example of an enlarged view of FIG. 101 in accordance with some embodiments of the present invention.
Figure 103:
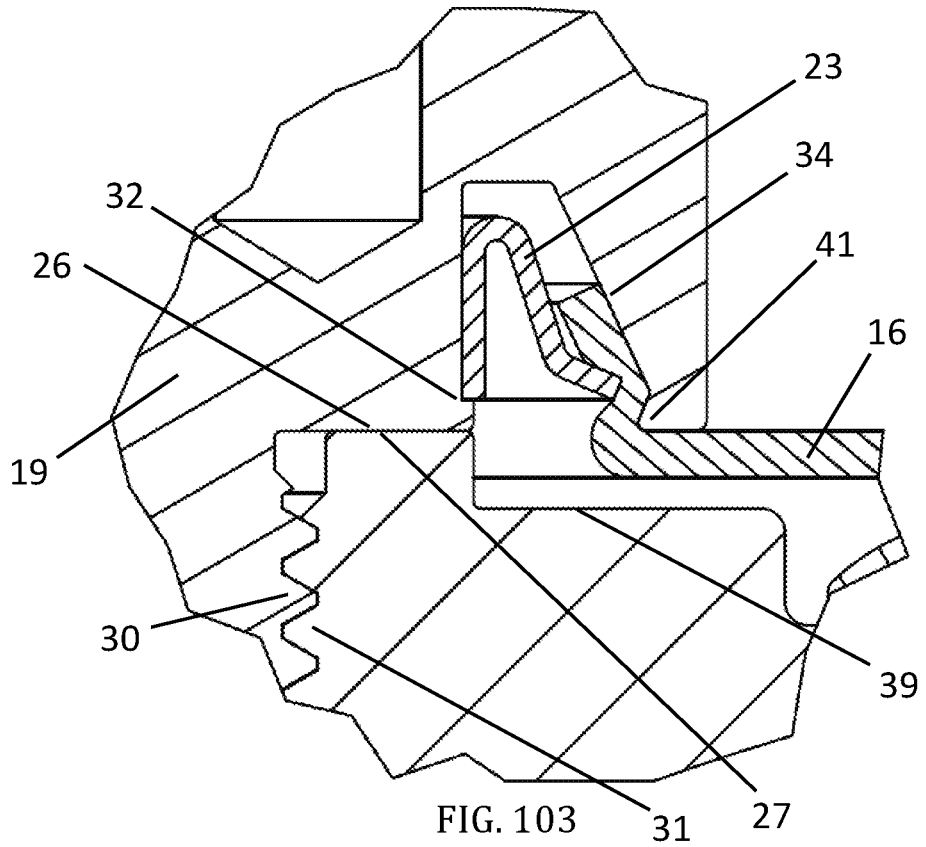
FIG. 103 shows a non-limiting example of an enlarged view of FIG. 101 in accordance with some embodiments of the present invention.
Figure 104:
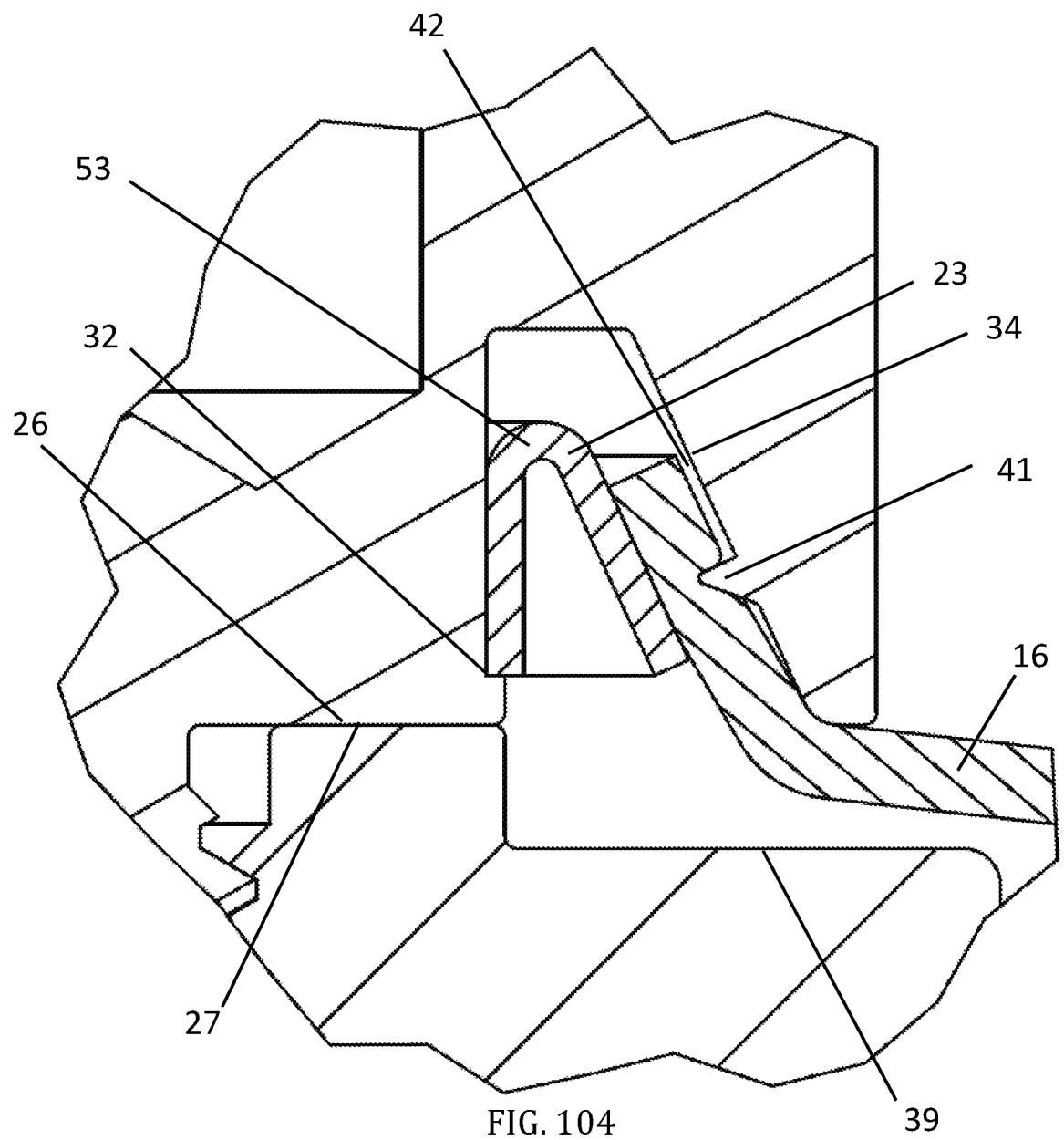
FIG. 104 shows a non-limiting example of an enlarged view of FIG. 101 in accordance with some embodiments of the present invention.

FIG. 97 shows a non-limiting example of a mount (13). FIG. 98 may be the same as FIG. 97 perhaps except showing an attachment structure (11) which may be attached to a mount (13). FIG. 99 shows a non-limiting example of a top view of FIG. 98 and FIG. 100 is a cross-sectional view of FIG. 99. FIG. 101 shows an enlarged representation of the view shown in FIG. 100. FIG. 102-104 shows a non-limiting example of a variations of an enlarged view of FIG. 101.

Figure 105:
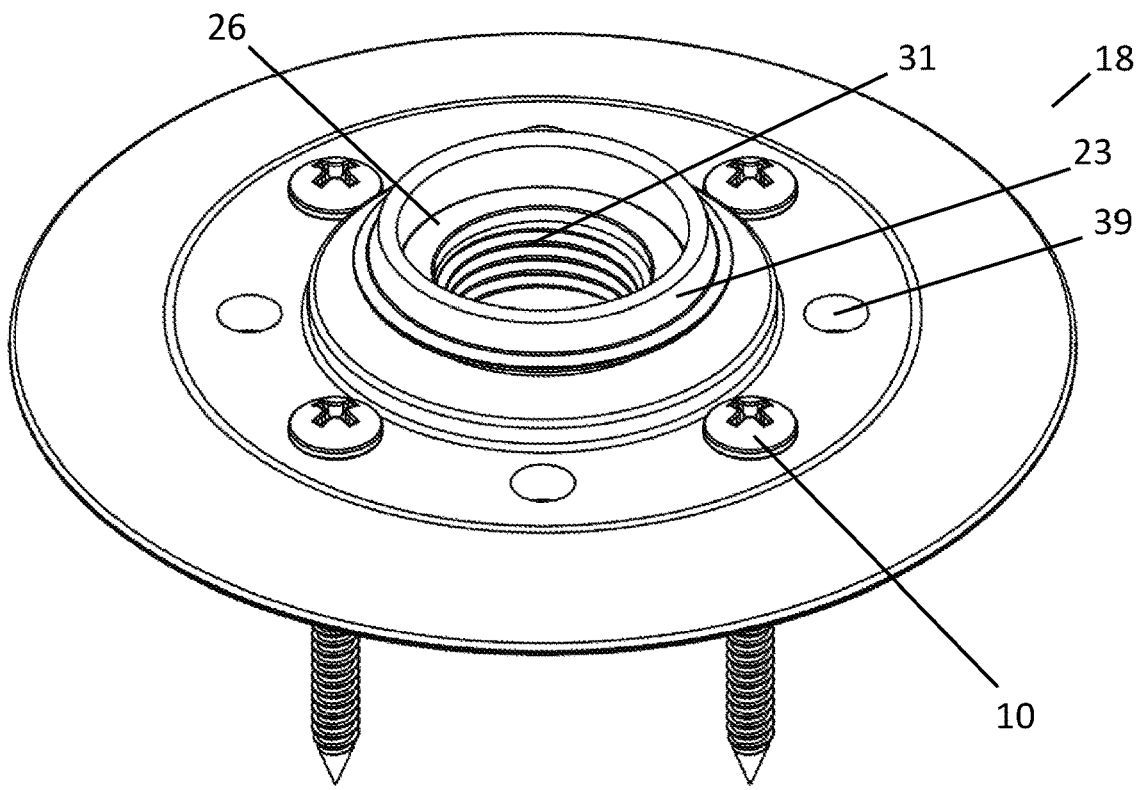
FIG. 105 shows a non-limiting example of a mount base in accordance with some embodiments of the present invention.
Figure 106:
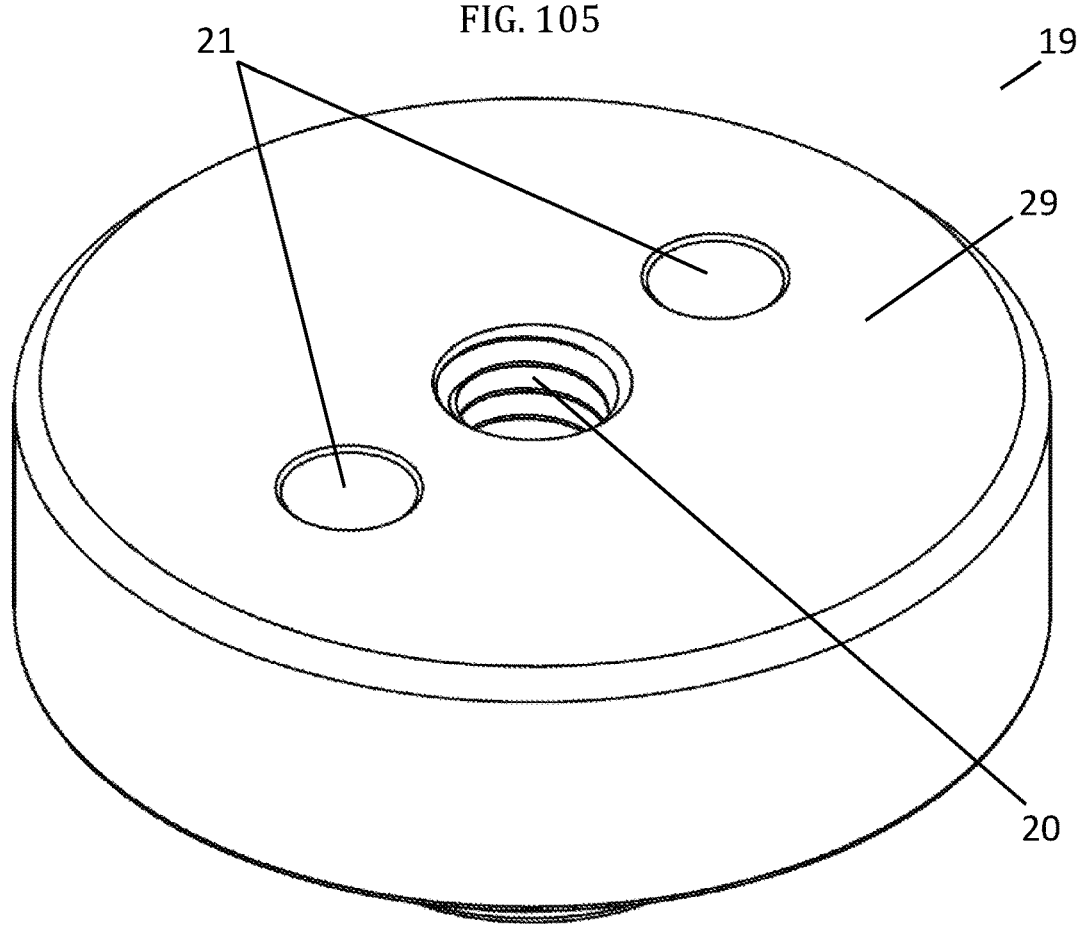
FIG. 106 shows a non-limiting example of a top view of a mount top in accordance with some embodiments of the present invention.

FIG. 105 shows a non-limiting example of a mount base (18) perhaps with screws (10) and even a resilience constituent (23). A resilience constituent (23) shown may be shown in FIGS. 100-102. FIG. 24 shows a non-limiting example of a cover (16) perhaps with a cover hole (47) before it may be attached to a mount base (18). FIG. 106 shows a non-limiting example of a top perspective view of a mount top (19).

Figure 107:
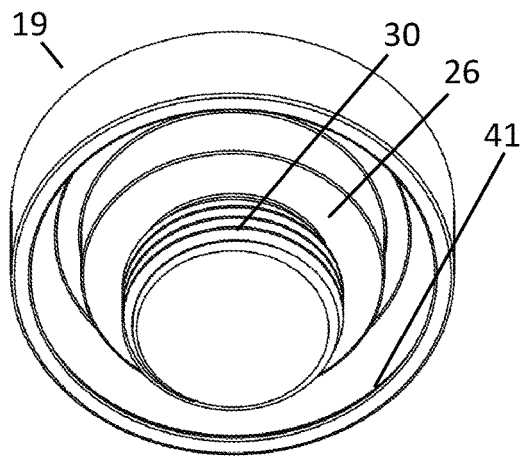
FIG. 107 shows a non-limiting example of a bottom view of a mount top in accordance with some embodiments of the present invention.
Figure 111:
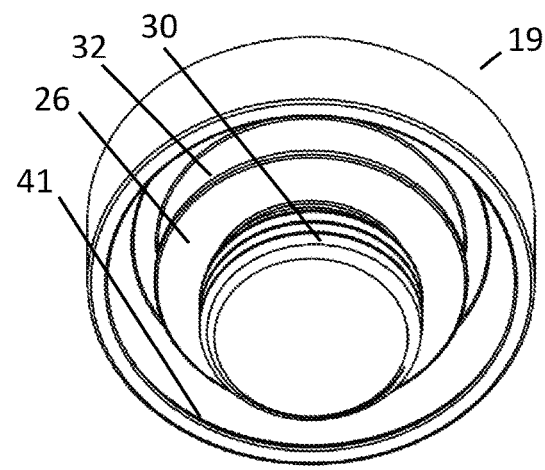
FIG. 111 shows a non-limiting example of a bottom view of a mount top in accordance with some embodiments of the present invention.
Figure 115:
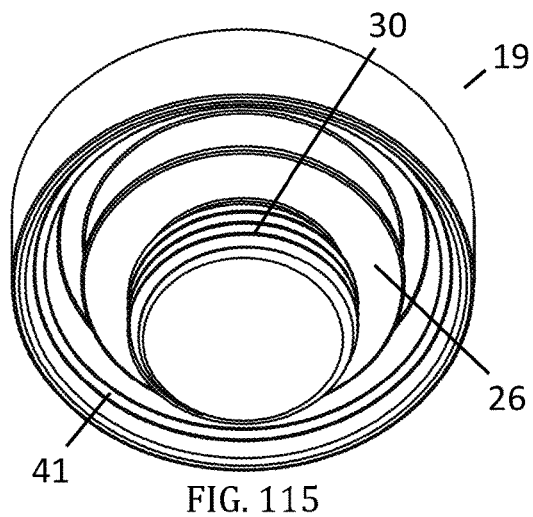
FIG. 115 shows a non-limiting example of a bottom perspective view of a bottom mount in accordance with some embodiments of the present invention.

FIG. 107 shows a non-limiting example of a bottom perspective view of a mount top (19) perhaps as shown in FIGS. 100-102. FIG. 111 shows a non-limiting example of a bottom perspective view of a mount top (19) in FIG. 103. FIG. 115 shows a non-limiting example of a bottom perspective view of a mount top (19) in FIG. 104.

Figure 108:
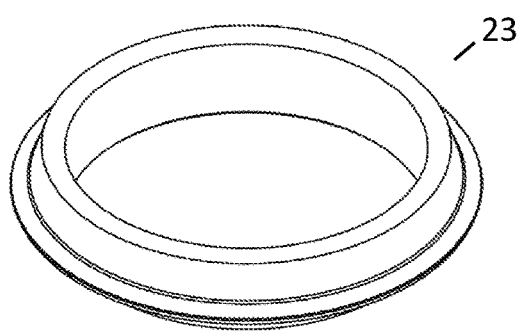
FIG. 108 shows a non-limiting example of a resilience constituent in accordance with some embodiments of the present invention.
Figure 112:
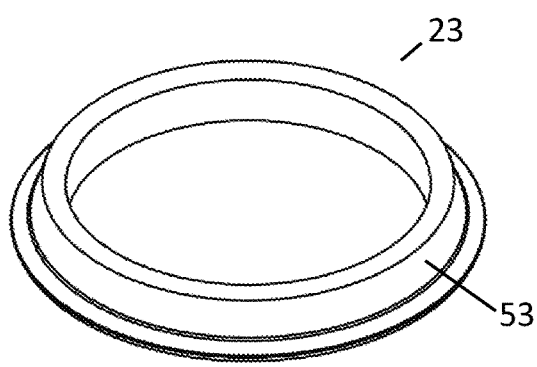
FIG. 112 shows a non-limiting example of a resilience constituent in accordance with some embodiments of the present invention.
Figure 109:
FIG. 109 shows a non-limiting example of a non-compressed resilience constituent in accordance with some embodiments of the present invention.
Figure 113:
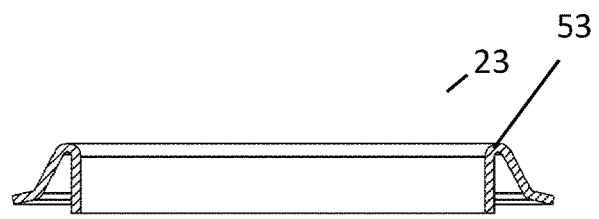
FIG. 113 shows a non-limiting example of attachment of a non-compressed resilience constituent in accordance with some embodiments of the present invention.
Figure 110:
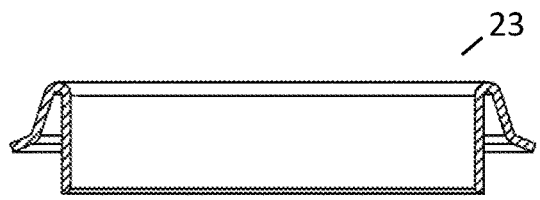
FIG. 110 shows a non-limiting example of a compressed resilience constituent in accordance with some embodiments of the present invention.
Figure 114:
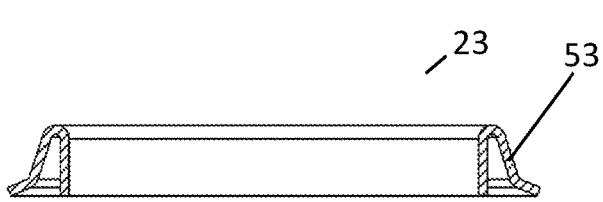
FIG. 114 shows a non-limiting example of a compressed resilience constituent in accordance with some embodiments of the present invention.
Figure 116:
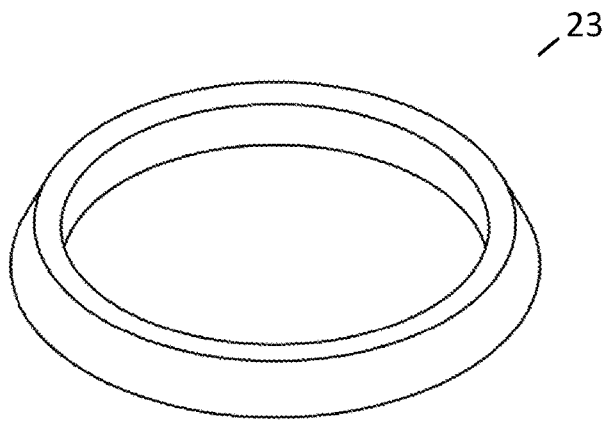
FIG. 116 shows a non-limiting example of a resilience constituent in accordance with some embodiments of the present invention.
Figure 117:
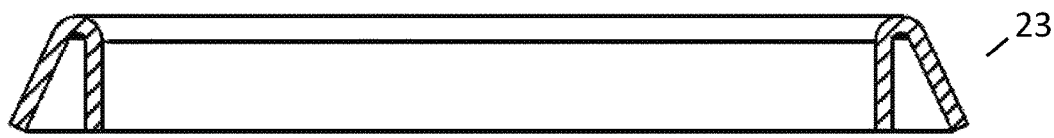
FIG. 117 shows a non-limiting example of a compressed resilience constituent in accordance with some embodiments of the present invention.
Figure 118:
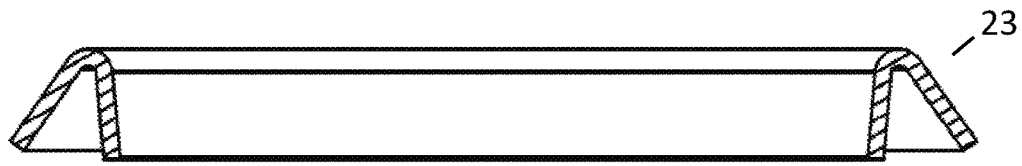
FIG. 118 shows a non-limiting example of a non-compressed resilience constituent in accordance with some embodiments of the present invention.

FIGS. 108-110 show a non-limiting example of a resilience constituent (23) perhaps was shown in FIGS. 100-102. A resilience constituent (23) may be an arched disk (53) perhaps as may be understood from the non-limiting examples as shown in FIGS. 104, 112 and 113. An arched disk may have an arch height of about 0.25 inches, between about 0.1 and about 0.5 inches, or the like. Of course, any height can by used and all are included in this disclosure. An arched disk or any other resilience constituent may be snapped into a top mount perhaps when a resilience constituent may be compressed and a cover may be deformed when the arched disk may be snapped into place. An arched disk or any other resilience constituent may be pre-made into a mount perhaps as a pre-made top mount that has an arched disk. FIG. 110 shows a non-limiting example of a compressed resilience constituent (23) and FIG. 109 shows a non-limiting example of a non-compressed resilience constituent (23). FIGS. 112-114 show a non-limiting example of a resilience constituent (23) in FIGS. 103, 119 and 120. FIG. 114 shows a non-limiting example of a compressed resilience constituent (23) and FIG. 113 shows a non-limiting example of a non-compressed resilience constituent (23). FIGS. 116-118 show a resilience constituent (23) in FIG. 104. FIG. 117 shows a non-limiting example of a compressed resilience constituent (23) and FIG. 118 shows a non-limiting example of a non-compressed resilience constituent (23).

Figure 119:
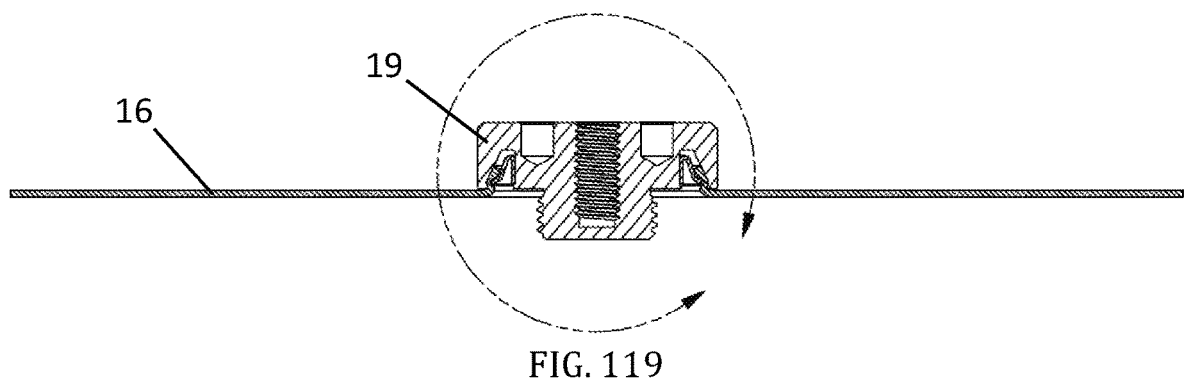
FIG. 119 shows a non-limiting example of a mount top in accordance with some embodiments of the present invention.
Figure 120:
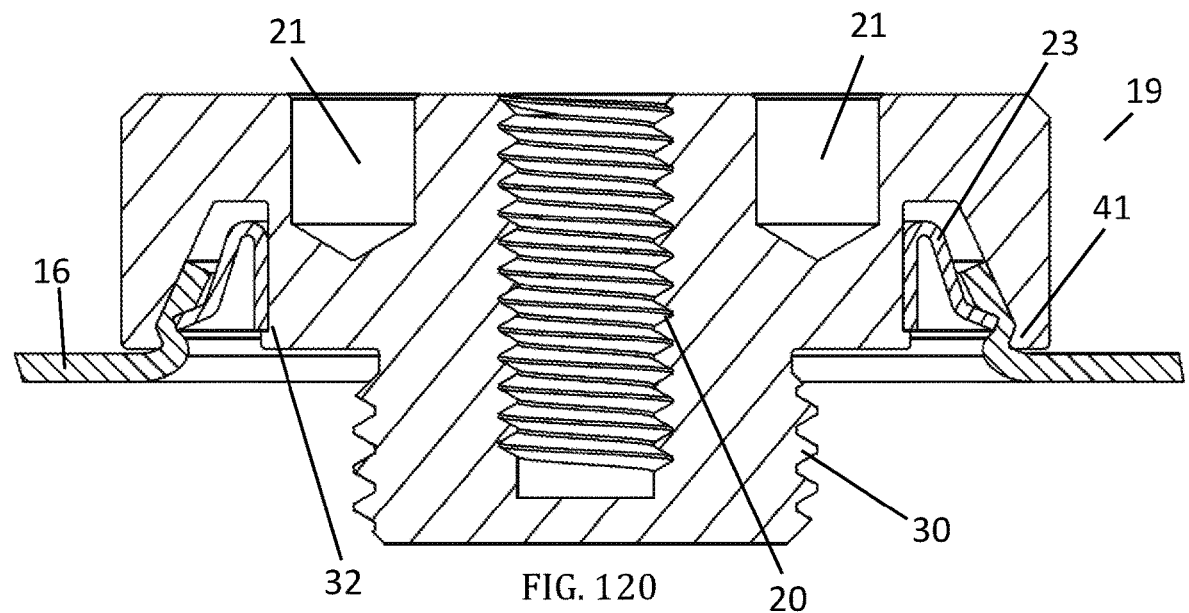
Figure 121:
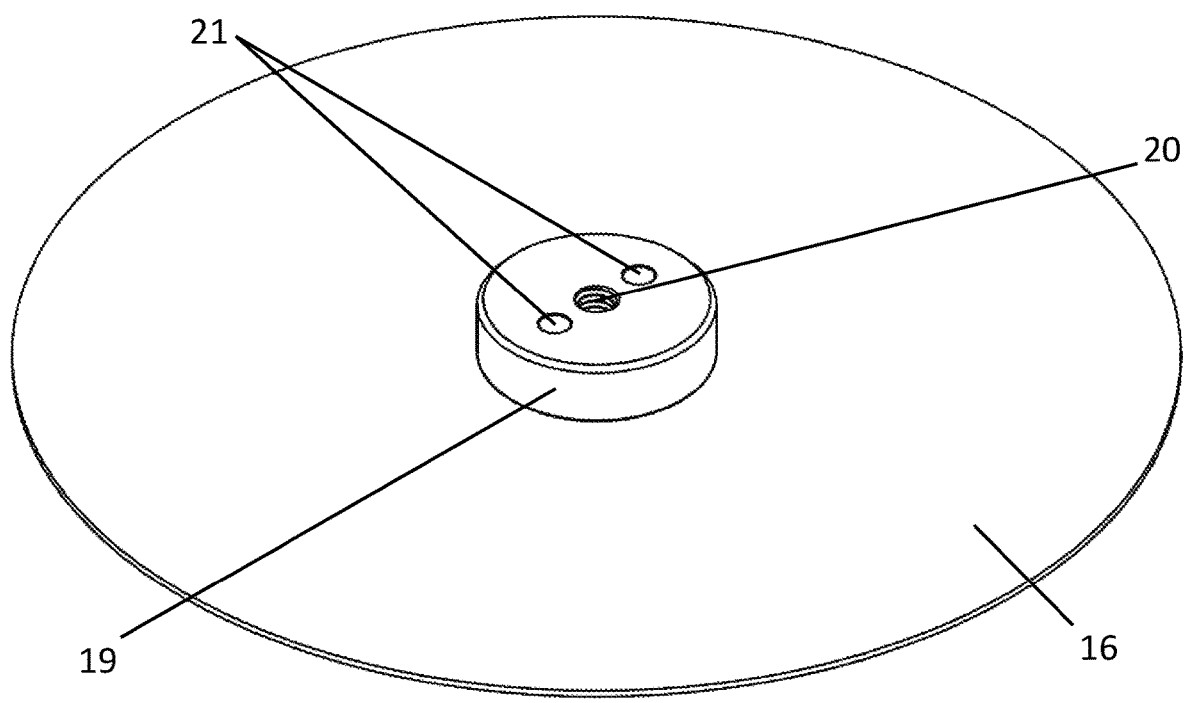

FIG. 119 shows a non-limiting example of a mount top (19), a cover (16), and a resilience constituent (23) assembly. FIG. 120 shows a cross-section of FIG. 119. FIG. 121 shows a non-liming example of a mount top with a threaded hole (20) and spanner holes (21).

Referring to FIGS. 100-102, 105-110 and 24, a cover (16) perhaps with cover hole (47) as shown in FIG. 24, may be placed on a top of a mount base (18). A mount top (19) may then be screwed into a mount base (18) perhaps by engaging mount top threads (30) in mount base threads (31). A mount base spring surface (39) may hold a resilience constituent (23) in place and a resilience constituent (23) may push a cover (16) into a mount top (19) and even against a mount top cover surface (34). A resilience constituent (23) may compress perhaps until a mount top stop surface (26) may rigidly contact a mount base stop surface (27). A mount top (19) may be securely tightened perhaps using mount top spanner holes (21) or any other feature which may allow a firm grip on a mount top (19). When securely tightened, a mount top stop surface (26) may rigidly contact a mount base stop surface (27) which may make a rigid connection between a mount top (19) and a mount base (18).

When a resilience constituent (23) may be compressed, it may exert a force on a bottom of a cover (16) and may push a top cover against a mount top cover surface (34) which may create a water intrusion barrier between a top of a cover (16) and even a mount top cover surface (34). Localized pressure edge of a resilience constituent (23) may create further pressure between a top of a cover (16) and a mount top cover surface (34) which may make a water intrusion barrier better. A top roof mount may include at least one mount top protrusion (41). A mount top protrusion (41) may deform a cover (16) and may increase a water intrusion barrier effectiveness. This may also increase a pull out strength of a cover (16) from a mount top (19).

FIG. 103 shows a non-limiting example of a resilience constituent (23) and a mount top (19) that may be similar to the ones in FIG. 102 but a resilience constituent (23) may be able to be retained in place by a spring pocket (32) perhaps in a mount top (19). This may allow a resilience constituent (23) to be pushed up into a mount top (19) and may hold a cover (16) in place perhaps prior to attaching a mount top (19) to a mount base (18). When a resilience constituent (23) may be pushed up into a mount top (19) it may compress a resilience constituent (23) and may push a cover (16) against a mount top cover surface (34) and a resilience constituent (23) may snap into a spring pocket (32) in a mount top (19). A water intrusion barrier and cover (16) pull out strength may be the same as described for FIG. 102. FIGS. 119-121 show a non-limiting example of a mount top (19), cover (16), and a resilience constituent (23), assembly.

FIG. 104 shows a non-limiting example of a resilience constituent (23) and a mount top (19) that may have a spring pocket (32) and may retain a resilience constituent (23). As previous described, this may allow for a mount top (19), a cover (16), and even a resilience constituent (23), to be assembled perhaps prior to attaching a mount top (19) to a mount base (18). When a resilience constituent (23) may be compressed, it may push a cover (16) into a mount top protrusion (41) which may create a water intrusion barrier. There may be any shape or quantity of mount top protrusions (41) perhaps on a mount top cover surface (34). These mount top protrusions (41) may prevent full contact of a cover (16) to a mount top cover surface (34) and may create a cover space (42) but the deformation and high pressure perhaps caused by mount top protrusions (41) into a cover (16) may create an effective water intrusion barrier. If mount top protrusions (41) protrusion may be small enough or does not exist, a cover (16) may contact a top cover surface (34) and may still create a water intrusion barrier.

In FIGS. 103 and 104, a resilience constituent (23) portion may be against a cover (16) and may extend down to a mount base spring surface (39) which may add additional force against a mount top cover surface (34) and even mount top protrusions (41). This may apply to other resilience constituents.

A cover (16) may be attached with an adhesive (17) to a water proof layer (15) perhaps as shown in FIG. 21. This may create a water intrusion barrier between a cover (16) and even a water proof layer (15). With water intrusion barriers discussed, water intrusion into a substrate (14) perhaps due to a mount (13) may not occur. When a bolt (8) may be tightened, an attachment structure bottom surface (28) may make a rigid contact with a mount top upper surface (41). There may now be rigid contacts between an attachment structure (11) and even a mount base (18).

FIGS. 122-137 and 24 show a non-limiting example of a mount (13) and an attachment structure (11) perhaps attached to a mount (13). A substrate (14), an adhesive (17), a water proof layer (15), and even a mount extension (25) may not be shown but may apply in some embodiments.

Figure 122:
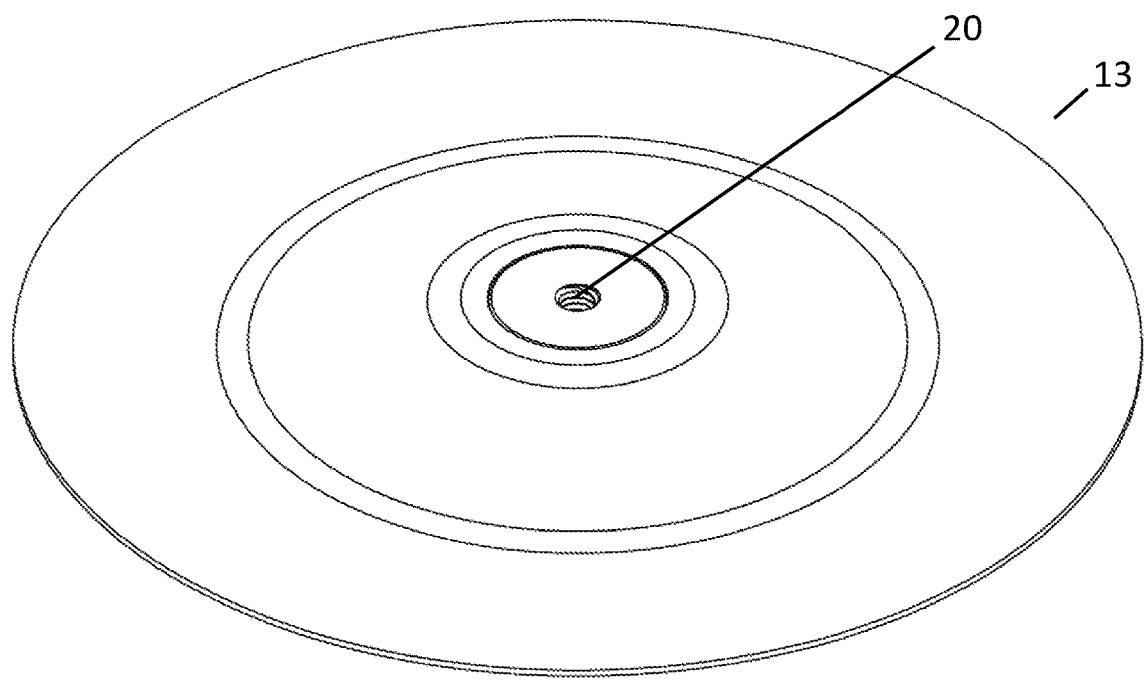
Figure 123:
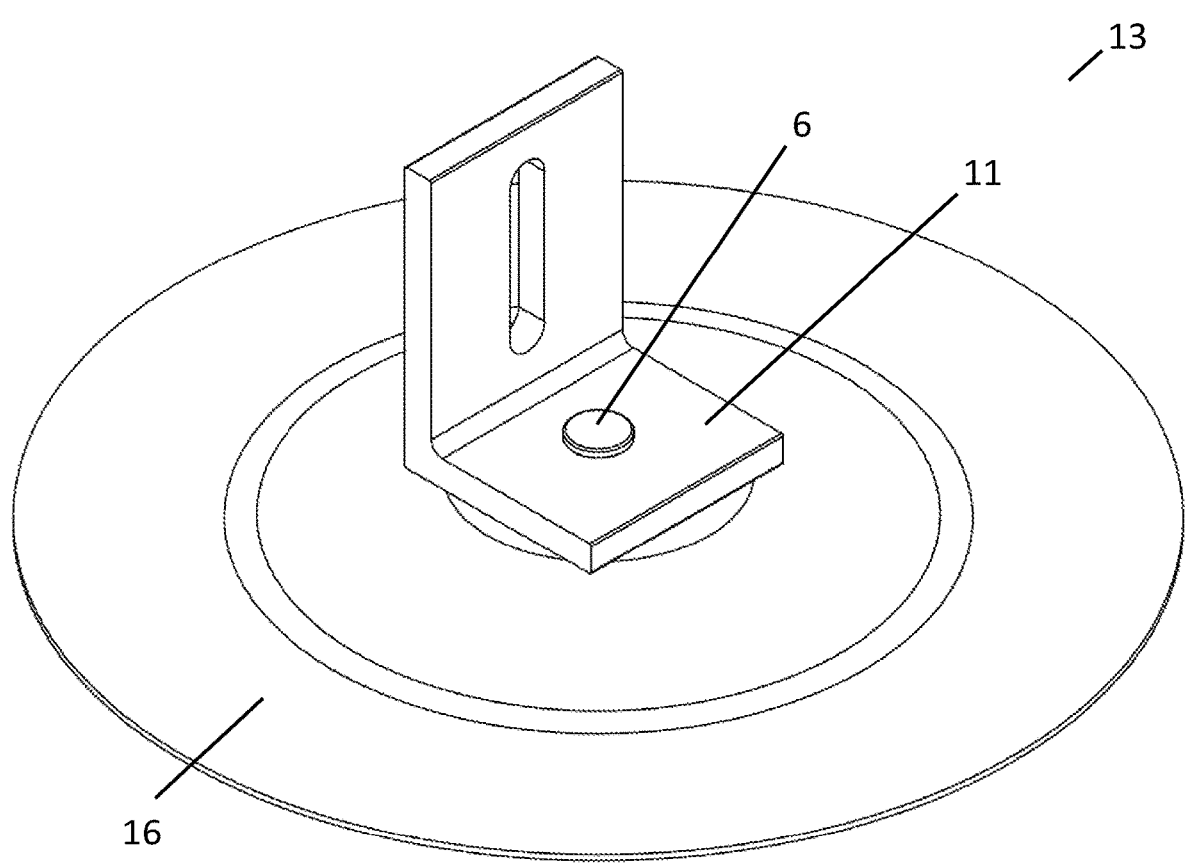
Figure 124:
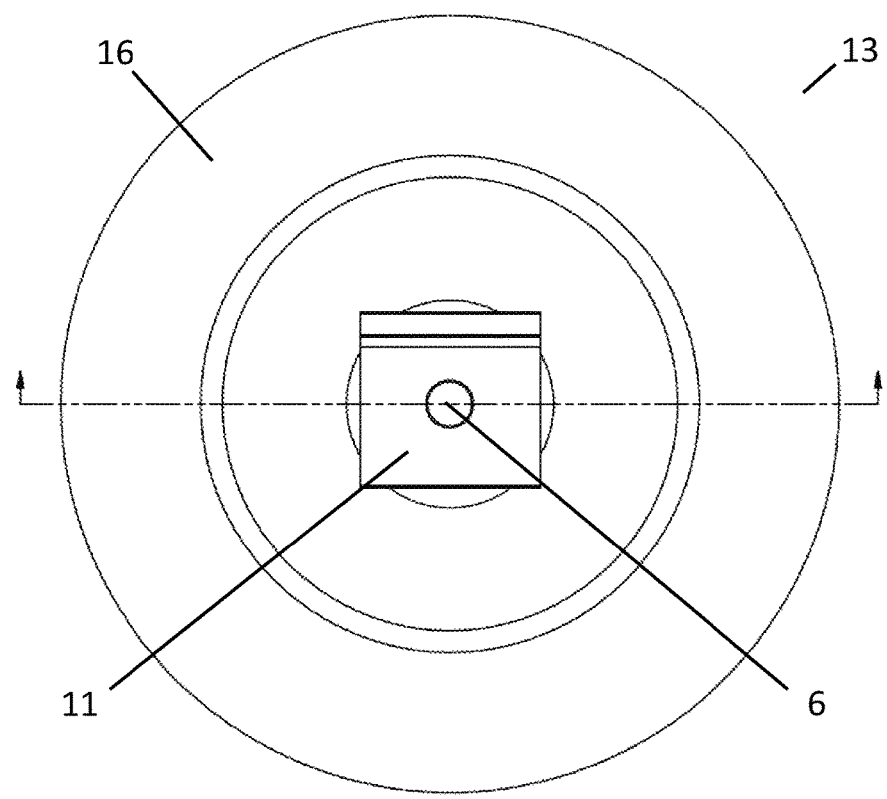
Figure 125:
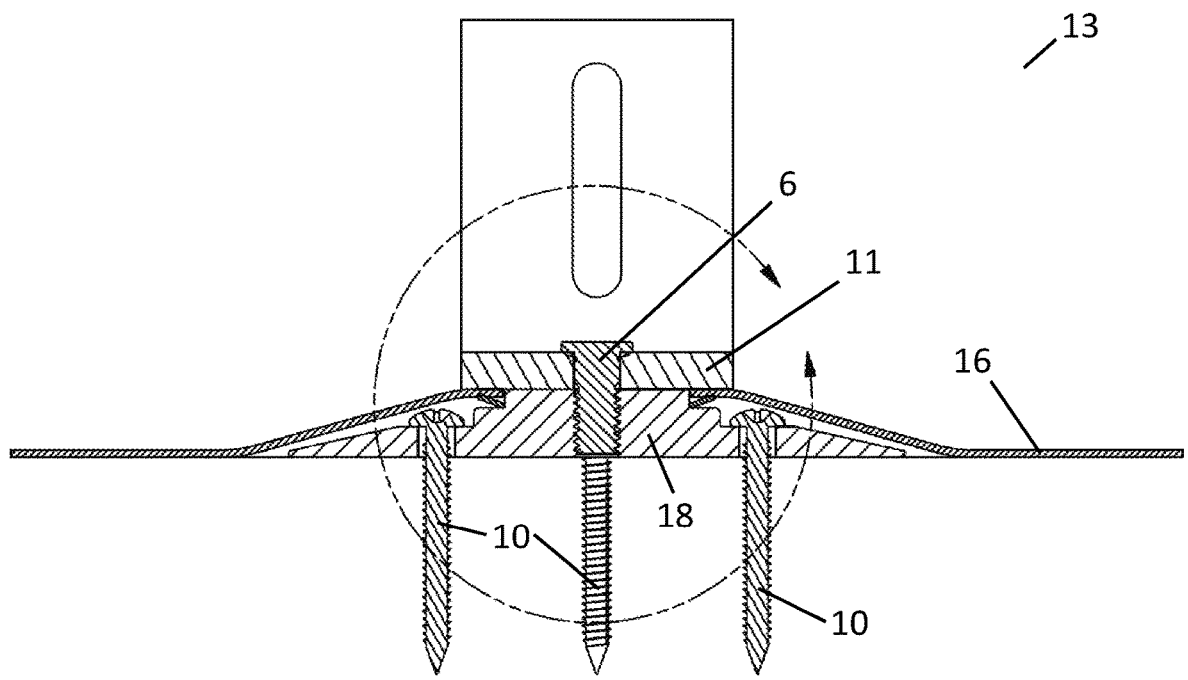
Figure 126:
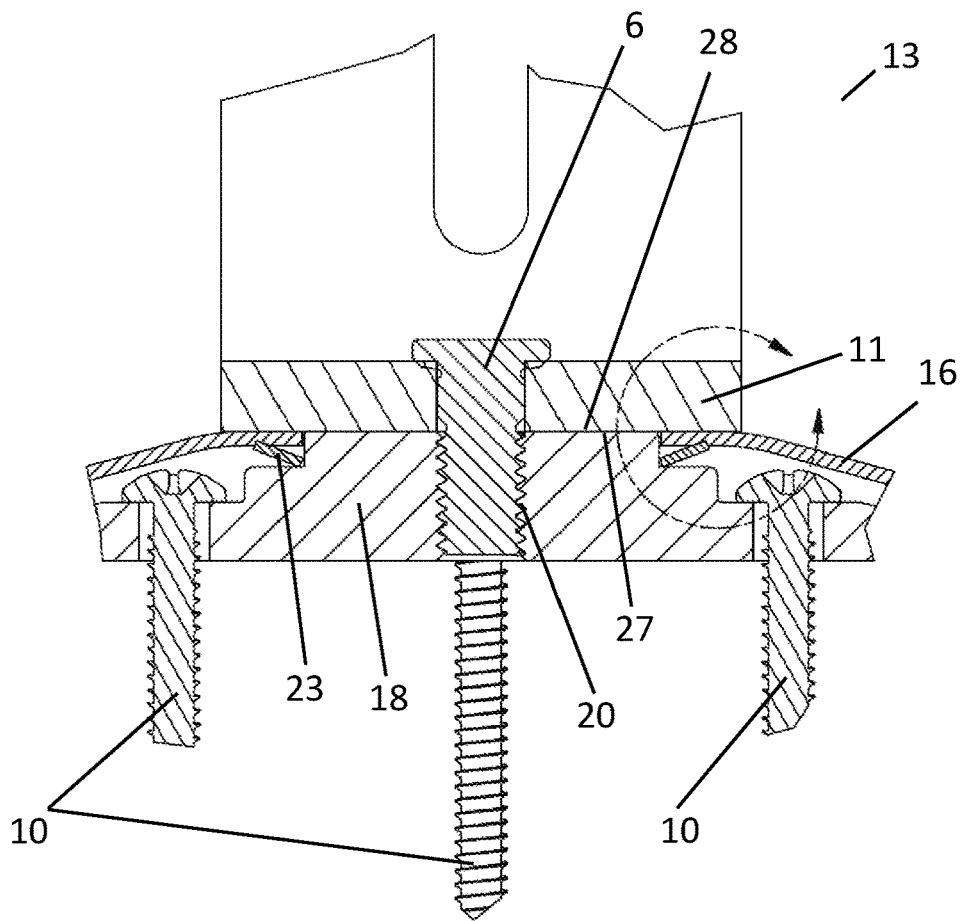
Figure 127:
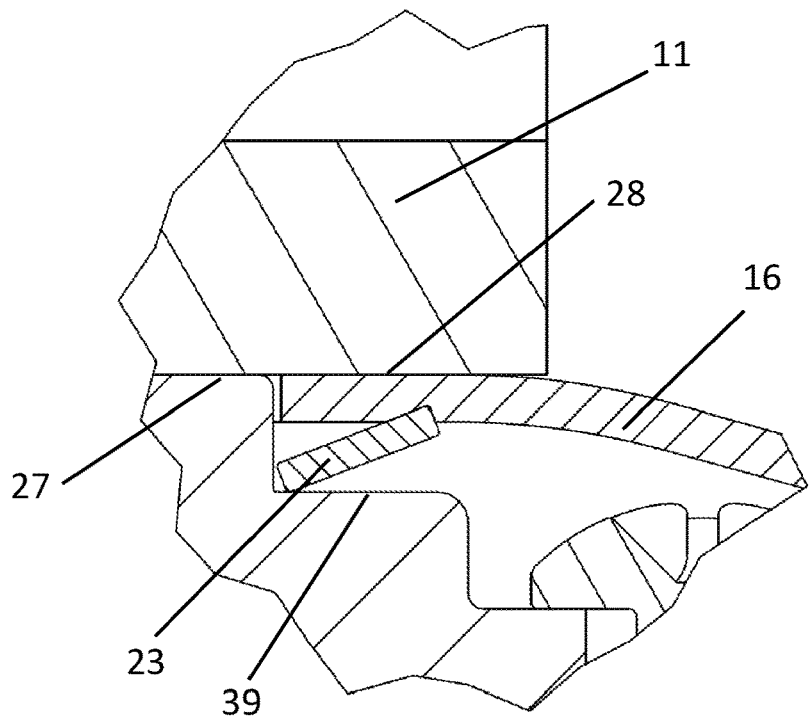

FIG. 122 shows a non-limiting example of a mount (13) perhaps without an attachment structure (11). FIG. 123 may be the same as FIG. 122 except that it may have an attachment structure (11) which may be attached to a mount base (18). FIG. 124 may be a top view of FIG. 123 and FIG. 125 may be a cross section view of FIG. 124. FIG. 126 is an enlarged view of that shown in FIG. 125. FIG. 127 is an enlarged view of that shown in FIG. 126.

Figure 128:
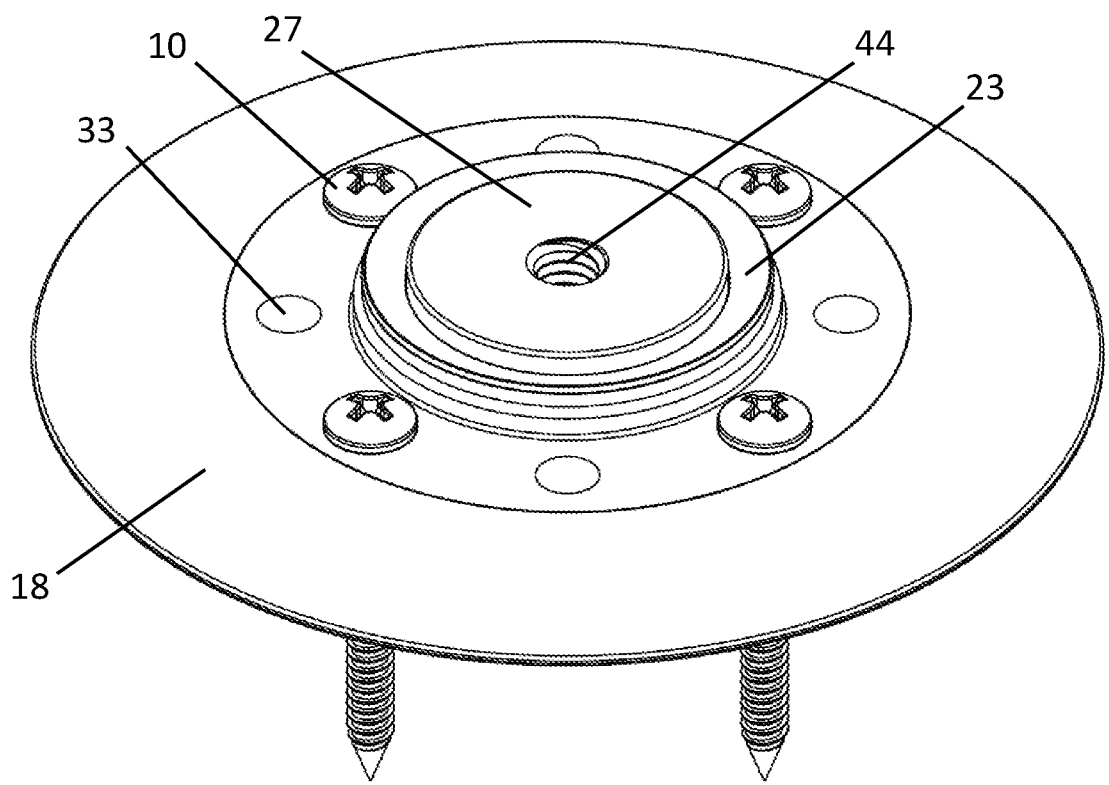

FIG. 128 shows a non-limiting example of a mount base (18) perhaps with screws (10) and resilience constituent (23). FIGS. 129-130 and 134-137 show a non-limiting example of an attachment structure (11) perhaps with different attachment methods. FIGS. 131-133 show a non-limiting example of a resilience constituent (23). FIG. 132 shows a non-limiting example of a compressed resilience constituent (23) and FIG. 133 shows a non-limiting example of an non-compressed resilience constituent (23).

Referring to FIGS. 125-137 and 24, a cover (16) perhaps with a cover hole (47) may be placed on a mount base (18) perhaps as shown in FIG. 128. Screws (10) could be screwed into a substrate (14) or they may be even screwed into a substrate (14) perhaps after a mount (13) assembly may be complete as described previously.

Figure 129:
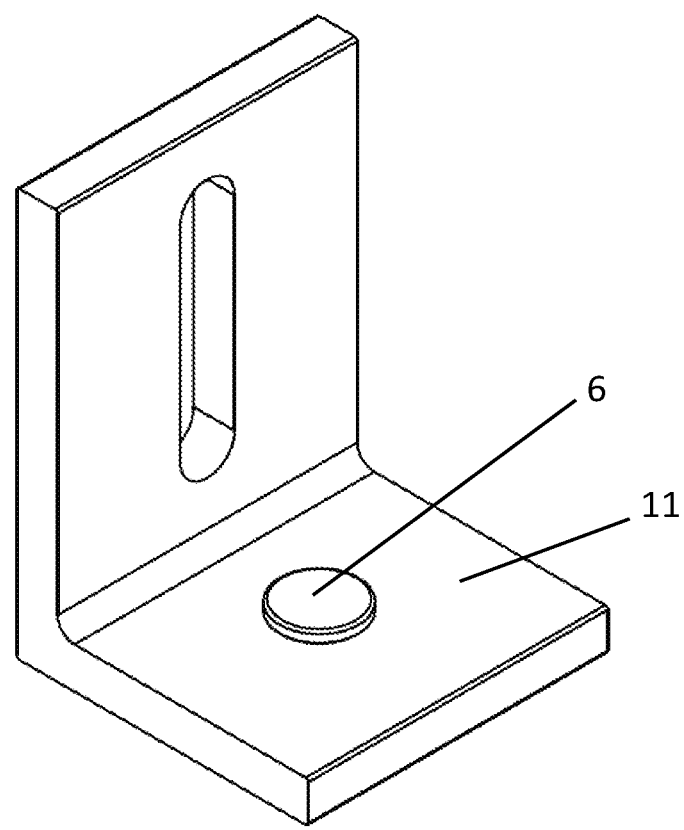
Figure 130:
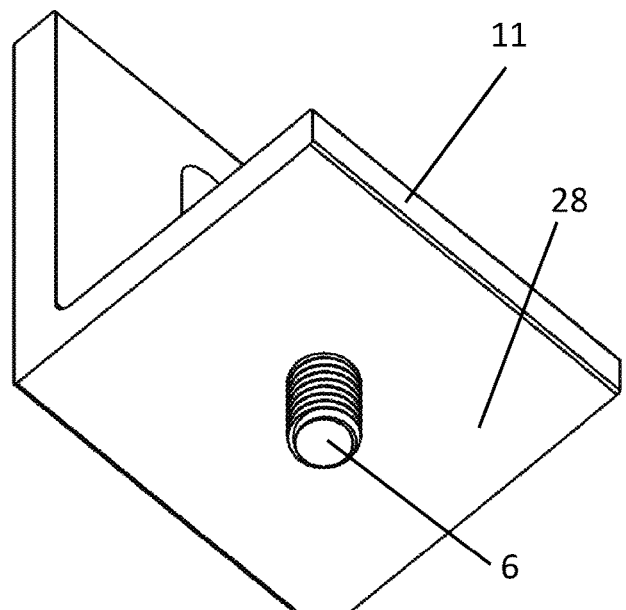
Figure 131:
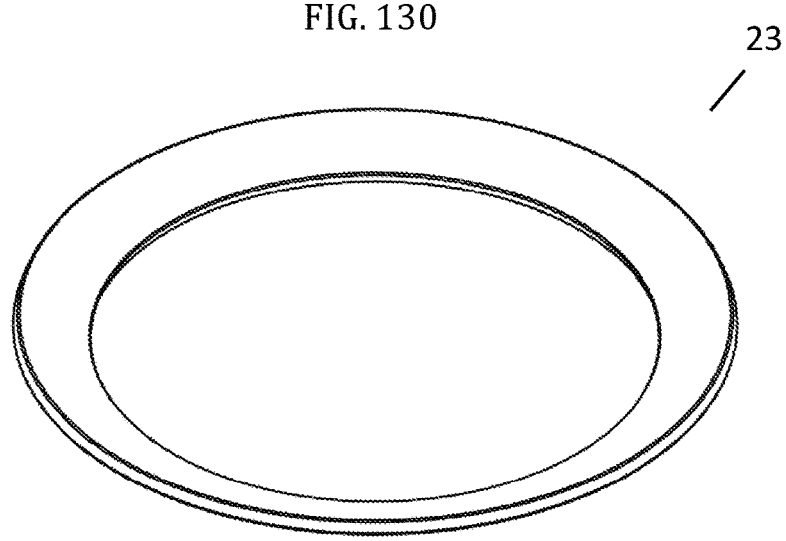

In FIGS. 129-130, a stud (6) may be pressed into a hole in attachment structure (11). Pressed in stud (6) may be formed perhaps as to make a stud pressed swage, such as sufficient to create a water intrusion barrier between a stud (6) and an attachment structure (11). In FIGS. 134-137, a threaded rod (45) may be screwed into an attachment structure threaded hole (50) perhaps as shown in FIG. 137.

A stud (6) or even a threaded rod (45) on an attachment structure (11) may be screwed into a mount base threaded hole (44) perhaps until an attachment structure bottom surface (28) may contact a mount base stop surface (27) and may create a rigid connection between an attachment structure bottom surface (28) and a mount base stop surface (27). There may now be rigid connection between an attachment structure (11) and a mount base (18).

A resilience constituent (23) may be compressed perhaps between a cover (16) and a mount base spring surface (39). A resilience constituent (23) may push up on a cover (16) and a cover (16) may be forced against an attachment structure bottom surface (28) which may create a water intrusion barrier between a cover (16) and an attachment structure bottom surface (28). Localized pressure from an edge of a resilience constituent (23) may increase this pressure and may aid in a water intrusion barrier. Protrusions on an attachment structure bottom surface (28) may also increase the water intrusion barrier.

A cover (16) may be attached with an adhesive (17) perhaps to a water proof layer (15) perhaps as shown in FIG. 21. This may create a water intrusion barrier between a cover (16) and a water proof layer (15). With water protrusion barriers discussed, water intrusion into a substrate (14) perhaps due to a mount (13) may not occur.

FIGS. 139-150 and 138 show a non-limiting example of a mount (13) and an attachment structure (11) perhaps attached to a mount (13). A substrate (14), an adhesive (17), a water proof layer (15), and even a mount extension (25) may not be shown but may not apply in embodiments of the present invention.

FIG. 139 shows a non-limiting example of a mount (13) and an attachment structure (11) perhaps attached to a mount (13). FIG. 140 may be a top view of FIG. 139 and FIG. 141 is a cross section view of FIG. 140. FIG. 142 is an enlarged view as shown in FIG. 141.

FIG. 149 shows a non-limiting example of a mount base (18) perhaps with screws (10). FIG. 150 shows a non-limiting example of a cover (16) perhaps with a cover hole (47) before it may be attached to a mount base (18). FIGS. 143-146 show a non-limiting example of a cover (16) perhaps placed on a mount base (18) and a mount top (19) perhaps placed on top of a cover (16). FIGS. 147 and 148 show a non-limiting example of a mount top (19).

Referring to FIGS. 143-150, a cover (16) perhaps with a cover hole (47) may be placed on a mount base (18). A seal (35) may be placed around a mount top hole (51) and may be placed on a mount base stop surface (27) perhaps around a top of a mount base threaded hole (44). A mount top (19) may be placed on top of a cover (16).

Embodiments of the present invention may provide locking a roof mount. This may be with locking teeth (38) perhaps as may be understood from the non-limiting example in FIG. 63. In some embodiments, a top roof mount may be locked to a bottom roof mount perhaps with a locking feature (55). A mount base, a mount top, or even both may have a locking feature (55). A locking feature may include, but is not limited to, serrations, teeth, a roughed surface, an adhesive, a retaining liquid, or any feature that may prevent the surfaces to be loosened perhaps as may be understood in the non-limiting example shown in FIGS. 151 and 152.

Embodiments of the present invention may provide attachment of a component (56) to a roof mount (13). A component may be a rack, solar panel racking, a part, a construction element, or any type of item that may need to be attached perhaps with a mount to another item. A component (56) may be directly attached to a mount or may be indirectly attached to a mount perhaps via an attachment structure (11) which may assist in attaching a component to a roof mount as may be understood in the non-limiting example in FIG. 153. In some embodiments, an attachment structure (11) may be included in a top roof mount perhaps so that it may be part of the mount structure. In other embodiments, an attachment structure may be separate.

A bolt (8) and even an attachment structure (11) may be shown in FIGS. 139-141. Referring to FIGS. 145-146, when a bolt (8) may be tightened, a mount top (19) may move down and a mount top protrusion (41) may be driven into a cover (16). This may continue perhaps until a mount top stop surface (26) may contact a mount base stop surface (27) perhaps as shown in FIGS. 141-142. A force pushing up on a mount top (19) perhaps by a cover (16) may flex a mount top (19) which may act as a spring as discussed herein. A spring-flex of a mount top (19) may be understood in the examples as shown in FIGS. 141-142. An uncompressed state of a mount top (19) may be shown in the non-limiting example of FIGS. 145-146. High pressure caused by this compression and even flex of a top mount (19) may push a mount top protrusion (41) into a cover (16) and may even cause a high pressure area between a mount top (19) and a top of a cover (16). This may cause a water intrusion barrier between a top of a cover (16) and even a mount, top (19). With a mount top surface, perhaps flat or even near flat against a top of a cover (16), a pressure between a mount top cover surface (34) may create a water intrusion barrier. Multiple top protrusions (41) may be on a mount top cover surface (34). Pressure of a bottom of a cover (16) perhaps against a mount base cover surface (40) perhaps without a mount top protrusion (41) may create a water intrusion barrier. Protrusion or protrusions, perhaps on a mount base cover surface (40) may create additional water intrusion barriers.

A seal (35) may create a water intrusion barrier between a mount top (19) and even a mount base (18) perhaps through a mount top hole (51). With water intrusion barriers discussed, there may be no water intrusion path to a substrate (14) perhaps due to a mount (13).

With a bolt (8) tightened, there may be a rigid connection between an attachment structure bottom surface (28) and even a mount top surface (29) and there may be a rigid connection between a mount top stop surface (26) and a mount base stop surface (27) which may cause a rigid connection between an attachment structure (11) and even a mount base (18). A bottom of a mount top (19) may be shown on the outside of screws (10). A bottom of a mount top (19) may also be inside screws (10).

In the various embodiments of the present invention, a stud (6) could be a bolt (8) and if sealed under a bolt head with a sealant. This may create a water intrusion barrier perhaps between a top of an attachment structure (11) and a bolt (8).

A mount base (18) may be screwed into a substrate (14) perhaps before a cover (16) may be placed on a mount base (18) or even any time before a cover (16) may be attached to a water proof layer (15) perhaps by lifting a cover and accessing screws (10). This may allow a mount (13) to be fully or even partially assembled, an attachment structure (11) may be attached to a mount (13) or even an additional attachment structure may be attached to an attachment structure (11) perhaps before attaching a mount (13) to a substrate (14) and even attaching a cover (16) to a water proof layer (15).

Mounts (13) and even screws (10) perhaps in mount base screw holes (43) may be any fastener to attach mount bases (18) and may be, but is not limited to, all types of screws, roof screws, rivets, concrete fasteners, bolts, any type of fastener, or the like. All these mount bases (18) may be attached to a water proof layer (15) perhaps using an adhesive (17). An adhesive (17) may be under a mount base (18) and may or may not extend out beyond a mount base (18). Screws (10) may be used with an adhesive (17) or even a mount base (18) could be attached perhaps with only an adhesive (17). Mount base screw holes (43) may not be required perhaps if only an adhesive (17) may be used to adhere a mount base (18) to a water proof layer (15).

A water intrusion barrier may block water from water leaking, penetrating, or any migrating into an area that may be undesirable. A small leakage into an area that may be acceptable may be considered as a water intrusion barrier. The term water may include any liquid, gas, vapor, or the like.

A resilience constituent (23) may be of varying shapes and may contact a cover (16) perhaps by any of its surfaces. Resilience constituents (23) may have any number of protrusions. A resilience constituent may be shown inside or even outside screws (10) but may span either, both or even partially span inside and even outside of screws (10).

Since a resilience constituent (23) may compress a cover (16) of various thickness, a cover (16) may be used and may allow for a water intrusion barrier. The thickness or even dimensional changes of a cover (16) may be due to, but is not limited to, aging, deterioration, other effects that cause dimensional changes of a cover, or the like and may have a good water intrusion barrier perhaps due to a compression range of a resilience constituent (23).

A cover (16), a mount top (19), and even a mount base (18), may be shown as one piece but may be made of multiple parts with the same or even different materials. Multiple pieces may also be combined into one piece.

A resilience constituent (23) may be shown as separate component of a mount (13) but it could be attached to a mount top (19), a mount base (18), an attachment structure (11), or any other component such as between a mount top (19), and mount base (18), or even between an attachment structure (11) and a mount base (18). A resilience constituent (23) could be part of an attachment structure (11), a mount top (19), or even a mount base (18). Sections of an attachment structure (11), mount top (19), or even a mount base (18), could flex and even act as a spring.

Different features may be discussed in the various embodiments of the mounts (13). Any of these features are not to be considered unique to such individual mount (13) but should be considered applicable to all mounts, As can be easily understood from the foregoing, the basic concepts of the present invention may be embodied in a variety of ways. It involves both mounting techniques as well as devices to accomplish the appropriate mount. In this application, the mounting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural attachment structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "cover" should be understood to encompass disclosure of the act of "covering"—whether explicitly discussed or not—and, conversely, were there effectively disclosure of the act of "covering", such a disclosure should be understood to encompass disclosure of a "cover" and even a "means for covering." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as either or both: components that are configured to achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information disclosure statement or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the mount devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for rigid attachment of materials comprising the steps of:
   providing a roof mount comprising a top roof mount and a bottom roof mount;
   covering part of said roof mount with a cover;
   compressing a resilience constituent against said cover and said roof mount;
   exerting a force from said resilience constituent so that at least part of said resilience constituent is forced against said cover to create a high pressure connection between said at least part of said resilience constituent against said cover; and
   compressing said resilience constituent until said top roof mount rigidly contacts said bottom roof mount.

2. The method according to claim 1 and further comprising the steps of:
   placing said roof mount on a roof; and
   attaching said roof mount to said roof.

3. The method according to claim 1 and further comprising a step of sealing said cover against said part of said roof mount with said resilience constituent.

4. The method according to claim 1 and further comprising the steps of:
   placing said cover over part of said bottom roof mount;
   attaching said top roof mount to said bottom roof mount; and
   compressing said resilience constituent against said cover during said step of attaching said top roof mount to said bottom roof mount.

5. The method according to claim 4 and further comprising a step of securing said bottom roof mount to said roof.

6. The method according to claim 1 and further comprising a step of attaching a component to said roof mount.

7. The method according to claim 6 wherein said step of attaching said component to said roof mount comprises attaching an attachment structure to said roof mount to assist in attaching said component to said roof mount.

8. The method according to claim 1 and further comprising a step of rigidly attaching said top roof mount to said bottom roof mount.

9. The method according to claim 1 wherein said top roof mount comprises a rigid top roof mount and wherein said bottom roof mount comprises a rigid bottom roof mount.

10. The method according to claim 1 and further comprising a step of locking said roof mount.

11. The method according to claim 1 and further comprising a step of applying pressure to said resilience constituent.

12. The method according to claim 1 wherein said resilience constituent comprises a disk with a middle ridge.

13. The method according to claim 12 and further comprising a step of applying pressure with said middle ridge of said disk to said roof mount.

14. The method according to claim 1 wherein said resilience constituent comprises an arched disk.

15. The method according to claim 1 wherein said resilience constituent comprises an arched disk and further comprising a step of snapping in said arched disk into said top mount when said resilience constituent is compressed.

16. The method according to claim 1 wherein said top roof mount comprises an attachment structure.

17. The method according to claim 16 and further comprising a step of attaching a component to said roof mount with said attachment structure.

18. The method according to claim 1 wherein said top roof mount comprises a mount top protrusion and further comprising a step of deforming said cover with said mount top protrusion.

19. A method for rigid attachment of materials comprising the steps of:
   providing a roof mount comprising a top roof mount and a bottom roof mount;
   covering part of said roof mount with a cover;
   compressing a resilience constituent against said cover and said roof mount;
   wherein said top roof mount comprises a mount top protrusion; and
   deforming said cover with said mount top protrusion.

20. The method according to claim 19 and further comprising the steps of:
   placing said roof mount on a roof; and
   attaching said roof mount to said roof.

21. The method according to claim 19 and further comprising a step of sealing said cover against said part of said roof mount with said resilience constituent.

22. The method according to claim 19 and further comprising the steps of:
   placing said cover over part of said bottom roof mount;

attaching said top roof mount to said bottom roof mount; and compressing said resilience constituent against said cover during said step of attaching said top roof mount to said bottom roof mount.

23. The method according to claim 22 and further comprising a step of securing said bottom roof mount to said roof.

24. The method according to claim 19 and further comprising a step of compressing said resilience constituent until said top roof mount rigidly contacts said bottom roof mount.

25. The method according to claim 19 and further comprising a step of attaching a component to said roof mount.

26. The method according to claim 25 wherein said step of attaching said component to said roof mount comprises attaching an attachment structure to said roof mount to assist in attaching said component to said roof mount.

27. The method according to claim 19 and further comprising a step of rigidly attaching said top roof mount to said bottom roof mount.

28. The method according to claim 19 wherein said top roof mount comprises a rigid top roof mount and wherein said bottom roof mount comprises a rigid bottom roof mount.

29. The method according to claim 19 and further comprising a step of locking said roof mount.

30. The method according to claim 19 and further comprising a step of applying pressure to said resilience constituent.

31. The method according to claim 19 wherein said resilience constituent comprises a disk with a middle ridge.

32. The method according to claim 31 and further comprising a step of applying pressure with said middle ridge of said disk to said roof mount.

33. The method according to claim 19 wherein said resilience constituent comprises an arched disk.

34. The method according to claim 19 wherein said resilience constituent comprises an arched disk and further comprising a step of snapping in said arched disk into said top mount when said resilience constituent is compressed.

35. The method according to claim 19 wherein said top roof mount comprises an attachment structure.

36. The method according to claim 35 and further comprising a step of attaching a component to said roof mount with said attachment structure.

37. A method for rigid attachment of materials comprising the steps of:
providing a roof mount comprising a top roof mount and a bottom roof mount;
covering part of said roof mount with a cover;
placing said cover over part of said bottom roof mount;
attaching said top roof mount to said bottom roof mount;
compressing a resilience constituent against said cover and said roof mount;
compressing said resilience constituent against said cover during said step of attaching said top roof mount to said bottom roof mount; and
exerting a force from said resilience constituent so that at least part of said resilience constituent is forced against said cover to create a high pressure connection between said at least part of said resilience constituent against said cover.

38. The method according to claim 37 and further comprising the steps of:
placing said roof mount on a roof; and
attaching said roof mount to said roof.

39. The method according to claim 37 and further comprising a step of sealing said cover against said part of said roof mount with said resilience constituent.

40. The method according to claim 37 and further comprising a step of securing said bottom roof mount to said roof.

41. The method according to claim 37 and further comprising a step of compressing said resilience constituent until said top roof mount rigidly contacts said bottom roof mount.

42. The method according to claim 37 and further comprising a step of attaching a component to said roof mount.

43. The method according to claim 42 wherein said step of attaching said component to said roof mount comprises attaching an attachment structure to said roof mount to assist in attaching said component to said roof mount.

44. The method according to claim 37 and further comprising a step of rigidly attaching said top roof mount to said bottom roof mount.

45. The method according to claim 37 wherein said top roof mount comprises a rigid top roof mount and wherein said bottom roof mount comprises a rigid bottom roof mount.

46. The method according to claim 37 and further comprising a step of locking said roof mount.

47. The method according to claim 37 and further comprising a step of applying pressure to said resilience constituent.

48. The method according to claim 37 wherein said resilience constituent comprises a disk with a middle ridge.

49. The method according to claim 48 and further comprising a step of applying pressure with said middle ridge of said disk to said roof mount.

50. The method according to claim 37 wherein said resilience constituent comprises an arched disk.

51. The method according to claim 37 wherein said resilience constituent comprises an arched disk and further comprising a step of snapping in said arched disk into said top mount when said resilience constituent is compressed.

52. The method according to claim 37 wherein said top roof mount comprises an attachment structure.

53. The method according to claim 52 and further comprising a step of attaching a component to said roof mount with said attachment structure.

54. The method according to claim 37 wherein said top roof mount comprises a mount top protrusion and further comprising a step of deforming said cover with said mount top protrusion.

* * * * *